(12) United States Patent
Westerman et al.

(10) Patent No.: US 9,910,494 B2
(45) Date of Patent: Mar. 6, 2018

(54) THRESHOLDS FOR DETERMINING FEEDBACK IN COMPUTING DEVICES

(71) Applicant: APPLE INC., Cupertino, CA (US)

(72) Inventors: Wayne C. Westerman, Cupertino, CA (US); Duncan Kerr, Cupertino, CA (US); Avi E. Cieplinski, Cupertino, CA (US); Jeffrey T. Bernstein, Cupertino, CA (US); William M. Vieta, Cupertino, CA (US); Julian K. Missig, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/624,296

(22) Filed: Feb. 17, 2015

(65) Prior Publication Data

US 2015/0227280 A1   Aug. 13, 2015

Related U.S. Application Data

(63) Continuation of application No. 14/399,634, filed as application No. PCT/US2013/000083 on Mar. 15, 2013.
(Continued)

(51) Int. Cl.
*G06F 3/041* (2006.01)
*G06F 3/01* (2006.01)
(Continued)

(52) U.S. Cl.
CPC ............ *G06F 3/016* (2013.01); *G06F 3/0414* (2013.01); *G06F 3/0416* (2013.01);
(Continued)

(58) Field of Classification Search
CPC .............................. G06F 3/016; G06F 3/0414
See application file for complete search history.

(56) References Cited

U.S. PATENT DOCUMENTS 3,176,241 A   3/1965  Hogan
4,558,757 A   12/1985 Mori
(Continued)

FOREIGN PATENT DOCUMENTS

CN    1659583       8/2005
CN    101477422 A   7/2009
(Continued)

OTHER PUBLICATIONS

"Immersion Announces MOTIV™ Development Platform for Android," retrieved from the Internet: URL:http://ir.immersion.com/releasedetail.cfm?sh_email=no&releaseid=549080, Feb. 10, 2011.
(Continued)

*Primary Examiner* — Xuemei Zheng
(74) *Attorney, Agent, or Firm* — Brownstein Hyatt Farber Schreck, LLP

(57) ABSTRACT

The present application is related to a computer for providing output to a user. The computer includes a processor and an input device in communication with the processor. The input device includes a feedback surface and at least one sensor in communication with the feedback surface, the at least one sensor configured to detect a user input to the feedback surface. The processor varies a down-stroke threshold based on a first factor and varies an up-stroke threshold based on a second factor. The down-stroke threshold determines a first output of the computing device, the up-stroke threshold determines a second output of the computing device, and at least one of the first factor or the second factor are determined based on the user input.

20 Claims, 32 Drawing Sheets

Related U.S. Application Data

(60) Provisional application No. 61/645,033, filed on May 9, 2012, provisional application No. 61/665,603, filed on Jun. 28, 2012, provisional application No. 61/681,098, filed on Aug. 8, 2012.

(51) Int. Cl.
  *G06F 3/0486* (2013.01)
  *G06F 3/0484* (2013.01)
  *G06F 3/0488* (2013.01)

(52) U.S. Cl.
  CPC .......... *G06F 3/0486* (2013.01); *G06F 3/0488* (2013.01); *G06F 3/04847* (2013.01); *G06F 2203/04808* (2013.01)

(56) References Cited

U.S. PATENT DOCUMENTS

| | | |
|---|---|---|
| 4,577,174 A | 3/1986 | Lemmer |
| 4,716,393 A | 12/1987 | Logie |
| 4,897,582 A | 1/1990 | Otten et al. |
| 5,052,844 A | 10/1991 | Kendall |
| 5,231,336 A | 7/1993 | van Namen |
| 5,541,372 A | 7/1996 | Baller et al. |
| 5,805,138 A | 9/1998 | Brawne |
| 5,999,168 A | 12/1999 | Rosenberg et al. |
| 6,100,874 A | 8/2000 | Schena et al. |
| 6,219,038 B1 | 4/2001 | Cho |
| 6,337,678 B1 | 1/2002 | Fish |
| 6,388,655 B1 | 5/2002 | Leung |
| 6,492,979 B1 | 12/2002 | Kent |
| 6,518,954 B1 | 2/2003 | Chen |
| 6,816,049 B2 | 11/2004 | Watanabe |
| 6,937,124 B1 | 8/2005 | Nakamura |
| 6,940,494 B2 | 9/2005 | Hoshino et al. |
| 7,031,592 B2 | 4/2006 | Akieda |
| 7,091,886 B2 | 8/2006 | DePue |
| 7,152,482 B2 | 12/2006 | Ueno |
| 7,176,897 B2 | 2/2007 | Roberts |
| 7,219,549 B2 | 5/2007 | Honkura et al. |
| 7,283,120 B2 | 10/2007 | Grant |
| 7,290,694 B2 | 11/2007 | Kirby et al. |
| 7,331,245 B2 * | 2/2008 | Nishimura ............ G06F 3/0414 73/818 |
| 7,436,396 B2 | 10/2008 | Akieda |
| 7,443,384 B2 | 10/2008 | Harada |
| 7,511,706 B2 | 3/2009 | Schena |
| 7,525,532 B2 | 4/2009 | Liu et al. |
| 7,557,051 B2 | 7/2009 | Ryu |
| 7,567,232 B2 | 7/2009 | Rosenberg |
| 7,639,232 B2 | 12/2009 | Grant et al. |
| 7,656,393 B2 | 2/2010 | King |
| 7,685,538 B2 | 3/2010 | Fleck et al. |
| 7,692,078 B2 | 4/2010 | Hayashi |
| 7,710,397 B2 | 5/2010 | Krah et al. |
| 7,791,506 B2 | 9/2010 | Riihimaki |
| 7,825,903 B2 | 11/2010 | Anastas et al. |
| 7,877,707 B2 | 1/2011 | Westerman |
| 7,920,225 B2 | 4/2011 | Nishikawa et al. |
| 7,948,337 B2 | 5/2011 | Chu |
| 7,952,566 B2 | 5/2011 | Poupyrev |
| 8,059,104 B2 | 11/2011 | Shahoian |
| 8,081,156 B2 | 12/2011 | Ruettiger |
| 8,084,968 B2 | 12/2011 | Murray et al. |
| 8,117,912 B2 | 2/2012 | Kawakubo |
| 8,132,468 B2 | 3/2012 | Radivojevic |
| 8,139,038 B2 | 3/2012 | Chueh |
| 8,144,129 B2 | 3/2012 | Hotelling |
| 8,169,332 B2 | 5/2012 | Son |
| 8,169,401 B2 | 5/2012 | Hardwick |
| 8,169,402 B2 | 5/2012 | Shahoian et al. |
| 8,232,969 B2 | 7/2012 | Grant |
| 8,252,695 B2 | 8/2012 | Tan |
| 8,260,337 B2 | 9/2012 | Periyalwar et al. |
| 8,264,465 B2 | 9/2012 | Grant et al. |
| 8,279,175 B2 | 10/2012 | Kim et al. |
| 8,287,522 B2 | 10/2012 | Moses et al. |
| 8,291,776 B1 | 10/2012 | Pickens |
| 8,296,670 B2 | 10/2012 | Matthews et al. |
| 8,310,350 B2 | 11/2012 | Pfau et al. |
| 8,310,452 B2 | 11/2012 | Takenaka et al. |
| 8,319,727 B2 | 11/2012 | Norieda |
| 8,373,664 B2 | 2/2013 | Wright |
| 8,378,798 B2 | 2/2013 | Bells et al. |
| 8,378,965 B2 | 2/2013 | Gregorio et al. |
| 8,400,410 B2 | 3/2013 | Taylor |
| 8,421,567 B2 | 4/2013 | Eckl et al. |
| 8,482,381 B2 | 7/2013 | Chatterjee et al. |
| 8,487,759 B2 | 7/2013 | Hill |
| 8,488,308 B2 | 7/2013 | LeVasseur |
| 8,502,547 B2 | 8/2013 | Philipp |
| 8,536,978 B2 | 9/2013 | Coggill |
| 8,570,162 B2 * | 10/2013 | Ujii ....................... G03B 17/38 178/18.01 |
| 8,570,297 B2 | 10/2013 | Bulea |
| 8,581,901 B2 | 11/2013 | Joshi |
| 8,587,542 B2 | 11/2013 | Moore |
| 8,633,901 B2 | 1/2014 | Orr et al. |
| 8,633,911 B2 | 1/2014 | Schediwy et al. |
| 8,633,916 B2 * | 1/2014 | Bernstein ................ G06F 3/016 340/407.2 |
| 8,648,816 B2 | 2/2014 | Homma et al. |
| 8,671,782 B2 | 3/2014 | Mink |
| 8,686,839 B2 | 4/2014 | Posamentier |
| 8,686,961 B2 | 4/2014 | Yamano |
| 8,717,152 B2 | 5/2014 | Bhatia et al. |
| 8,783,106 B1 | 7/2014 | Nielson et al. |
| 8,799,827 B2 | 8/2014 | Hinckley et al. |
| 8,810,522 B2 | 8/2014 | Tse |
| 8,836,648 B2 | 9/2014 | Wilairat |
| 8,854,317 B2 * | 10/2014 | Homma et al. ............... 345/173 |
| 8,898,564 B2 | 11/2014 | Grant |
| 8,901,783 B2 | 12/2014 | Gregory et al. |
| 8,907,661 B2 | 12/2014 | Maier |
| 8,915,422 B1 | 12/2014 | Harty |
| 8,976,537 B2 | 3/2015 | Ito |
| 9,001,060 B2 | 4/2015 | Harris |
| 9,013,430 B2 | 4/2015 | McCann |
| 9,030,419 B1 | 5/2015 | Freed |
| 9,054,627 B2 | 6/2015 | Bosch et al. |
| 9,086,740 B2 | 7/2015 | Furukawa |
| 9,110,532 B2 | 8/2015 | Ando et al. |
| 9,122,325 B2 | 9/2015 | Peshkin |
| 9,122,345 B2 | 9/2015 | Chen |
| 9,128,523 B2 | 9/2015 | Buuck |
| 9,148,190 B1 | 9/2015 | Buuck et al. |
| 9,158,407 B2 | 10/2015 | Coulson et al. |
| 9,164,605 B1 | 10/2015 | Pirogov |
| 9,182,859 B2 | 11/2015 | Coulson et al. |
| 9,207,801 B2 | 12/2015 | Schediwy et al. |
| 9,222,693 B2 | 12/2015 | Gourlay |
| 9,223,471 B2 | 12/2015 | Buxton |
| 9,282,893 B2 | 3/2016 | Longinotti-Buitoni et al. |
| 9,298,260 B2 | 3/2016 | Karaoguz |
| 9,304,587 B2 | 4/2016 | Wright et al. |
| 9,348,473 B2 | 5/2016 | Ando |
| 9,349,552 B2 | 5/2016 | Huska |
| 9,360,968 B2 | 6/2016 | Wright |
| 9,372,543 B2 | 6/2016 | Behles |
| 9,389,686 B2 | 7/2016 | Zoller |
| 9,454,256 B2 | 9/2016 | Fisher et al. |
| 9,798,409 B1 | 10/2017 | Wells et al. |
| 2003/0210235 A1 * | 11/2003 | Roberts ........................ 345/173 |
| 2004/0080494 A1 | 4/2004 | Fahlman |
| 2004/0150631 A1 * | 8/2004 | Fleck et al. .................... 345/179 |
| 2005/0259087 A1 * | 11/2005 | Hoshino ................ G06F 3/016 345/173 |
| 2007/0113681 A1 * | 5/2007 | Nishimura ............ G06F 3/0414 73/862.046 |
| 2007/0152966 A1 | 7/2007 | Krah et al. |
| 2008/0018611 A1 | 1/2008 | Serban et al. |
| 2008/0068343 A1 | 3/2008 | Hoshino et al. |
| 2008/0084384 A1 | 4/2008 | Gregorio et al. |

(56) References Cited

U.S. PATENT DOCUMENTS

| | | |
|---|---|---|
| 2008/0165159 A1 | 7/2008 | Soss et al. |
| 2008/0191648 A1 | 8/2008 | Ito et al. |
| 2008/0297478 A1 | 12/2008 | Hotelling et al. |
| 2009/0002199 A1 | 1/2009 | Lainonen et al. |
| 2009/0115734 A1 | 5/2009 | Fredriksson |
| 2009/0167704 A1 | 7/2009 | Terlizzi et al. |
| 2009/0174672 A1 | 7/2009 | Schmidt |
| 2009/0225046 A1* | 9/2009 | Kim ............... G06F 3/016 345/173 |
| 2009/0242282 A1 | 10/2009 | Kim |
| 2009/0288044 A1 | 11/2009 | Matthews et al. |
| 2009/0316380 A1 | 12/2009 | Armstrong |
| 2009/0322183 A1 | 12/2009 | Kawakubo |
| 2010/0053116 A1 | 3/2010 | Daverman et al. |
| 2010/0107067 A1 | 4/2010 | Vaisanen |
| 2010/0141408 A1 | 6/2010 | Doy et al. |
| 2010/0149111 A1 | 6/2010 | Olien |
| 2010/0149124 A1 | 6/2010 | Kim |
| 2010/0164959 A1 | 7/2010 | Brown et al. |
| 2010/0182263 A1 | 7/2010 | Aunio et al. |
| 2010/0194692 A1* | 8/2010 | Orr et al. ............... 345/173 |
| 2010/0214239 A1 | 8/2010 | Wu |
| 2010/0225600 A1 | 9/2010 | Dai et al. |
| 2010/0245246 A1 | 9/2010 | Rosenfeld et al. |
| 2010/0245254 A1 | 9/2010 | Olien et al. |
| 2010/0328229 A1 | 12/2010 | Weber |
| 2011/0038541 A1 | 3/2011 | Bober et al. |
| 2011/0141052 A1* | 6/2011 | Bernstein ............... G06F 3/016 345/174 |
| 2011/0141053 A1 | 6/2011 | Bulea et al. |
| 2011/0163985 A1 | 7/2011 | Bae et al. |
| 2011/0205163 A1 | 8/2011 | Hinckley et al. |
| 2011/0227872 A1 | 9/2011 | Huska |
| 2011/0248916 A1 | 10/2011 | Griffin |
| 2012/0013531 A1 | 1/2012 | Wilson |
| 2012/0038568 A1 | 2/2012 | Colloms et al. |
| 2012/0050230 A1 | 3/2012 | Harris |
| 2012/0062491 A1 | 3/2012 | Coni et al. |
| 2012/0105358 A1 | 5/2012 | Momeyer et al. |
| 2012/0105367 A1* | 5/2012 | Son ............... G06F 3/0414 345/174 |
| 2012/0133496 A1* | 5/2012 | Aono ............... 340/407.2 |
| 2012/0139860 A1 | 6/2012 | Hotelling et al. |
| 2012/0154315 A1* | 6/2012 | Aono ............... 345/173 |
| 2012/0182238 A1 | 7/2012 | Lee |
| 2012/0188066 A1* | 7/2012 | Ujii ............... G03B 17/38 340/407.2 |
| 2012/0206246 A1 | 8/2012 | Cruz-Hernandez et al. |
| 2012/0229264 A1 | 9/2012 | Bosch et al. |
| 2012/0249462 A1 | 10/2012 | Flanagan et al. |
| 2012/0319987 A1 | 12/2012 | Woo |
| 2013/0038541 A1 | 2/2013 | Bakker |
| 2013/0076652 A1 | 3/2013 | Leung |
| 2013/0093685 A1 | 4/2013 | Kalu et al. |
| 2013/0154933 A1* | 6/2013 | Sheik-Nainar ............... G06F 3/03543 345/163 |
| 2013/0179827 A1 | 7/2013 | Eriksson et al. |
| 2013/0222267 A1 | 8/2013 | Almalki |
| 2013/0222289 A1 | 8/2013 | Kwak |
| 2013/0321290 A1 | 12/2013 | Oh |
| 2014/0028575 A1 | 1/2014 | Parivar |
| 2014/0145836 A1 | 5/2014 | Tossavanen et al. |
| 2014/0176485 A1 | 6/2014 | Holmberg et al. |
| 2014/0191973 A1 | 7/2014 | Zellers |
| 2014/0197936 A1 | 7/2014 | Biggs et al. |
| 2014/0198071 A1 | 7/2014 | Algreatly |
| 2014/0347289 A1 | 11/2014 | Suh |
| 2015/0089435 A1 | 3/2015 | Kuzmin |
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2015/0155474 A1 | 6/2015 | Tanimoto et al. |
| 2015/0177899 A1 | 6/2015 | Degner et al. |
| 2015/0192482 A1 | 7/2015 | Araki |
| 2015/0234493 A1 | 8/2015 | Parivar et al. |
| 2015/0242037 A1 | 8/2015 | Pedder et al. |
| 2015/0301642 A1 | 10/2015 | Hanaur |
| 2015/0346881 A1 | 12/2015 | Watazu |
| 2016/0085355 A1 | 3/2016 | Pirogov |
| 2016/0091972 A1 | 3/2016 | Patel et al. |
| 2016/0162030 A1 | 6/2016 | Patel et al. |
| 2016/0162031 A1 | 6/2016 | Westerman et al. |
| 2016/0188010 A1 | 6/2016 | Wright et al. |

FOREIGN PATENT DOCUMENTS

| | | | |
|---|---|---|---|
| CN | 101482785 | 7/2009 | |
| CN | 101523329 | 9/2009 | |
| CN | 101763193 A | 6/2010 | |
| CN | 101833393 | 9/2010 | |
| CN | 101868770 | 10/2010 | |
| CN | 102047088 | 5/2011 | |
| CN | 102084325 | 6/2011 | |
| CN | 102084328 | 6/2011 | |
| CN | 102144205 | 8/2011 | |
| CN | 102339166 | 2/2012 | |
| CN | 102426490 | 4/2012 | |
| CN | 1496549 | 10/2012 | |
| CN | 102713805 | 10/2012 | |
| CN | 102870080 | 1/2013 | |
| CN | 103097990 | 5/2013 | |
| DE | 102010007486 | 8/2011 | |
| EP | 2077490 | 7/2009 | |
| EP | 2202619 | 6/2010 | |
| EP | 2320309 | 5/2011 | |
| EP | 2357547 | 8/2011 | |
| EP | 2375306 | 10/2011 | |
| EP | 2381340 | 10/2011 | |
| EP | 2395414 | 12/2011 | |
| EP | 2648071 | 10/2013 | |
| JP | 2007034991 | 2/2007 | |
| KR | 101274123 | 6/2013 | |
| KR | 20130109288 | 10/2013 | |
| TW | 201314541 | 4/2013 | |
| WO | WO2011/024461 A1 * | 3/2011 | ............. G06F 3/041 |
| WO | WO2012161061 | 11/2012 | |
| WO | WO 13/169299 | 11/2013 | |
| WO | WO 13/169303 | 11/2013 | |
| WO | WO 13/169305 | 11/2013 | |
| WO | WO 13/188307 | 12/2013 | |
| WO | WO 14/017407 | 1/2014 | |
| WO | WO 14/018111 | 1/2014 | |
| WO | WO 15/020663 | 2/2015 | |

OTHER PUBLICATIONS

Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.

International Search Report and Written Opinion, dated Feb. 12, 2014, PCT/US2013/052006, 15 pages.

International Search Report and Written Opinion, dated Apr. 24, 2014, PCT/US2014/013206, 12 pages.

Technifast, "Blind Captive Nuts," Jun. 30, 2013, http://www.technifast.co.uk.

Pava et al., "Real Time Platform Middleware for Transparent Prototyping of Haptic Applications," 2004.

U.S. Appl. No. 13/766,736, filed Feb. 13, 2013, Wright et al.
U.S. Appl. No. 13/559,577, filed Jul. 26, 2012, Parivar et al.
U.S. Appl. No. 14/399,634, filed Nov. 7, 2014, Westerman et al.
U.S. Appl. No. 14/399,606, filed Nov. 7, 2014, Parivar et al.
U.S. Appl. No. 14/399,671, filed Nov. 7, 2014, Harley et al.
U.S. Appl. No. 14/404,156, filed Nov. 26, 2014, Degner et al.
U.S. Appl. No. 14/417,537, filed Jan. 26, 2015, Augenbergs et al.
U.S. Appl. No. 14/567,017, filed Dec. 11, 2014, Bard et al.
U.S. Appl. No. 14/550,845, filed Nov. 21, 2014, Pedder et al.
U.S. Appl. No. 15/612,922, filed Jun. 2, 2017, Pedder et al.

(56) References Cited

OTHER PUBLICATIONS

Product Specification Sheet: GEEPLUS, VIBRO1 Vibration Actuator, 2 pages, www,geeplus.biz, downloaded on Jul. 15, 2015.
U.S. Appl. No. 15/791,618, filing date Oct. 24, 2017, Wells et al.
U.S. Appl. No. 15/797,992, filing date Oct. 30, 2017, Kessler et al.

* cited by examiner

THRESHOLDS FOR DETERMINING FEEDBACK IN COMPUTING DEVICES

CROSS REFERENCE TO RELATED APPLICATIONS

This application is a continuation application of U.S. patent application Ser. No. 14/399,634, filed Nov. 7, 2014, and titled "Thresholds for Determining Feedback in Computing Devices," which is a 35 U.S.C. 371 application of PCT/US2013/000083, filed Mar. 15, 2013, and titled "Thresholds for Determining Feedback in Computing Devices," which claims priority to U.S. provisional application No. 61/645,033, filed May 9, 2012, and entitled, "Adaptive Haptic Feedback for Electronic Devices," to U.S. provisional application No. 61/665,603, filed Jun. 28, 2012, and entitled, "Adaptive Haptic Feedback for Electronic Devices," and to U.S. provisional application No. 61/681,098, filed Aug. 8, 2012, and entitled, "Adaptive Haptic Feedback for Electronic Devices," the contents of each are incorporated herein by reference in their entireties.

TECHNICAL FIELD

The present invention relates generally to electronic devices and more specifically, to varying output for a computing device based on location of a cursor.

BACKGROUND

Electronic devices may employ haptics to provide the user with a tactile output, for example in response to a particular input by the user, system state, or application instruction. As a specific example, some mobile electronic devices may include a track pad having a mechanical button that physically depresses in response to a user's press. These type of mechanical buttons may include a mechanical dome switch underneath the actual button. The feedback or output provided to the user is generated by the collapse of the dome switch. Similarly, other haptic devices may include actuators that produce a tactile response by mechanically vibrating the surface of the button. As with a mechanical button, these haptic devices generally provide an output that cannot be varied.

SUMMARY

One embodiment of the present disclosure may take the form of a computer for providing output to a user. The computer includes a processor and an input device in communication with the processor. The input device includes a feedback surface and at least one sensor in communication with the feedback surface, the at least one sensor configured to detect a user input to the feedback surface. The processor varies a down-stroke threshold based on a first factor and varies an up-stroke threshold based on a second factor. The down-stroke threshold determines a first output of the computing device, the up-stroke threshold determines a second output of the computing device, and at least one of the first factor or the second factor are determined based on the user input.

Another embodiment of the present disclosure may take the form of a method for varying an output of an electronic device. The method includes receiving, by a processor, a first sensor signal from an input device in communication with the electronic device; receiving, by the processor, a second sensor signal from the input device; enabling, by the processor, a first threshold for the input device and a second threshold for the input device. The first threshold determines a first output and the second threshold determines a second output.

Yet another embodiment of the present disclosure may take the form of a method for varying output of a computing device. The method includes receiving an input signal; determining, by a processor, a down-stroke threshold for providing a first output; determining, by the processor, an up-stroke threshold for providing a second output. At least one of the down-stroke threshold or the up-stroke threshold is determined based on the input signal and the up-stroke threshold is related to the down-stroke threshold.

DETAILED DESCRIPTION

Figure 1A:
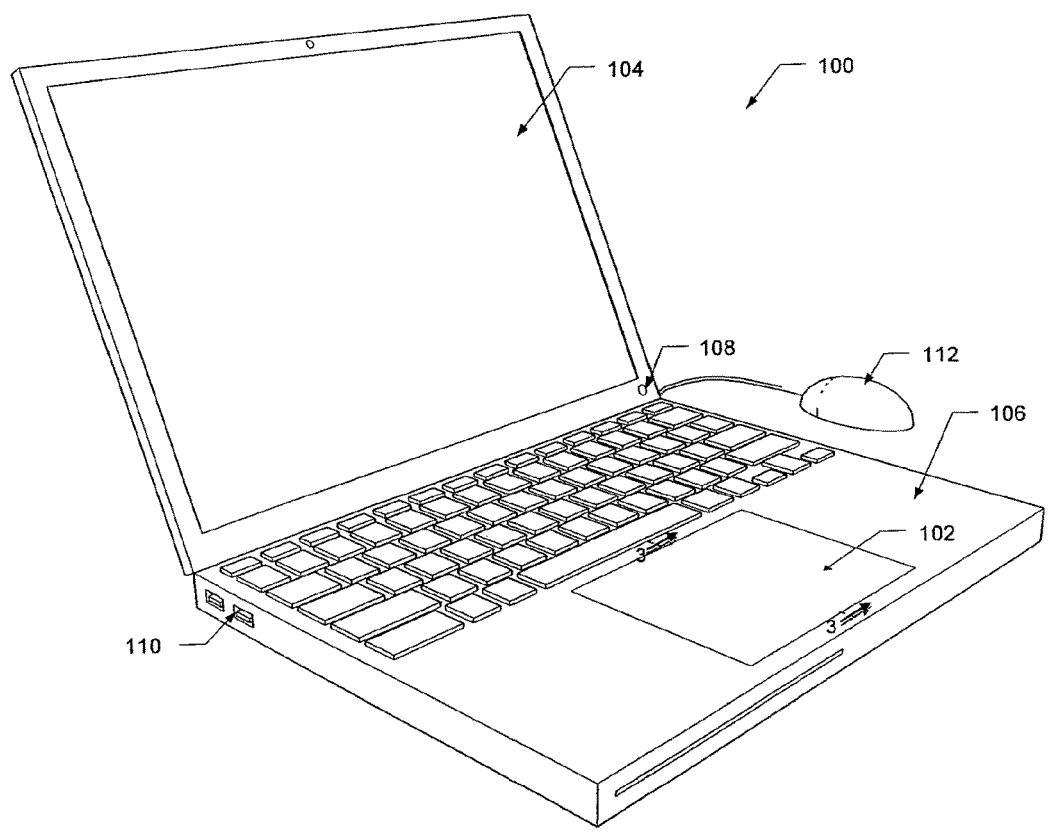
FIG. 1A is a perspective view of an electronic device incorporating a haptic device.

Some embodiments described herein may take the form of a haptic device for use with an associated electronic device. The haptic device may vary output provided to the user based on a number of different inputs to the haptic device. Additionally, the haptic device may vary one or more inputs provided to the computing device based on the user inputs. Inputs to the computing device may include a processor or device command based on a system state, application activity, sensor data, and so on. Thus, the haptic device may adapt the feedback, as well as the types of input provided to computer from the haptic device, based on one or more characteristics, settings, or inputs (as provided to a particular application). As another example, the haptic device may provide varying feedback depending on the particular application running on the electronic device, the force input member (e.g., index finger, thumb, palm of the user), the amount of input force, the speed or acceleration of the input force, the length of time of an input force, location of the electronic device, and/or various other types of data inputs that may be provided to the haptic device, to the electronic device, or a combination of both.

It should be noted that the data inputs to vary the output of the haptic device may be provided by a user, the haptic device, and/or the electronic device. For example, one type of input may be a user's input force, and another type of input may be based on an accelerometer within the electronic device. In addition to varying the feedback provided to a user, the haptic device and/or the processor of the electronic device may register different inputs to the haptic device differently. In other words, as the user varies his or her input to receive different types of feedback, those various inputs may also be registered by the system as different from one another. For example, the haptic device may provide a first type of feedback/output if a user uses his or her index finger to provide an input, and may then provide the device with a first input, and may register a second type of input and provide a second type of feedback if the user uses his or her thumb to provide an input. Continuing with this example, the electronic device may provide the two inputs to an application, where the first input may indicate a zoom action and the second input may indicate a save action.

The haptic device may be incorporated into an electronic device, such as a laptop computer, tablet computer, smart phone, digital music player, or the like. Alternatively, the haptic device may be separate from the electronic device, but in communication therewith (e.g., as an external component). The haptic device may include one more input sensors, a feedback surface, a biasing member, and/or an actuation member. In some embodiments, the input sensors may include one or more force sensors, location or touch sensors, and/or an acceleration sensor. The force sensors may be configured to determine an input force that may be exerted on the haptic device by a user, and the acceleration sensor may be configured to determine an input speed and/or acceleration of the input force exerted on the haptic device by the user. The touch sensors, which may be capacitive sensors, may determine the location of one or more touches by a user on the haptic device. The actuation member may be in communication with a processor and/or the input sensors and may move the feedback surface in response to one or more signals from the processor. For example, the actuator may be responsive to one or more input signals and move the feedback surface in various manners based on the one or more input signals. The biasing member or members may support the feedback surface on the electronic device and may bias the feedback surface to a first or rest position. For example, the biasing member may be a relatively resilient material, and after the actuation member has moved the feedback surface, the resiliency of the biasing member may return the feedback surface to the normal position.

The variable movement of the feedback surface due to the actuator may allow the output of the haptic device to be variable, as the various movements of the feedback surface may result in different outputs experienced by the user. For example, a first displacement may be perceived by a user as "light click" and a second displacement that is larger than the first displacement may be perceived by the user as a "strong click." Additionally, the input sensors may register different inputs for the haptic device, which may modify a data signal that may be transferred to the processor or other component of the electronic device. For example, if the user provides an input with his or her thumb, the haptic device may provide a data signal indicating the force input with the thumb. In some embodiments, the feedback provided by the haptic device may be adapted based on a user input to the haptic device or another input device (e.g., mouse for displaying a cursor), or based on a particular setting, application, sensor data, or the like.

Electronic Device Incorporating the Haptic Device

Figure 1B:
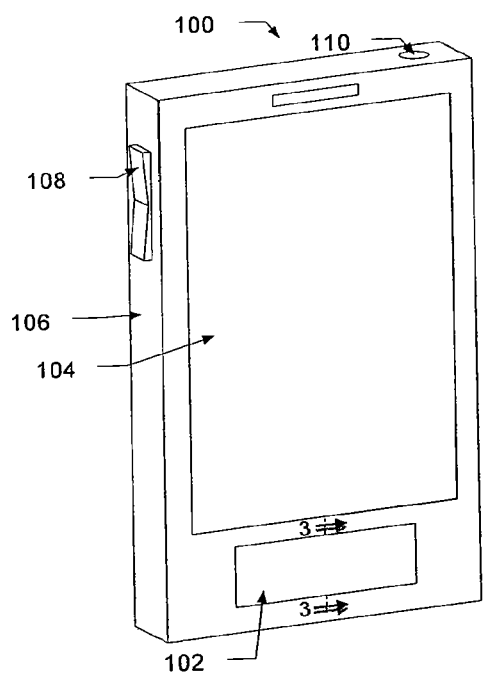
FIG. 1B is a perspective view of another example of an electronic device incorporating the haptic device.

The methods and devices described herein may be used with substantially any type of apparatus or device where haptic feedback may be desired. FIG. 1A is an isometric view of an exemplary electronic device 100 incorporating a haptic device 102. FIG. 1B is an isometric view of another example of the electronic device 100. As shown in FIG. 1A, the electronic device 100 may be a laptop computer and in FIG. 1B, the electronic device 100 is depicted as a smart phone or mobile electronic device. It should be noted that the electronic devices 100 illustrated in FIGS. 1A and 1B are illustrative only and substantially any other type of electronic devices, such as but not limited to, a computer, mobile phone, smart phone, digital music player, digital camera, calculator, personal digital assistant, television, and so on may be used.

With reference to FIGS. 1A and 1B the electronic device 100 may include the haptic device 102, an input member 108, a display 104, an input port 110, a keyboard 114 or other input device, one or more sensors 140, and an enclosure 106 at least partially surrounding select or all of the components of the electronic device 100.

The display 104 may provide an image or video output for the electronic device 100. The display 104 may be substantially any size and may be positioned substantially anywhere on the electronic device 100. In some embodiments, the display 104 may be a liquid display screen, plasma screen, light emitting diode screen, and so on. The display 104 may also function as an input device in addition to displaying output from the electronic device 100. For example, the display 104 may include capacitive touch sensors, infrared touch sensors, or the like that may capture a user's input to the display 104. In these embodiments, a user may press on the display 104 in order to provide input to the electronic device 100. in yet other embodiments, the display 104 may be separate from or otherwise external to the electronic device, but may be in communication therewith to provide a visual output for the electronic device.

The input member 108 (which may be a switch, capacitive sensor, or other input mechanism) allows a user to interact with the electronic device 100. For example, the input member 108 may be a button or switch to power on/off the device 100, alter the volume of a speaker, return to a home screen, and the like. The electronic device 100 may include one or more input members 108, and each input member 108 may have one or more input/output functions. Furthermore, as briefly mentioned above, in some embodiments, the input member 108 may be incorporated into the display 104, e.g., a capacitive touch screen as the display 104.

The enclosure 106 may form a portion of an exterior of the electronic device 100 and may at least partially surround select components, such as a processor, memory, and so on, of the electronic device 100. The enclosure 106 may be removable from the device 100, or may be substantially secured around the select components.

The input port 110 may be formed within or defined by the enclosure 106 and may electrically connect an external device (e.g., headphones, speakers, removable memory storage) to one or more internal components of the mobile computing device 100. The input port 110 is configured to receive an electrical connector for the electronic device 100. For example, the input port 110 may be configured to receive a power cord, a data cable (e.g., universal serial bus, fiber optic, tip ring sleeve connector, and the like), or a combination data and power cable. The electronic device 100 may include more than one input port 110 and each input port 110 may be positioned substantially anywhere on the electronic device 100.

Referring to FIG. 1A, the electronic device 100, via the input port 110, may also be in communication with one or more external devices 112. In some embodiments, the haptic device 102 may be incorporated into an external device 112, such as a mouse, track pad, joystick, or other input device.

Figure 2:
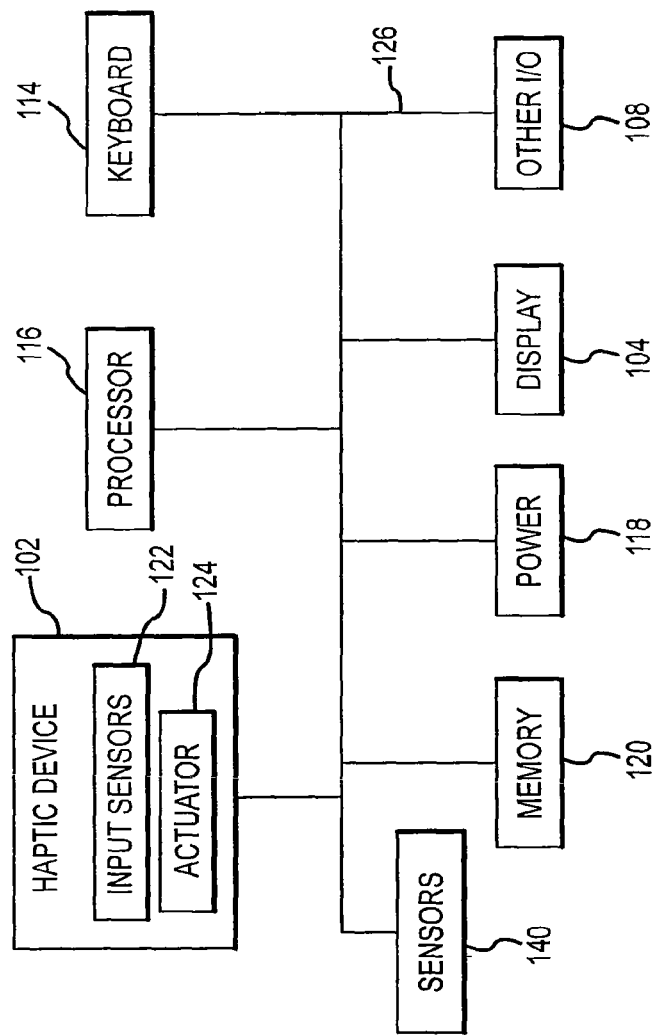
FIG. 2 is a block diagram of the electronic device of FIG. 1A.

FIG. 2 is a block diagram of the electronic device 100 including the haptic device 102. The electronic device 100 may include a processor 116, a power source 118, a memory component 120 all of which may be in communication by one or more system buses 126. The processor 116 may further be in communication with the haptic device 102 in order to control an actuator 124 for the haptic device 102 and/or receive data from one or more input sensors 122 of the haptic device 102, discussed in more detail below. The processor 116 may be substantially any electronic device cable of processing, receiving, and/or transmitting instructions. For example, the processor 116 may be a microprocessor or a microcomputer. Additionally, it should be noted that the processor 116 may include more than one processing member. For example, select components of the electronic device 100 may be controlled by a first processor and other components of the electronic device 100 may be controlled by a second processor, where the first and second processors may or may not be in communication with each other.

The memory 120 may store electronic data that may be utilized by the electronic device 100. For example, the memory 120 may store electrical data or content e.g., audio files, video files, document files, and so on, corresponding to various applications. In some embodiments, the memory 120 may store user settings with respect to the haptic device 102, these type of settings is discussed in more detail below. The memory 120 may be, for example, non-volatile storage, a magnetic storage medium, optical storage medium, magneto-optical storage medium, read only memory, random access memory, erasable programmable memory, flash memory, or a combination of one or more types of memory components.

The electronic device 100 may also include one or more sensors 140, in addition to the input sensors 122 of the haptic device 102. The sensors 140 may provide substantially any type of input to the electronic device 100. For example, the sensors 140 may be one or more accelerometers, gyroscopes, light sensors, image sensors (such as a camera), force sensors, and so on. The sensors 140 may be used in combination with the input sensors of the haptic device to vary the output of the haptic device 102, which is discussed in more detail below.

Figure 3:
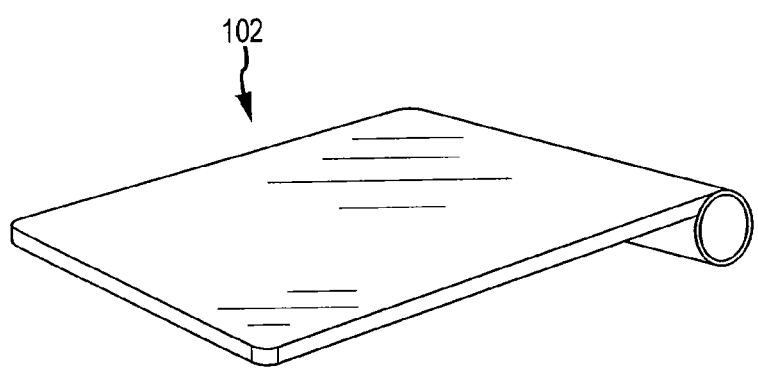
FIG. 3 is a top perspective view of an example of the haptic device separate from an electronic device.

It should be noted that FIGS. 1A-2 are exemplary only. In other examples, the electronic device may include fewer or more components than those shown in FIGS. 1A-2. Additionally, the illustrated electronic devices are only exemplary devices incorporating the haptic device 102. In other embodiments, the haptic device 102 may be incorporated into substantially any type of device that provides haptic feedback to a user. FIG. 3 is a top perspective view of the haptic device 102 as a standalone component. In this embodiment, the haptic device 102 may be separate from the electronic device 100, but may be in communication therewith. For example, the haptic device 102 may include a transmitting and/or receiving member to transmit data and/or power to the electronic device 100 wirelessly or through a wired connection. Additionally, in the FIG. 3 embodiment, the haptic device 102 may further include a processor and/or input sensors or may be in communication with the processor and input sensors of the electronic device.

The Haptic Device

Figure 4:
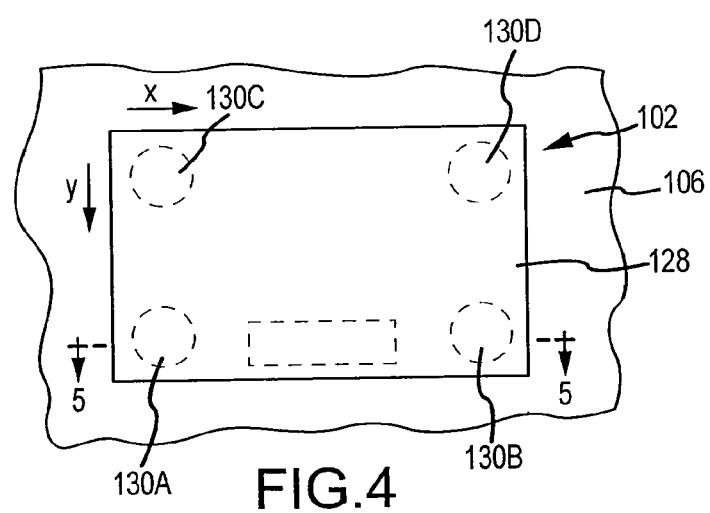
FIG. 4 is an enlarged top plan view of the haptic device of FIG. 1A.
Figure 5:
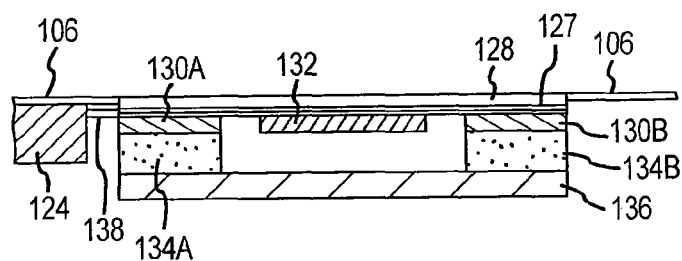
FIG. 5 is a cross-sectional view of the electronic device of FIG. 1 taken along line 5-5 in FIG. 3.
Figure 6:
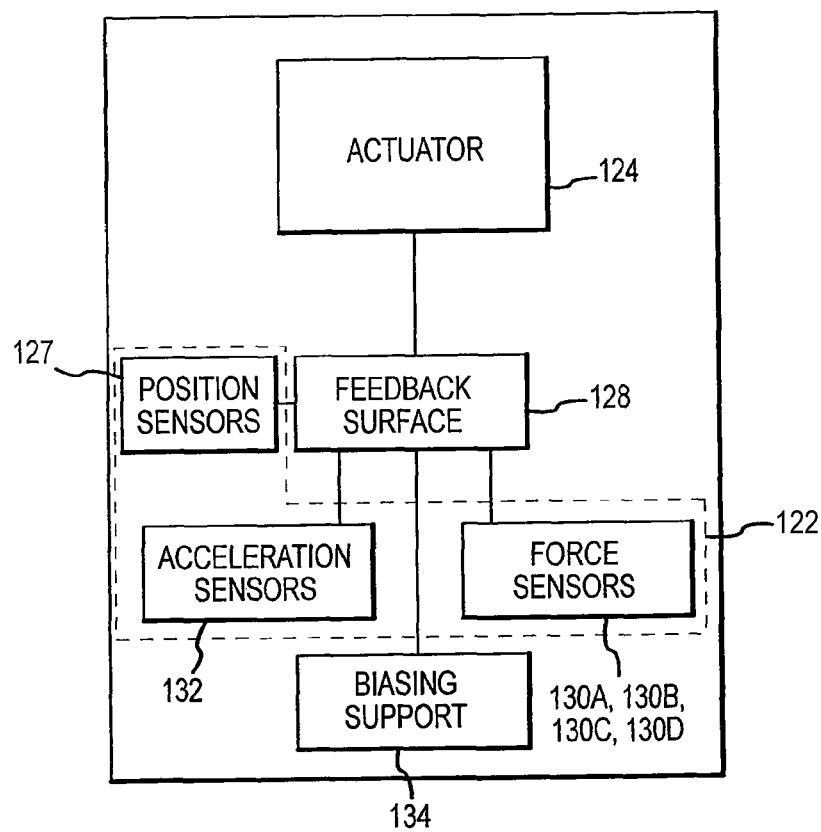
FIG. 6 is a simplified block diagram of the haptic device.

The haptic device 102 will now be discussed in more detail. FIG. 4 is an enlarged top plan view of the electronic device 100 illustrating the haptic device 102. FIG. 5 is a cross-sectional view of the haptic device 102 of FIG. 4 taken along line 5-5 in FIG. 4. FIG. 6 is a block diagram of the haptic device 102. The haptic device 102 selectively provides output or feedback to a user by moving, vibrating, or otherwise alternating a feedback surface 128. The haptic device 102 may include the actuator 124 operably connected to the feedback surface 128. Additionally, the haptic device 102 incorporates the input sensors 122 which may include one more force sensors 130A, 130B, 130C, 130D, position sensors 127, and one or more acceleration sensors 132. The haptic device 102 may also include one or more biasing supports 134A, 134B, 134C, 134D to secure and support the haptic device 102 to the electronic device 100.

The haptic device 102, when included within the electronic device 100, may be substantially surrounded by the enclosure 106. The haptic device 102 may include a feedback surface 128 that may be supported by the one or more biasing supports 134A, 134B, 134C, 134D above a substrate 136 or other support surface for the electronic device 100. The input sensors 122 may include one or more force sensors 130A, 130B, 130C, 130D as well as one or more acceleration sensors 132. The input sensors 122 and may be positioned beneath, adjacent, or on top of the feedback surface 128. In some embodiments, the input sensors 122 may be integrated into the feedback surface 128.

The haptic device 102 may further be operably connected to the actuator 124. The actuator 124, which will be discussed in more detail below, selectively moves the feedback surface 128 to provide feedback to a user. The actuator 124 may be operably connected to the feedback surface 128 by one or more connection members 138.

Referring to FIGS. 2, 5, and 6, the actuator 124 may receive one or more electrical signals from the processor 116 or other controlling element and those signals may be converted into mechanical movement by the actuator 124. For example, the actuator may be a solenoid actuator including a wire wound around a moveable iron core, and as a current passes through the wire coil, the iron core may move correspondingly. Specifically, the electric current through the wire may create a magnetic field. The magnetic field may then apply a force to the core or plunger, to either attract the core. In these embodiments, the actuator may also include a spring or biasing member which may return the core to its original position after the magnetic field is removed. In other embodiments, the actuator 124 may be an electromagnet, or a series of magnets that are selectively energized to attract or repeal the feedback surface 128.

In embodiments where the actuator 124 is a solenoid or electromagnet it may be configured to respond to one or more waveforms, which may vary the mechanical output of the actuator 124. For example, the various waveforms may vary the current through the wire, and thus may vary the magnetic field created. By changing the magnetic field different types of linear mechanical movements may be created. Different waveforms for the actuator 124 to create different feedback output by the haptic device 102 will be discussed in more detail below with respect to FIGS. 21-21D.

It should be noted that in other embodiments, the actuator 124 may be a mechanism for creating mechanical movement other than a solenoid actuator. For example, the actuator 124 may be a motor, servo, series of magnets, or the like. As a specific example, the actuator may be a series of bar electromagnets with alternating poles that may be used to mechanically move the feedback surface 128.

In some embodiments, the actuator 124 may selectively move the feedback surface 128 linearly, e.g., along the X axis and/or the Y axis illustrated in FIG. 4. In other words, the feedback surface 128 may translate horizontally but may not move vertically with respect to the enclosure 106. In other embodiments, the actuator 124 may move the feedback surface 128 vertically or a combination of vertically and linearly. However, in embodiments where the actuator 124 may move the feedback surface 128 linearly, a user in contact with the feedback surface 128 may perceive the movement of the feedback surface 128 as being vertical in nature. This is because the feedback surface 128 may move linearly a small distance or may move very quickly. Sufficiently small lateral displacements can be experienced by the user as vertical movement. Such embodiments may have a thinner height than a haptic device employing vertical displacement.

Furthermore, because the feedback surface 128 may move linearly, the height required for the haptic device 102 may be reduced, as compared with haptic devices that require movement to produce feedback. This is because the enclosure 106 height may not have to accommodate a vertical travel distance for the feedback platform 128. Further, in these embodiments, the enclosure 106 may extend over a portion of the feedback surface 128 to better protect internal components of the electronic device 100 from debris or other elements. This is possible because the feedback surface 128 may only need to translate beneath the enclosure 106 (and not above it) to provide feedback to a user.

In yet other embodiments, the actuator 124 may move the feedback surface 128 in the vertical direction or a combination of vertical and linear directions.

Figure 7A:
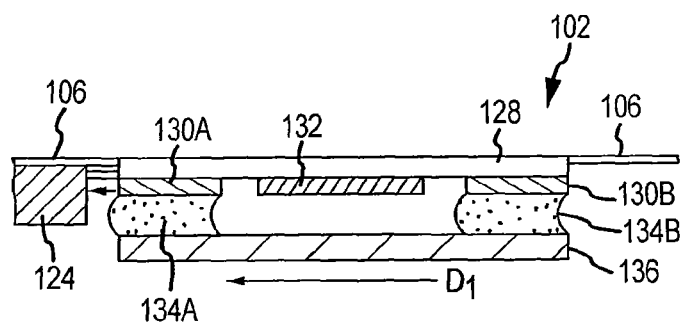
FIG. 7A is a cross-sectional view of the haptic device as a feedback surface is moved in a first direction D1 by an actuator.

FIG. 7A is a cross-sectional view of the haptic device 102 as the feedback surface 128 is moved in a first direction D1 by the actuator 124. As shown in FIG. 7A, the actuator 124 may provide a force to the feedback surface 128 (or other portions of the haptic device 102) to move the feedback surface 128 a predetermined distance in the first direction D1. The travel length in the first direction D1 may depend on the desired feedback. In some embodiments, the actuator 124 move the feedback surface 128 in more than one direction. For example, the actuator 124 may displace the feedback surface 128 and then provide a second force to return the feedback surface 128 to its original position. However, in other embodiments, the biasing supports 134A, 134B, 134C, 134D may provide a biasing force that may return the feedback surface 128 to its original position.

It should be noted that in other embodiments, the actuator 124 be configured to move the feedback surface 128 in other manners, e.g., vertically. In yet other embodiments the actuator 124 may move the feedback surface 128 both in the vertical and horizontal directions.

With reference to FIGS. 4 and 5, in some embodiments, the feedback surface 128 may be a relatively rectangular shape or square shape and a force sensor 130A, 130B, 130C, 130D may be positioned beneath each corner or adjacent each corner of the feedback platform 128. In these embodiments, the force sensors 130A, 130B, 130C, 130D may determine a force input applied to substantially any portion of the feedback surface 128. An example of using the force sensors 130A, 130B, 130C, 130D to determine one or more input forces to the feedback surface 128 is discussed in more detail below with respect to FIGS. 13A-14.

In other embodiments, the feedback surface 128 may be differently shaped and/or may include fewer or more force sensors 130A, 130B, 130C, 130D. For example, the haptic device 102 may include a single force sensor positioned at a center of the feedback surface 128 and/or may include multiple force sensors positioned around a perimeter of the feedback surface 128. The location and number of the force sensors 130A, 130B, 130C, 130D may be determined based on the desire sensitivity of force input desired to be captured by the haptic device 102. Thus, if a more force sensitive haptic device 102 is desired, more force sensors 130A, 130B, 130C, 130D may be included.

The force sensors 130A, 130B, 130C, 130D may be substantially any type of sensor capable of detecting an exerted force. In some embodiments, the force sensors 130A, 130B, 130C, 130D may be strain gauges. In other embodiments, the force sensors 130A, 130B, 130C, 130D may be substantially any other type of sensor configured to detect changes in force applied to a surface.

The position or touch sensors 127 may be configured to detect an input location on the feedback surface 128. In some embodiments, the position sensors 127 may be one or more capacitive sensors. For example, the haptic device 102 may include a grid of electrodes operably connected to the feedback surface 128 and configured to detect an input signal, such as a change in capacitance or other electrical change. Capacitive sensing grids for sensing are generally known in the art, and by using a scanning technique the capacitive sensing grids can detect multiple touches on a surface substantially simultaneously. However, in other embodiments other position sensors may be used, such as a light sensors that detect disruption in light signals, piezoelectric sensors positioned on the feedback surface 128, or acoustic sensors which detect position based on sound waves, and so on.

The acceleration sensor 132 may detect an acceleration of a user input. For example, the acceleration sensor 132 may be an accelerometer that detect how quickly a user may press on the feedback surface 128 based on an acceleration of the feedback surface 128 (to which it may be operably connected). Further, although the actuator 124 may not move the feedback surface 128 vertically, the biasing supports 134A, 134B, 134C, 134D may have some resiliency so that the acceleration sensor 132 may move slightly due to an input force in order to better detect the acceleration of the input force.

With reference to FIG. 5, the biasing supports 134A, 134B, 134C, 134D may support and operably connect the haptic feedback surface 128 to the substrate 136 or other support surface of the electronic device 100. In some embodiments, the haptic device 102 may include four biasing supports 134A, 134B, 134C, 134D which each may be operably connected to a respective corner of the feedback surface 128. In these embodiments, the biasing supports 134A, 134B, 134C, 134D may be operably connected to the feedback surface 128 at a location substantially adjacent to the location of the force sensors 130A, 130B, 130C, 130D.

The biasing supports 134A, 134B, 134C, 134D provide a biasing force to the feedback surface 128 to return the feedback surface 128 to a normal or first position. The biasing supports 134A, 134B, 134C, 134D may be substantially any member capable of providing a biasing or return force to the feedback surface 128. In some embodiments, the biasing supports 134A, 134B, 134C, 134D may be a relatively flexible and resilient member, such as a gel. In this example, the gel may be a silicon based gel, that may be positioned around the sides of the feedback surface 128. In other embodiments, the biasing supports 134A, 134B, 134C, 134D may be one or more springs spanning between the substrate 136 and the feedback surface 128, rubber material, or other types of flexible yet resilient materials. In yet other embodiments, the haptic device 102 may use a magnetic force from one or more magnets to return the feedback surface 128 to its original position.

Figure 7B:
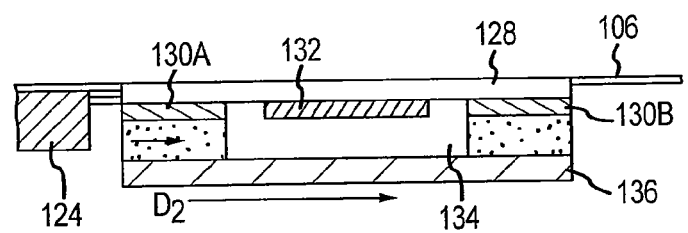
FIG. 7B is a cross-sectional view of the haptic device after the actuator has provided a force to the feedback surface.

With reference to FIG. 7A, due to the flexible nature of the biasing supports 134A, 134B, 134C, 134D, as the actuator 124 applies a force to pull the feedback surface 128 in the first direction D1, the biasing supports 134A, 134B, 134C, 134D may deform or flex in the first direction. It should be noted that the force applied to the feedback surface 128 by the biasing supports 134A, 134B, 134C, 134D may be less than a force applied by the actuator 124, such that the actuation force may overcome the biasing force to move the feedback surface 128 in the first direction. However, after the actuation force is removed, the biasing supports 134A, 134B, 134C, 134D may return the feedback surface 128 to its original position. FIG. 7B is a cross-sectional view of the haptic device 102 after the actuator 124 has provided a force to the feedback surface 128. After the actuator 124 has ceased providing a return force to the feedback surface 128, the biasing support 134 may resiliently return to the normal position. In other words, the biasing supports 134A, 134B, 134C, 134D may provide a force to the feedback surface 128 to move the feedback surface 128 in a second direction D2. As the biasing supports 134A, 134B, 134C, 134D return to their original shape, the feedback surface 128 may be positioned in the original or normal position.

Although the biasing supports 134A, 134B, 134C, 134D are shown as four separate members, in some embodiments, the biasing supports 134A, 134B, 134C, 134D may be a single integral member. In other embodiments, one or more of the biasing supports 134A, 134B, 134C, 134D may be omitted and the haptic device 102.

It should be noted that the concepts and devices disclosed herein may be used or otherwise incorporated into components other than track pads or moving elements. For example, the force sensors may be used to sense force inputs as applied to a cover glass of a display (such as a touch sensitive display) and/or to an enclosure of a device. In these instances, certain elements of the disclosure, discussed in more detail below, may be implemented although the select device or mechanism may not have a haptic or user output component. As a specific example, the force sensors may be incorporated into a cover glass for a capacitive touch display (such as for a tablet or smartphone), and may be used to determine one or more forces correlating to one or more user inputs. However, in this example, the cover glass may not provide haptic output to the user; for instances, the cover glass may not move or vibrate. Thus, although the term feedback surface is described with respect to a haptic device, in some embodiments, the surface may be incorporated into non-moving or other non-haptic devices.

Thresholds to Determine Feedback

Figure 8A:
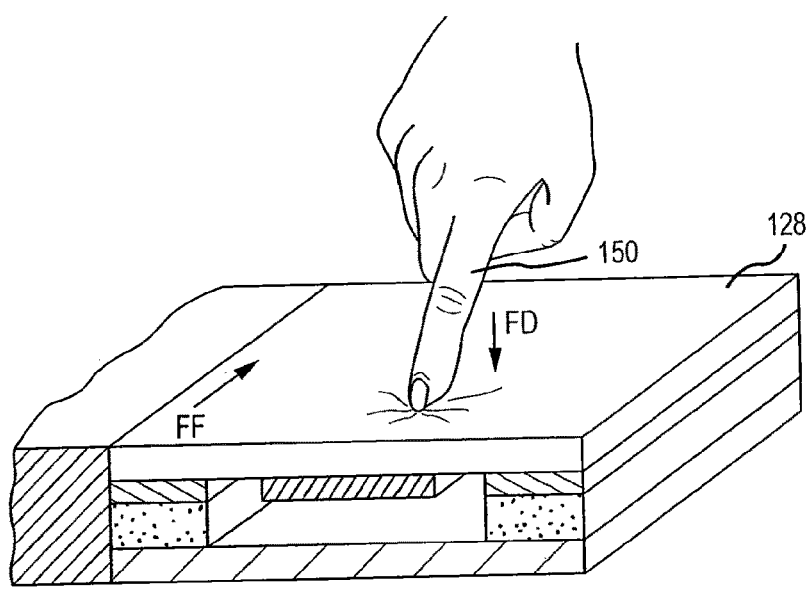
FIG. 8A is a perspective cross-section view of the haptic device similar to FIG. 5, illustrating a user providing an initial input force to the feedback surface.
Figure 8B:
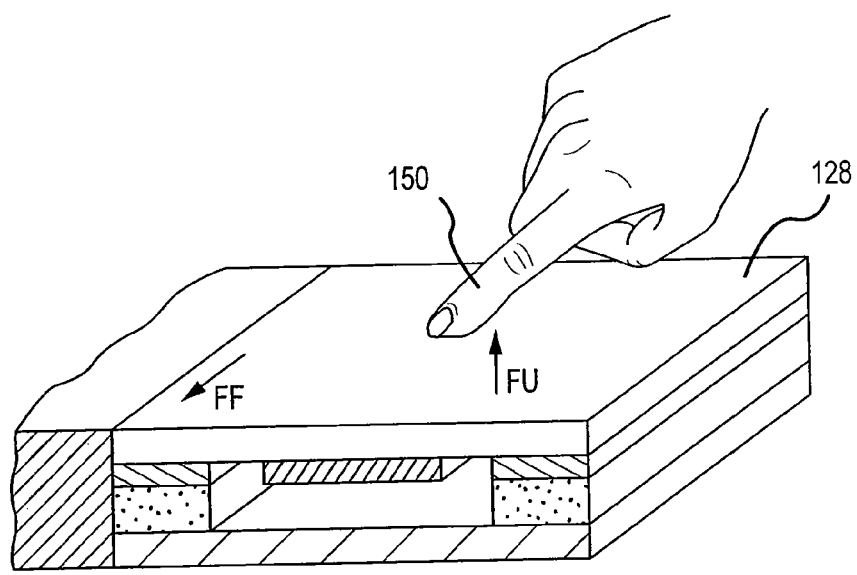
FIG. 8B is similar to FIG. 8A, but illustrates the user as he or she reduces or removes the initial input force.

In some embodiments, the haptic device 102 may be used to vary feedback to a user based on one or more characteristics of a user input. As discussed above with respect to FIGS. 4 and 5, the feedback surface 128 may be moved by the actuator 124 in order to provide feedback to a user. FIG. 8A is a perspective cross-section view of the haptic device 102 similar to FIG. 5, illustrating a user providing an initial input force to the feedback surface 128. FIG. 8B is similar to FIG. 8B, but illustrates the user as he or she reduces or removes the initial input force. The haptic device 102 may be configured to provide the feedback force FF (e.g., move the feedback surface 128) in response to a user input or down stroke FD on feedback surface 128. Additionally, the haptic device 102 may also provide a feedback force FF in response to a user input releasing the force or up-stroke force FU. It should be noted that the feedback force FF is illustrated as being in the horizontal direction, but as discussed above, the horizontal movement of the feedback surface 128 may actually be experienced by user as being in the vertical direction.

It should be noted that the term "feedback force" as referred to herein is intended to refer to a magnitude of feedback, regardless of the type or direction of the force. Similarly, the terms down-stroke and up-stroke force are intended to refer to an initial input provided by the user and a secondary input provided by the user, respectively. In some embodiments, the initial user force and the second input force may be in a direction other than "down" or "up" respectively. As such, the terms "down-stroke" and "up-stroke" are used only in reference to a single embodiment for ease of explanation and are not meant to limit the claims in any way. Additionally, the term "input force" is intended to refer to either or both of the down-stroke force and the up-stroke force, as well a combination of both the down-stroke and up-stroke forces, as appropriate. Returning to FIGS. 8A and 8B, in a specific example, a down-stroke may be a user provided initial input force, such as pressing downwards on the feedback surface 128 and an up-stroke force FU may be generated by a user providing a secondary input force when he or she releases or pulls his or her finger up from the feedback surface 128. In these embodiments, the up-stroke force FU may be a negative force value or a reduction in applied force.

With reference to FIGS. 8A and 8B, in one example, a user 150 (through his or her finger, fingers, or other objects) may provide a down-stroke force FD to the feedback surface 128. In other words, the user 128 may press downwards onto the top side of the feedback surface 128. As the user 128 provides the down-stroke force FD, input sensors 122 of the haptic device 102 may sense the force magnitude, as well as an acceleration of the force FD applied to the feedback surface 128.

As the user 150 presses on the feedback surface 128, the haptic device 102 provides the feedback force FF. The feedback force FF may be correlated to the down-stroke force FD, this correlation will be discussed in more detail with respect to FIG. 9. Briefly, the feedback force FF may be correlated to the down-stroke force FD such that that the magnitude of the feedback force FF may be related to the down-stroke force FD in a variety of manners. For example, the feedback force FF may be the same, opposite, related to by a function, and so on, to the down-stroke force FD. The amount of feedback may be varied depending on a desired user setting, an application, or other predetermined amount. The feedback force FF may be the same type of force as applied by the user 150, e.g., a pressure force, or may be a different type of feedback force FF, such as a movement force. For example, the feedback force FF may be in an opposite direction to the down-stroke force FD, or may be a different type of feedback altogether, e.g., temperature, vibration, or the like.

With reference to FIG. 8B, as the user 150 releases or ends his or her down-stroke force FD, the user's 150 input may transition into an up-stroke force. For example, as the user 150 pulls his or her finger away from the feedback surface 128 or reduces the force applies to the feedback surface 128, the down-stroke force FD transitions to an up-stroke force FU or up-click. For example, the up-stroke force FU may be a negative or decreasing force amount.

As the user provides an up-stroke force FU, the input sensors 132 sense the force and communicate with the processor 116 and/or actuator 124. The actuator 124 may then move the feedback surface 128 to provide a second feedback force FF to the user 128. This feedback force FF may correspond to the up-stroke force FU, and as discussed with respect to the down-stroke FD, the feedback force FF may be correlated to the up-stroke force FU in a variety of manners and may provide feedback that is similar, different, opposite or related to the input.

Figure 9:
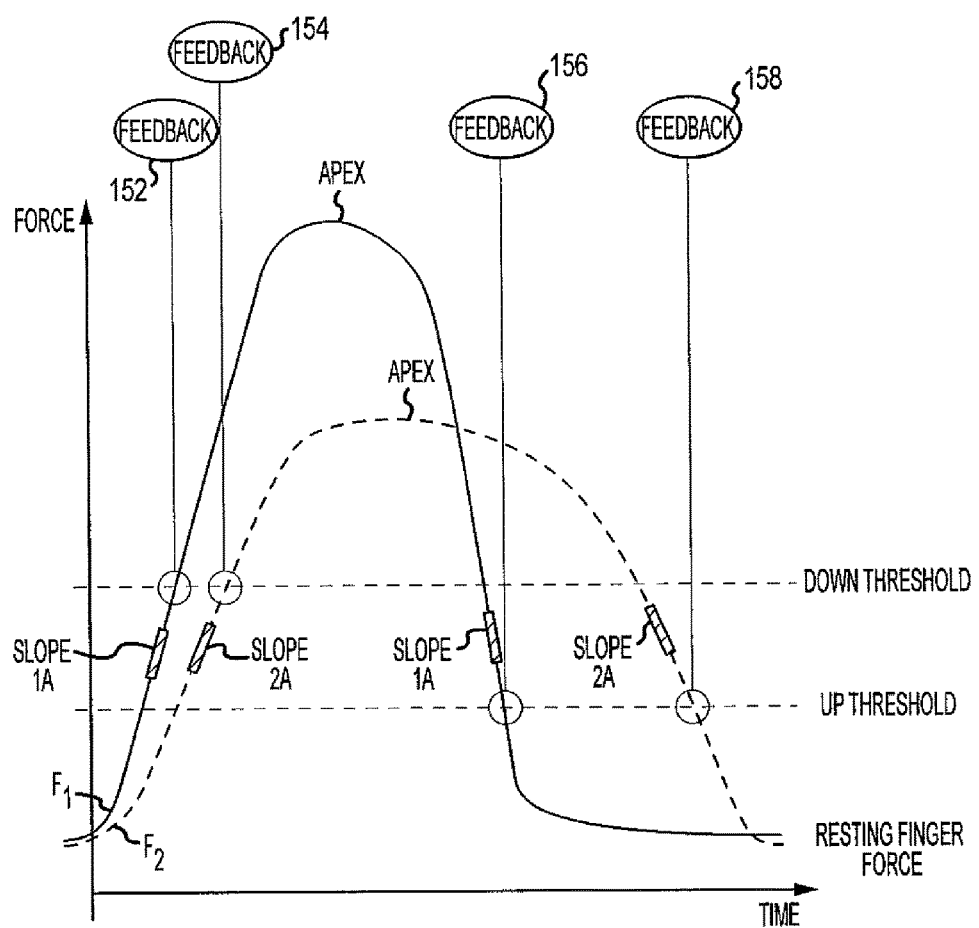
FIG. 9 is a graph illustrating force magnitude over a period of time for two separate user inputs.

In some embodiments, the haptic device may vary the feedback provided to the user based on different characteristics of the user input. Accordingly, during use, the total magnitude of the down-stroke force FD and the up-stroke force FU may be varied by the user, additionally a rate that the forces are applied (e.g., how quickly/slowly each force is applied) may also be varied. FIG. 9 is a graph illustrating force magnitude over a period of time for two separate user inputs. The solid line F1 represents a user input having a large overall input force where the input force that is applied and released quickly. The dashed line F2 represents a user input with a lower overall input force magnitude (as compared to the solid line), and a user force that is applied and released slower than the dashed line. It should be noted that in FIG. 9 the two forces lines F1, F2 are represented as generally bell-shaped curves, in that they extend upwards from a low force level to an apex, and then extend back down to a low force level. However, the force lines F1, F2 may be differently shaped depending on how the user 150 may apply a force to the feedback surface 128.

The rate at which the user 150 provides a force to the haptic device 102 may be varied between different users, a single user using different applications, and so on. For example, a user may press downwards on the feedback surface 128 more forcefully and rapidly while playing a video game, versus when he or she is using a web browser. Accordingly, the haptic device 102 may vary the feedback provided to the user 150 base on the force amount, as well as the rate or acceleration at which the force is applied. In this manner, two users may apply the same amount of force but a first user may apply that force at a faster acceleration than the second user, and so the feedback each user may be varied although the total magnitude of the applied force was the same.

Referring again to FIG. 9, each of the user force lines has a slope as it increases and decreases. The slope of the solid line F1 as it increases is represented on FIG. 9 as slope 1A, and the slope of the dashed line F2 as the force increases is represented as slope 2A. Similarly, the slope of the solid line as the force decreases is represented by slope 1B and the slope of the dashed line as the force decreases is represented by 2B. The slopes 1A, 1B, 2A and 2B of the force lines F1 and F2 determine the rate that the force is applied or reduced, in other words the change of force over the change in time (dF/dt). The slopes 1A, 1B, 2A, and 2B of each of the lines may be varied depending on the portion of the line where the rate is desired, accordingly, it should be appreciated that the slopes change as the force input changes.

The haptic device 102 may provide feedback to the user at a predetermined point along the down-stroke and up-stroke forces. In one embodiment, the haptic device 102 may provide a feedback response at a down threshold and at an up threshold of the force of the user 150. As shown on FIG. 9, the down threshold and the up threshold may be selected based on a particular force level of the user. In other words, the down threshold and the up threshold may be selected to be activated when the user force reaches a certain force magnitude, either positively or negatively. Specifically, the down threshold may be a force level of a user's down-stroke force FD on the feedback surface 128 and the up threshold may be a particular force level during the user's up-stroke FU on the feedback surface 128.

The locations of the down threshold and the up threshold may be varied depending on applications, user settings, user motion, and so on. For example, if the user is moving the cursor very quickly either one or both the down threshold and the up threshold may be increased so that the haptic device 102 may require a greater absolute value of force applied by the user to receive feedback from the haptic device 102.

The down threshold may be crossed as a user may increases his or her applied force to the feedback surface 128 towards the threshold. The up-threshold may be crossed as the user 150 decreases the force applied to the feedback surface 128. For example, the user may decrease the force applied to the feedback surface 128 as he or she lifts his or her finger off of the feedback surface 128.

With reference to FIG. 9, as the applied or input force (represented by the dashed and solid lines F1 and F2) reach the down threshold, the haptic device 102 provides feedback to the user 150. For example, as the user is pressing on the feedback surface 128 and the applied force or down-stroke force FD reaches the predetermined particular magnitude of the down threshold, the actuator 124 moves the feedback surface 128, providing the feedback force FF. The feedback force FF may be correlated to the velocity of down-stroke force FD applied over time (dF/dt), which will be discussed in more detail below. Because the feedback force FF may be correlated to the rate at which the down-stroke force FD is applied, the two different forces lines F1, F2 may trigger a different feedback force FF or haptic response pattern, although the force thresholds may be identical in terms of magnitude (e.g., absolute force applied to the input or feedback surface). In other words, because the slopes 1A and 2A of the two force lines F1 and F2 are different, the feedback force FF response may be different for each of the two force lines F1, F2 despite that the down-threshold may be activated at the same overall force magnitude.

It should be noted that the haptic response or output of the haptic device 102 may vary both in terms of the output and the output waveform shape, pattern, and so on. Further, although the thresholds are discussed in terms of force, the thresholds may be tied to other behaviors of the haptic device. For example, the thresholds may be set based on input time, input speed, or the like.

With continued reference to FIG. 9, as the user 150 completes the down-stroke, the applied force decreases. For example, as the user 150 may transition from applying a force to lift his or her finger off of the feedback surface 128, the applied force decreases. As shown in FIG. 9, at the force peak or apex, the dashed and solid lines F1, F2 transition back towards a lower level of force. The force lines F1, F2 have a slope 1B, 2B respectively that correspond to the rate of change of the decreasing force over the rate of time. In some instances, the slopes 1A and 2A will be approximately the same, if not the same, as the slopes 1B and 2B, respectively. However, in other embodiments, the slopes of the down-stroke 1A and 2A may be different than the strokes of the up-stroke 1B and 2B.

As the applied force by the user 150 continues to decrease, for example, as the user 150 continues to remove his or her finger from the feedback surface 128, the applied force reaches the up threshold. At the up threshold, the haptic device 102 may provide feedback to the user 150. For example, the actuator 124 may move the feedback surface 128 to provide a "click" or other haptic response.

Accordingly, in some embodiments, the haptic device 102 may provide two separate feedback outputs for the user 150. The first feedback 152, 154 may be as the user initially provides an input, e.g., down-stroke force FD, to the feedback surface 128 and reaches the down-threshold. The second feedback 156, 158 may be as the user releases or decreases the pressure on the input surface 126, e.g., the up-stroke FU. The dual feedback may enhance the user's experience with the haptic device 102. For example, the user 150 may receive feedback as his or her input is initially received and as he or she releases/decreases his or her input. Furthermore, because the provided feedback may vary based on the slopes 1A, 2A, 1B and 2B of the force lines F1, F2, the user 150 may receive varying feedback at each point based on certain characteristics of the user's input, such as the peak force exerted, total force exerted, how quickly (or slowly) he or she applied the force, and so on. Thus, if the user 150 initially applies a down-stroke force FD quickly and slowly applies an up-stroke force FU (such as quickly pressing a finger on the feedback surface 128 and then slowly removing the finger), the feedback force FF at the first feedback 152, 154 may be quicker and/or more intense then the feedback force FF experienced by the user during the second feedback 156, 158. However, it should be noted that in some embodiments, the feedback force FF may only be applied at a single point along the force lines F1, F2, or may be applied at multiple times along the forces lines F1, F2, depending on the desired haptic feedback. For example, the feedback force FF may be initiated at various force thresholds along the input forces. In short, the feedback forces FF can each be different from each other.

Figure 10:
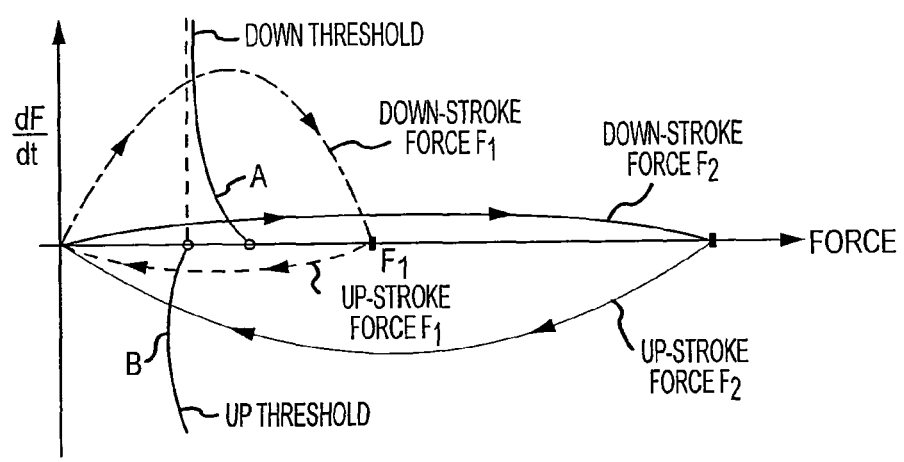
FIG. 10 is a graph illustrating the applied force (e.g., the force lines F1, F2) as a function of its slope dF/dt.

As described above, in some examples, the down-stroke threshold and the up-stroke threshold may be a function of the force as well as the rate that the force is applied. FIG. 10 is a graph illustrating the applied force (e.g., the force lines F1, F2) as a function of its slope dF/dt. The down-stroke and up-stroke thresholds may be represented as lines A, and B, respectively. As the respective force lines F1, F2 representing two different forces in FIG. 9 intersect lines A and B, the feedback force FF is provided to the user 150.

The threshold lines A and B may be positioned substantially anywhere along the force axis. However, as shown in FIG. 10, in some instances, the up-stroke threshold may be positioned to the left of the down-stroke threshold on the force axis in FIG. 10. In other words, the up-threshold may be crossed at a lower force magnitude than the down-threshold. This is because the up-stroke force may typically be the negative result of the down-stroke force FD, accordingly it may typically be less than or at least the same absolute value as the down-stroke force FD. Therefore, in order for the haptic device 102 to provide a feedback force FF for a particular user up-stroke force FU, the up-stroke threshold may be a lesser absolute magnitude that the down-stroke threshold. In other words, the up-stroke threshold may be a percentage of the down-stroke force FD when the down-stroke threshold was crossed. For example, the up-stroke threshold may be set between 70-90% of the down-stroke force FD when the down-stroke threshold was crossed. In these embodiments, as long as the down-stroke threshold is crossed, the up-stoke threshold should be crossed, to ensure the user may be provided feedback in both the down-stroke and up-stroke inputs.

Figure 11:
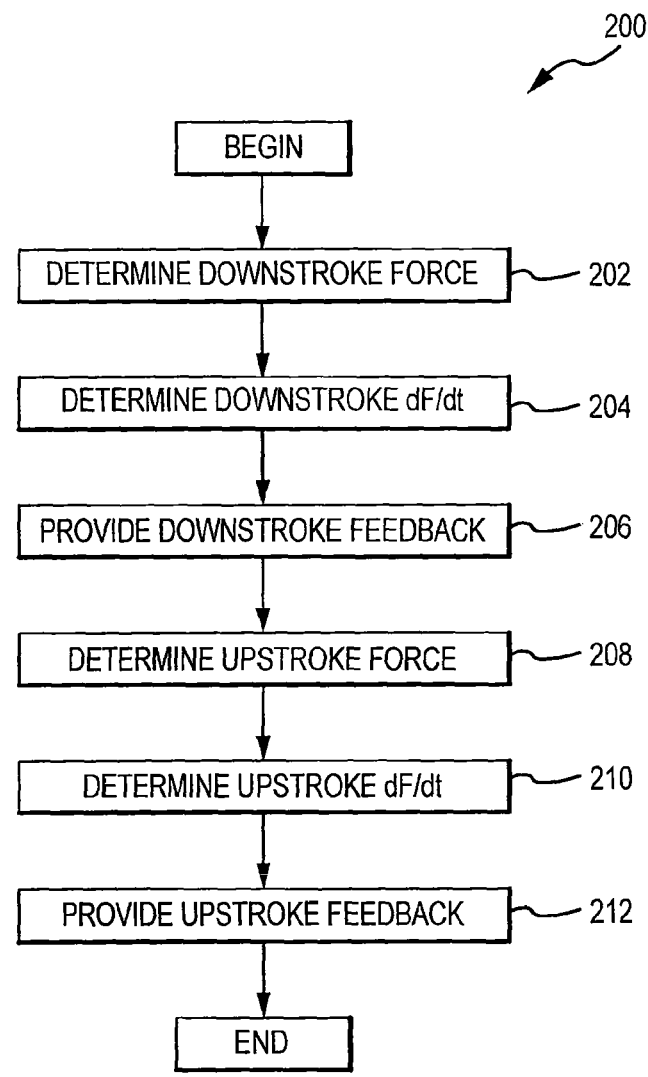
FIG. 11 is a flow chart illustrating an exemplary method for providing feedback to a user based on both a down-stroke force and an up-stroke force.

As described above with respect to FIGS. 9 and 10, the haptic device 102 may provide a user feedback which may be related to the applied force (down-stroke and up-stroke forces) as well as a rate of application of the applied force. FIG. 11 is a flow chart illustrating an exemplary method for providing feedback to a user based on both a down-stroke force and an up-stroke force. The method 200 may begin with operation 202 and the down-stroke force FD applied by the user 150 is determined. For example, the input sensors 132 may detect or sense the down-stroke force FD as the user 150 applies a force to the feedback surface 128. After the down-stroke force FD is determined, the method 200 may proceed to operation 204 and the processor 116 may determine the rate that the down-stroke force FD is applied, that is, determine the dF/dt or slope of the down-stroke force FD.

Once the processor 116 has determined the rate dF/dt of the down-stroke force FD, when the down-stroke force FD has reached the down-stroke threshold, the haptic device 102 may provide a down-stroke feedback. The feedback force FF or the first feedback 152, 154 may correspond to the down-stroke force FD as well as the rate of the down-stroke force. For example, as the down-stroke force FD increases the feedback force FF may increase as well. Similarly, as the rate dF/dt of the down-stroke force FD increases, the rate at which the feedback force FF is applied may also increase. The relationship between the down-stroke force FD and the feedback force FF may be determined by a user setting, an application, or the like, or may be a 1:1 relationship. Thus, the feedback force FF can be customized depending on the user, application, and so on.

After operation 206, the method 200 may proceed to operation 208 and the input sensors 132 may determine the up-stroke force FU. As discussed above, the up-stroke force FU may correspond to a decrease in force as a user releases the pressure applied to the feedback surface 128. Accordingly, the input sensors 132 may detect or sense the up-stroke force FU. Once the input sensors 132 have detected the up-stroke force FU, the method 200 may proceed to operation 210. The processor 116 may then determine the rate of the up-stroke force FU. The rate dF/dt may correspond to how quickly a user is releasing the pressure applied to the feedback surface 128, e.g., slopes 1B or 2B in FIG. 9. For example, the processor 116 may take a derivative of the up-stroke over time to determine the rate at which the up-stroke if applied (or that the applied force is decreasing).

After operation 210, the method 200 may proceed to operation 212 and the haptic device 102 provides an up-stroke feedback force FF to the user 128. For example, the feedback mechanisms 124 may provide a force to move the input surface 128 orthogonally, or may otherwise provide feedback to the user. After operation 212 the method 200 may terminate. It should be noted that the method 200 may be repeated as often as desired and in many instances, a user may provide a new down-stroke force FD after receiving the feedback force FF from the up-stroke.

Figure 12:
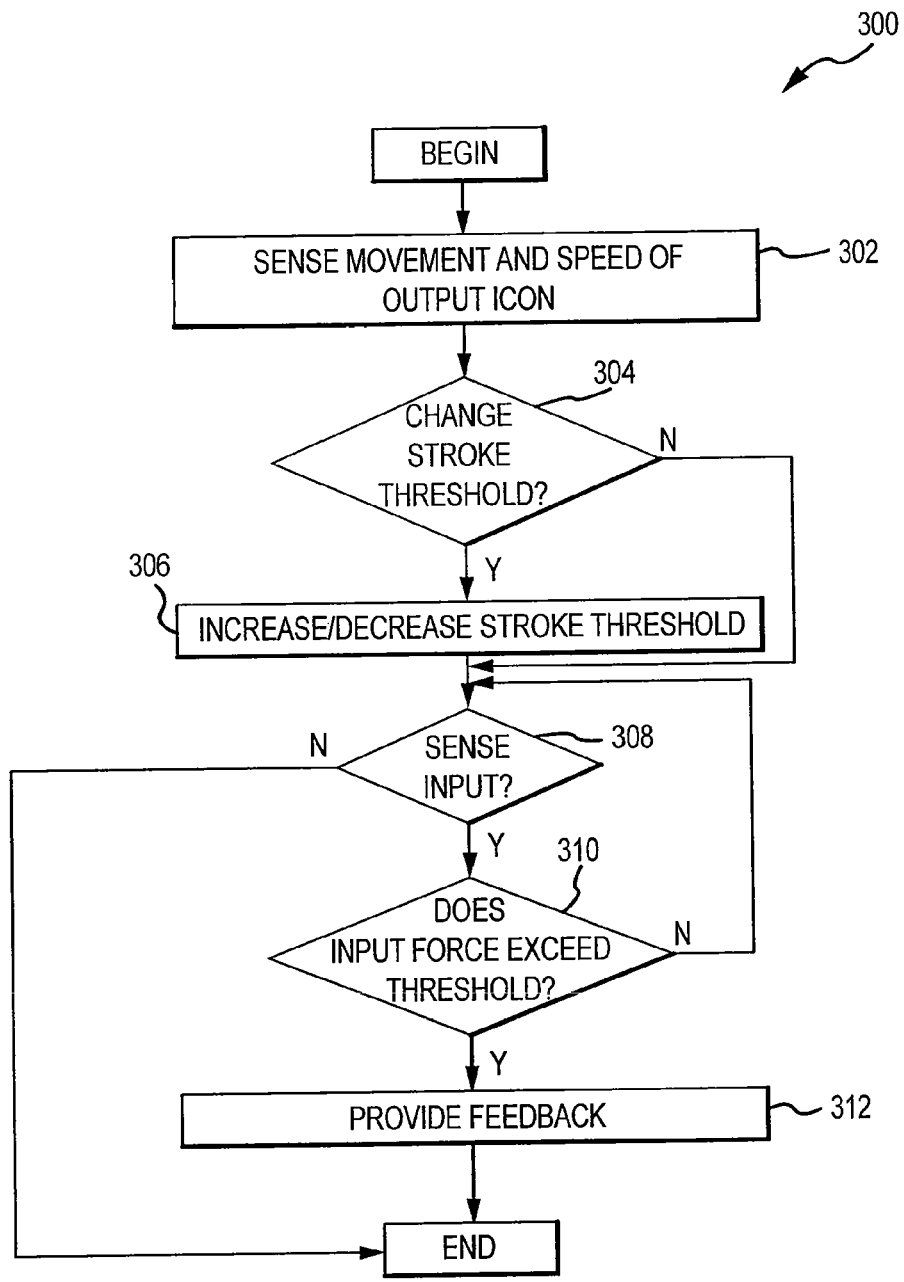
FIG. 12 is a flow chart for an exemplary method for correlating the feedback force FF to a displayed speed of a cursor.

It should be noted, as will be discussed in more detail below, that either or both of the down-threshold and the up-threshold may be modified based on one or more characteristics or inputs. As an example, the thresholds may be modified based on an application running on the computing device 100, different input characteristics on the feedback surface 128 (e.g., gestures, number of fingers providing input), As discussed briefly above, the feedback force FF may be correlated to the down-stroke force FD, the up-stroke force FU, and/or a rate that either force is applied. In other embodiments, the feedback force FF may be correlated to a user input other than the applied force. FIG. 12 is a flow chart for an exemplary method 300 for correlating the feedback force FF to a displayed speed of a cursor (i.e., based on a user's finger speed across the feedback surface 128). For example, the haptic device 102 may be a track pad and a user 150 may move his or her finger across the feedback surface 128 to move a cursor across a display screen in communication with the haptic device 102. The method 300 may begin with operation 302 and the input sensors 122 may detect or sense a movement and/or speed of a user input. For example, the input sensors 122 may detect a user's movement across the feedback surface 128. In this manner, the movement of the user 150 may correspond to the movement of the output icon, e.g., cursor or pointer.

After operation 302 the method 300 may proceed to operation 304 and the processor 116 may determine whether the down-stroke or up-stroke threshold for feedback force FF of the haptic device 102 should be changed. For example, if the user 150 is moving his or her fingers rapidly across the feedback surface 128, he or she may be applying less force to the feedback surface 128. Accordingly, the threshold for providing a feedback force FF to the user 150 may be reduced. Conversely, if the user 150 is moving his or her finger slowly, but applying a significant amount of force, the down threshold and/or the up threshold may be changed to require an increased force. In this manner, the processor 116 may determine whether the down-stroke or up-stroke threshold should be changed based on a user movement. Additionally, as will be discussed in more detail below, the processor 116 may further vary the down-stroke and/or up-stroke thresholds based on other characteristics or parameters, such as a user setting, currently running application, and so on.

If the down-stroke or up-stroke threshold is to be changed in operation 304, the method 300 may proceed to operation 306. Operation 306 changes the down-stroke or up-stroke threshold based on a previously defined correlation, a user setting, an application setting or so on. For example, the processor 116 may be configured to increase the down-stroke threshold for applying feedback 152, 154 when a user is moving his or her finger rapidly across the feedback surface 128, and the amount of reduction of the threshold may be a percentage of the speed of the finger or based on another correlation and/or characteristic.

After either operation 306 or operation 304, the method 300 may proceed to operation 308. In operation 308 the input sensors 122 determines if the user 150 has provided an input to the haptic device 102. In these instances, the input may be separate from the movement input. For example, in an embodiment where the haptic device 102 is incorporated into a track pad, a user may move his or her finger over the feedback surface 128 to move the output icon and then may provide a down-stroke force FD to the feedback surface 128 as a separate input to the haptic device 102, e.g., the user 128 may provide a down-stroke force FD to select an item that the output icon may be positioned over.

After operation 308, the method 300 may proceed to operation 310 and the processor 116 may determine whether the applied force (down-stroke and up-stroke force), exceeds the respective threshold. If the threshold is exceeded, the method 300 may proceed to operation 312 and the haptic device 102, and specifically the feedback mechanism 124, may provide feedback to the user 128. However, if in operation 310 the threshold has not been reached, the method 300 may return to operation 308 and the sensor 122 may continue to sense of a user input. In some embodiments, the haptic device 102 may sense various characteristics, or may use elements within the computing device 100 to sense characteristics, which may be used to determine whether the down-stroke and/or up-stroke thresholds are exceeded, this will be discussed in more detail below.

Determining Input to the Haptic Device

Figure 13A:
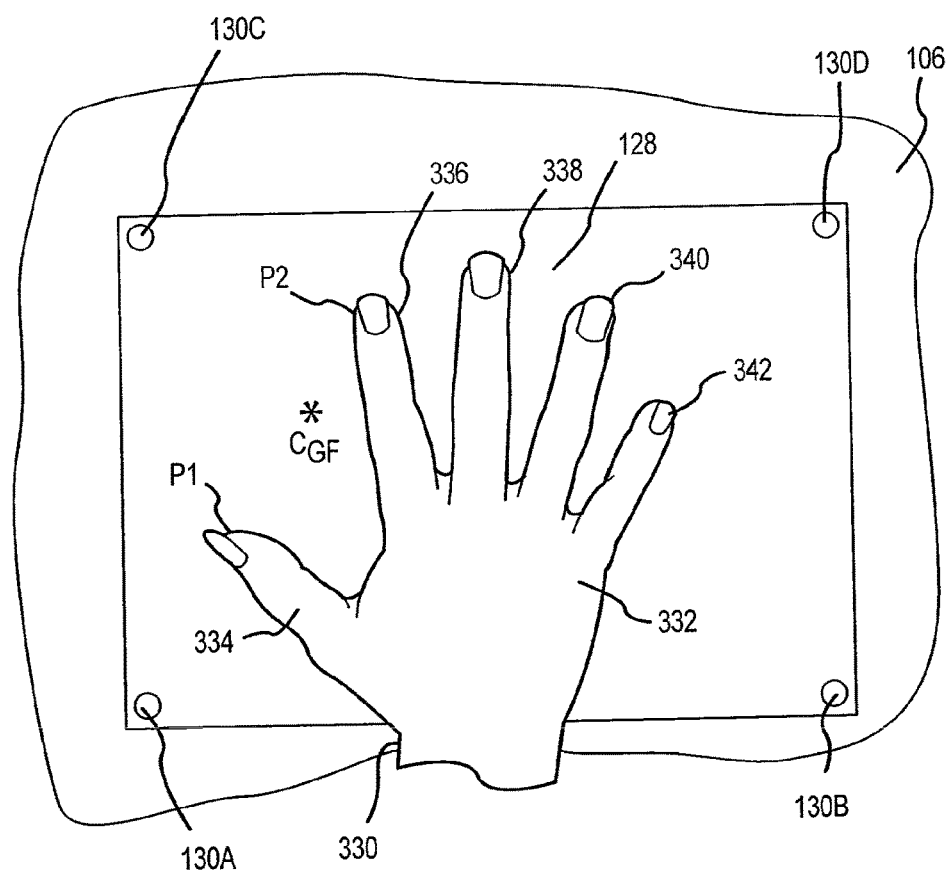
FIG. 13A is a top perspective view of the haptic device illustrating a user's hand positioned on top of and applying a force to the feedback surface.
Figure 13B:
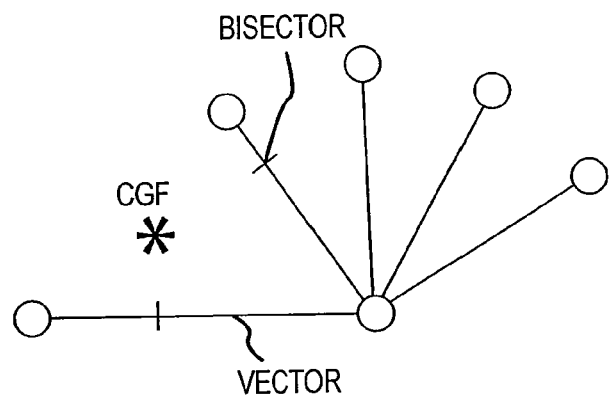
FIG. 13B is a simplified diagram of the hand position related to the location of the force centroid.

The input sensors 122, specifically the force sensors 130A-130D, position sensors 127, and the acceleration sensors 132 may be used to determine the location and strength of various inputs to the feedback surface 128 for the haptic device 102. For example, the haptic device 102 may be able to determine the force location of a force input corresponding to a user's palm as well as the force and force location asserted by each of the user's fingers. FIG. 13A is a top perspective view of the haptic device 102 illustrating a user's hand 330 positioned on top of and applying a force to the feedback surface 128. FIG. 13B is a simplified diagram of the hand position related to the location of the force centroid. The haptic device 102, using the force input sensors 130a-130d positioned at each corner of the feedback surface 128 may be configured to determine the location of a force centroid for the hand 330 as well as a force from each finger and/or palm of the hand 330. The force sensors may be differently configured and/or positioned in other embodiments, but may still be used to determine and assign forces to particular input locations.

As briefly mentioned above, aspects of this disclosure may be incorporated into components that may not move or directly provide feedback to a user. As one example, a display screen or enclosure for a device, such as a portable computing device (e.g., tablet, smart phone) may include the force and/or position sensors and may detect user inputs as discussed in more detail below. In these instances, the detected user inputs may be used as a mechanism to provide communication between the user and the device and/or may be correlated to other output items (such as changes on a display screen). This may allow certain elements of the display screen or enclosure to detect user inputs.

Using the position sensors 127 the haptic device 102 or an associated processor, may know the location of any touches or inputs to the feedback surface 128, and the force sensors 130A-130D may determine the force magnitude at locations of the feedback surface 128. Accordingly, if the user provides an input force to the feedback surface 128 with a single finger, the haptic device 102 may associate that position with the entire force detected by the one or more force sensors 130A-130D. However, in many instances the user may provide an input force or forces with one or more fingers and/or other portions of his or her hand. For example, the haptic device 102 may be used to capture input gestures and/or may provide varying feedback forces FF based on the number or type of finger inputs. In these instances, the haptic device 102 may determine an input force associated with several or all of the various touch locations on the feedback surface 128 to input force levels, as well as determine which portion and/or fingers of the hand the user may have used to provide the input force(s). Essentially, the haptic device 102 or associated processor may employ the outputs of each force sensor to determine the individual forces applied at each touch location, rather than simply aggregating each such force into a single, overall force.

In some instances, a user may apply a force with one or more of the fingers 336-342, the thumb 334, and/or the palm 332 of the hand 330. For example, the user may rest the palm 332 on the feedback surface 128 while correspondingly providing another force with the index finger 336 to select and item or otherwise provide an input to the haptic device 102. In these instances, the haptic device 102 may determine a global force centroid $C_{GF}$ of the various forces as they are distributed across the feedback surface 128. In this way the center of the force applied across the entire feedback surface 128 may be determined. In some embodiments, the haptic device 102 may not actually perform any calculations but may provide inputs from the input sensors to a processor, which may or may not be associated with the haptic device.

By determining the global force centroid $C_{GF}$, the haptic device 102 may further determine the location of the strongest force and correlate it with a position of a touch, as well as determining the portions of the hand 330 applying those forces. The haptic device 102 may allow for varying inputs to the processor 116 based on the finger used to provide an input to the haptic device 102. In this manner, as one example, an input force detected by the thumb may be used as an input to provide a "right-click" or other option and an input force input by the index finger may be used as input to select or to scroll. However, many other embodiments, discussed in more detail below, may be used to provide various potions for the haptic device 102 and computing device 100 based on determining the input provided by specific portions of a user's hand or hands.

When the haptic device 102 has received one or more input forces on the feedback surface 128, the haptic device 102 may determine the finger providing the force using a centroid calculation. However, because in some embodiments the haptic device 102 may include only a four force sensors 130a-130d, some calculations and/or estimations may be used to determine the finger that may be providing the input force. As described in more detail below, the haptic device 102 may utilize the position information as detected by the position sensor or sensors 127 along with various force signals detected by the four force sensors 130a-130d to determine the touch location corresponding to a particular force. By determining the centroid of the input forces provided to the feedback surface 128, and due to the position of touches on the feedback surface 128 detected by the position sensors 127, the haptic device may determine the finger providing the input force as the finger closest to the force centroid. The global force centroid $C_{GF}$ may be expressed by Eq. (1) below:

$$C_{GF} = \frac{\sum W_i P_i}{\sum W_i} \qquad \text{Eq. (1)}$$

In Eq. (1), the global force centroid $C_{GF}$ is expressed as the sum of a select number of positions Pi multiplied times the weight Wi at each position Pi, divided by the sum of the weights Wi. The positions Pi may be determined by the position sensors 127. For example, if the user presses on the feedback surface 128 with two fingers, those fingers may provide a position input signal (such as a change in capacitance) at two separate locations. Those locations may be used as two input positions Pi in Eq. (1). In some instances, the positions Pi may be a set or coordinates or a single axis coordinates, in the latter example, Eq. (1) may be repeated twice, once for a X or horizontal axis and once for a Y or vertical axis. In other examples, such as illustrated in Eq. (2), the positions Pi may be represented as position vectors relative to a predetermined origin. The weight Wi may be same as the force sensed by each force sensor, or may be the force sensed by each force sensor multiplied by gravitational acceleration (9.80665 m/s$^2$ or 32.174 ft/s$^2$).

Eq. (1) also uses the weight Wi for each position; however, because there may not be force sensors 130a-130d at every location of the feedback surface 128 where there may be a touch, the weight Wi at each position may not be known, only the force at the location of the force sensors 130a-130d. In these embodiments, the position information along with the force sensed at each input sensor 130a-130d may be used to solve for a global force centroid, which may be used to help determine the force at each touch location or position.

Using the example of a haptic device 102 having four force sensors 130a-130d, Eq. (1) may be expanded to include the values for each of the input sensors 130a-130d extrapolated to Eq. (2) below:

$$\vec{C}_{GF} = \frac{LPF(C_{BL}^{F[n]}) x \vec{C}_{BL}^{position} + LPF(C_{TL}^{F[n]}) x \vec{C}_{TL}^{position} + LPF(C_{RL}^{F[n]}) x \vec{C}_{RL}^{position} + LPF(C_{RB}^{F[n]}) x \vec{C}_{RB}^{position}}{LPF(C_{BL}^{F[n]}) + LPF(C_{TL}^{F[n]}) + LPF(C_{RL}^{F[n]}) + LPF(C_{RB}^{F[n]})} \quad \text{Eq. (2)}$$

In Eq. (2) above and with reference to FIG. 4, LPF represents the low pass filter, $C_{RB}^{F[n]}$ is the force registered by the right bottom (RB) force sensor 130b, $\vec{C}_{BL}^{position}$ is the position vector from respective sensor to the touch position, $C_{TL}^{F[n]}$ represents the force registered by the top left force sensor 130c, $\vec{C}_{TL}^{position}$ is the position vector from respective sensor to the touch position, $C_{RL}^{F[n]}$ is the force registered by the right left force sensor 130d, $\vec{C}_{RL}^{position}$ is the position vector from respective sensor to the touch position, $C_{RB}^{F[n]}$ is the force registered by the right bottom force sensor 130a, $\vec{C}_{RB}^{position}$ is the position vector from respective sensor to the touch position, which may represent the location and value of particular force relative to a particular predetermined origin.

As indicated in Eq.(2) in some embodiments, the values for the force sensors may be low pass filtered prior to processing. This filtering may be used to remove noise, such as spikes within the signal. However, in other instances, the input values from the force sensors 130-130d may not need to be low pass filtered based on the noise level for each of the signals. As described above, the force sensors 130a-130d may be configured to detect a force at a predetermined location. However, in instances where there may be one or more forces applied to the feedback surface 128, the force registered at each force sensor 130a-130d may be reduced or increased as compared to other sensors 130a-130d based on the distance of the applied force from the respective force sensor 130a-130d. In other words, a moment of the feedback surface 128 for a particular force sensor 130a-130d may vary based on distance from the particular force as a moment arm or perpendicular distance from the force location to the force sensor 130a-130d may increase or decrease. In some embodiments, the force sensors 130a-130d may be strain gages, which may register varying force inputs based on the moment, so that the force inputs as sensed by the force sensors 130a-130d may vary based on the distance to a respective input force.

Although the above examples were described with respect to four force sensors 130a, 130b, 130c, 130d, in other embodiments, three sensors or more than four sensors may also be used. For example, because only three points are required to define a plane, the haptic device 102 may include only three force sensors and use substantially the same calculations as above. Alternatively, the haptic device 102 may include more force sensors in order to refine the above calculations.

Using Eq. (2) above, the global force centroid, that is the location of the center of the applied force, may be determined. As an example, with a single touch, the center of the force may be determined by analyzing the force registered at each force sensor, along with the location of the touch detected by the position sensors. Because is this example, there is only a single input touch, the haptic device 102 may determine that the entire force was provided at the location of the force centroid, and then use that knowledge to determine the force magnitude applied thereto. The force magnitude applied at the force location may need to be calculated because each force sensor may only detect a portion of the force as the force may generally decrease over the distance between the force sensor and the force input location (if spaced away from each other). It should be noted that in some instances, the centroid location may not be sufficient to determine the force values at the specific positions, unless there is only a single force or touch position. That said, the global force centroid may be used to estimate the force at different force position locations, this will be described in more detail below.

Two Force Locations

In some instances, the equations listed above may be used to estimate the force magnitude applied at two locations by two separate fingers. For the below explanation, it should be noted that the global force centroid includes a force magnitude, as well as a position (which can be broken into x and y coordinates). Also, generally, if there are two force inputs on the feedback surface 128, the force centroid will be spaced between each of the force inputs, but may be closer to the location where the input force may be the largest.

With reference to FIG. 13A, assume that the thumb 334 and the index finger 336 of the user provide two separate forces to the feedback surface 128 at substantially the same time. The position sensors 127, which as described above may be a multi-touch capacitive sensing grid, can detect position of the applied force, assuming that the force is applied through a capacitive changing material (such as a finger, stylus, etc.). Using Eq. (2) above, the location of the global force centroid $C_{GF}$ may be determined. As shown in FIG. 13A, the index finger 336 may have applied a larger force than the thumb 334 and so the global force centroid $C_{GF}$ is positioned closer to the index finger 336 location on the feedback surface 128 than the thumb 334.

Using Eq. (2), but illustrated below in Cartesian coordinates, rather than vectors, the global force centroid for the two touches located at P1 and P2 can be expressed equation Eq. (3) below:

$$\vec{C}_{GF} = \frac{\vec{P}_1 \times P_1^{force} + \vec{P}_2 \times P_2^{force}}{C_{GC}^{force}} \quad \text{Eq. (3)}$$

In Eq. (3), the force $P_1^{force}$ at P1 (or finger pad 1) and the force $P_2^{force}$ at P2 (or finger pad 2) may be unknown, but the position vectors $\vec{P}_1$ and $\vec{P}_2$ may be known through the positions sensors 127. Additionally, as described above, the forces $P_1^{force}$, $P_2^{force}$ may be related through the global force centroid $C_{GF}$. Specifically, the forces may be related to the global force centroid $C_{GF}$ as illustrated by Eq. (4) below, which indicates that the sum of the forces $P_1^{force}$, $P_2^{force}$ equal the force magnitude of the force global force centroid.

$$C_{GF}^{force} = P_1^{force} + P_2^{force} \quad \text{Eq. (4)}$$

Substituting Eq. (4) into the dominator of Eq. (3) and breaking the position vector of the global force centroid $\vec{C}_{GF}$ into Cartesian coordinates, Eqs. (5) and (6), below, can be determined. Eq. (5) may represent the position of the global force centroid on an x axis (e.g., horizontal axis when referring to FIG. 4), and Eq. (6) may represent the position of the global force centroid on a y axis (e.g., a vertical axis when referring to FIG. 4).

$$C_{GP}^{x} = \frac{P_1^x \times P_1^{force} + P_2^x \times P_2^{force}}{C_{GC}^{force}} \quad \text{Eq. (5)}$$

$$C_{GF}^{y} = \frac{P_1^y \times P_1^{force} + P_2^y \times P_2^{force}}{C_{GC}^{force}} \quad \text{Eq. (6)}$$

Substituting Eq. (4) into Eqs. (5) and (6) provides Eqs. (7) and (8), respectively, below.

$$C_{GF}^{x} = \frac{P_1^x \times P_1^{force} + P_2^x \times P_2^{force}}{P_1^{force} + P_2^{force}} \quad \text{Eq. (7)}$$

$$C_{GF}^{y} = \frac{P_1^y \times P_1^{force} + P_2^y \times P_2^{force}}{P_1^{force} + P_2^{force}} \quad \text{Eq. (8)}$$

Using known mathematical techniques, Eqs. (7) and (8) can manipulated to solve for P1 in terms of P2 and then using the known variables ($P_1^x$, $P_1^y$, $P_2^x$, $P_2^y$) the force at each location P1 and P2 may be determined and thus the force exerted by the index finger 336 and the thumb 334 may be determined (or at least estimated).

As will be discussed below, although the above discussion was with respect to only two touches, these techniques may be expanded to include instances where there may be three positions (e.g., three fingers) providing an input force to the feedback surface 128. This is possible the there are three equations (Eqs. (4), (7), and (8)) and three unknown variables the positions of P1, P2, and a third force touch position P3.

It should be noted that in some instances where the position sensors 127 may only determine there are two separate force locations, other systems may be used to determine the force. For example, because the global force centroid is known, and the two touch positions may be connected by a line that may intersect the global force centroid, the force percentage of the total force detected may be assigned to the two touches based on the percentage distance a first touch position is the to the global force centroid and a percentage distance that a second touch position is to the global force centroid. However, this type of calculation technique may not be sufficient for instances where there may be three or more touches on the feedback surface 128.

More than Two Touches

In instances where the user may provide multiple touches to the feedback surface 128, the force at each touch may be estimated using the above equations, including a few assumptions that are based on the idea that often a user may only use one or two fingers (typically an index finger and another) to provide an input force to the feedback surface 128 and other touch locations sensed by the position sensors 127. Using that information, for most multi-touch scenarios, the two following assumptions can be made: 1) the majority of the input force was provided by one finger and the hand or 2) the majority of the input force was provided by two fingers and the hand. Using these assumptions, a weighted sum may be given for the touch locations corresponding to different fingers.

FIG. 13B is a simplified depiction of a user's hand providing force to the feedback surface 128. With reference to FIG. 13A a vector or slider value between the global force centroid and the hand may be created. Using a perpendicular bisector for each vector, percentages may be assigned to different fingers, and the finger (or touch location) and the highest percentage may be assigned a highest percentage of force, with the other fingers being assigned the rest of the force. That is, the finger location closest to the global force centroid may determined to have provided the highest percentage of total force input to the haptic device 102.

Figure 14:
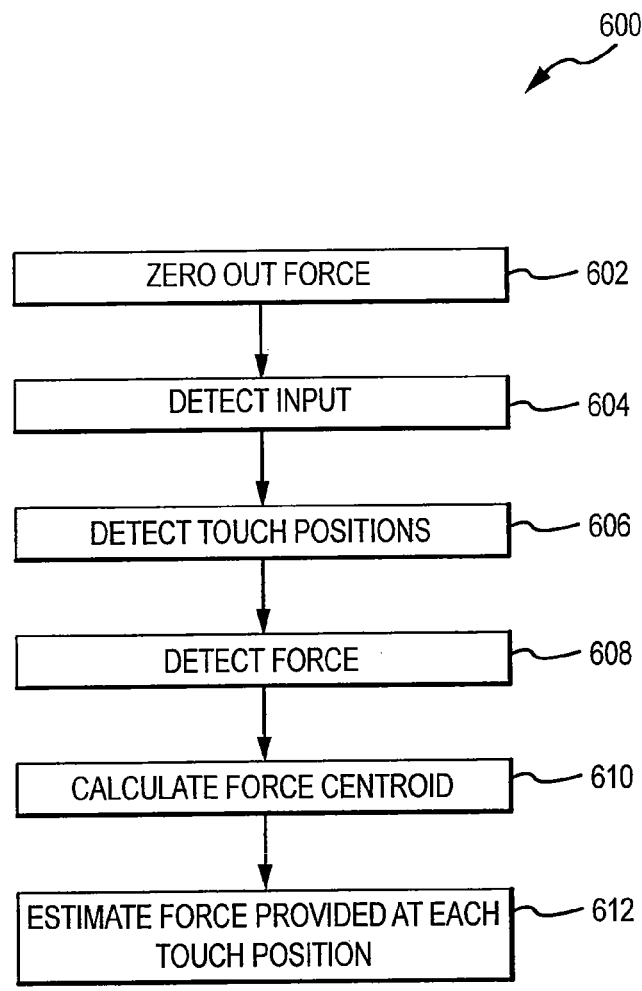
FIG. 14 is a flow chart illustrating an exemplary method for determining the finger providing the input force(s) to the haptic device.

The equations above may be used to determine where each portion of the hand 330 is positioned on the feedback surface 128, as well as the approximate force supplied by each finger. FIG. 14 is a flow chart illustrating an exemplary method for determining the finger 334-342 which may provide the input force to the haptic device 102. The method 600 may begin at operation 602 and the haptic device 102 may zero out the force sensors 130A-103D. This may include taking an initial reading from each force sensor 130A-130D when the haptic device 102 may first be turned on. By zeroing out the force sensors 130A-130D any inconsistencies between each of the sensors 130A-130D may be reduced (e.g., calibration errors). After operation 602, the method 600 may proceed to operation 604 and the haptic device 102 may detect a user input. The input sensors 122, specifically, the position sensors 127, and the force sensors 130A-130D may each be used to sense at least one characteristic of a user input. During operation 604, the method 600 may proceed to operation 606 and touch positions of the input may be detected. For example, the positions sensors 127 may detect changes in capacitance at one or more locations on the feedback surface 128.

After operation 606, the method 600 may proceed to operation 608 and the force sensors 130A-130D may detect the input force provided. As described above, each of the sensors 130A-130D may detect slightly different force values, as the force magnitude may vary based on the distance between the force sensor and the input. After operations 606 and 608, the method 600 may proceed to operation 610 and the global force centroid may be calculated as described above using Eqs. (1)-(8).

After operation 610, the method 600 may proceed to operation 612 and the processor 116 may estimate the force provided at each touch position detected by the position sensors 127. As described above, this may be determined by a percentage analysis based on how close a particular touch location is to the global force centroid.

Based on the method of FIG. 14, in some embodiments, (discussed in more detail below) the feedback force FF, the down threshold, and/or the up threshold may be varied based on which finger or fingers of the hand 330 are providing the input force to the haptic device 102. For example, if the index finger 336 is providing the force, the down-stroke threshold may be raised so that the user may have to provide an increased input force to receive feedback 152, as compared if he or she were to use his or her pinky 342 to provide the input force. Similarly, if more than one finger 332-342 is applying the input force to the feedback surface 128, the thresholds may be increased so that a user may have to apply more force to receive feedback and/or provide an input to the haptic device 102. Thus, by using the global force centroid and the method of FIG. 14, the force input by each finger may be determined, allowing the haptic device 102 to vary feedback based on the finger or fingers that may have provided the feedback. Further, the above methods may also allow the haptic device to better detect input gestures (where a user may move his or her fingers in a particular manner with or without changing force). In these examples, the gestures may be used to provide commands to the haptic device 102 and/or change the feedback which may be provided.

The techniques described herein may be used in combination with the haptic device or separate therefrom. For example, a tablet computer may implement the force sensing techniques in order to detect one or more force inputs from a user (that may or may not be correlated to one or more user touches). Continuing with this example, the force centroid alone, without using the position information, may be provided to a processor which may use force centroid to determine one or more user inputs to a surface or component. As one example, the force sensors may detect a user input on a side of a display screen that may be outside of the capacitive sensing region.

Parameter Based Thresholds

Force Ladders

As described above with respect to FIGS. 13A-14, the haptic device 102 and computing device 100 may be configured to determine an input force for each finger 334-342 of the hand 330, as well as the palm 332 of the hand 330. In these instances, the haptic device 102 may detect a force exerted by each portion of the hand, and as example, the first force F1 may correspond to a force input by the thumb 334, the second force F2 may correspond to a force input by the index finger 336, the third force F3 may correspond to a force input by the middle finger 338, the fourth force F4 may correspond to a force input by the ring finger 340, the fifth force F5 may correspond to a force input by the pinky finger 342, and the sixth force F6 may correspond to a force input by the palm 342. In this configuration, there may be a force F0 that is common to the entire hand 330, and will be discussed in further detail below. Using one or more of the received input forces F1-F6, the haptic device 102 may provide different inputs or commands to the computing device 100 (e.g., to specific applications) and/or different outputs either on the feedback surface 128 or through a display in combination with the haptic device 102. In other words, the feedback provided by the haptic device 102 as described herein may be physical feedback, such as the feedback surface 128 moving beneath one or more fingers of the user or a sound playing, or may be displayed on the display 104, such as an illustration, movie, or other visual indication separate from the haptic device 102.

Figure 16:
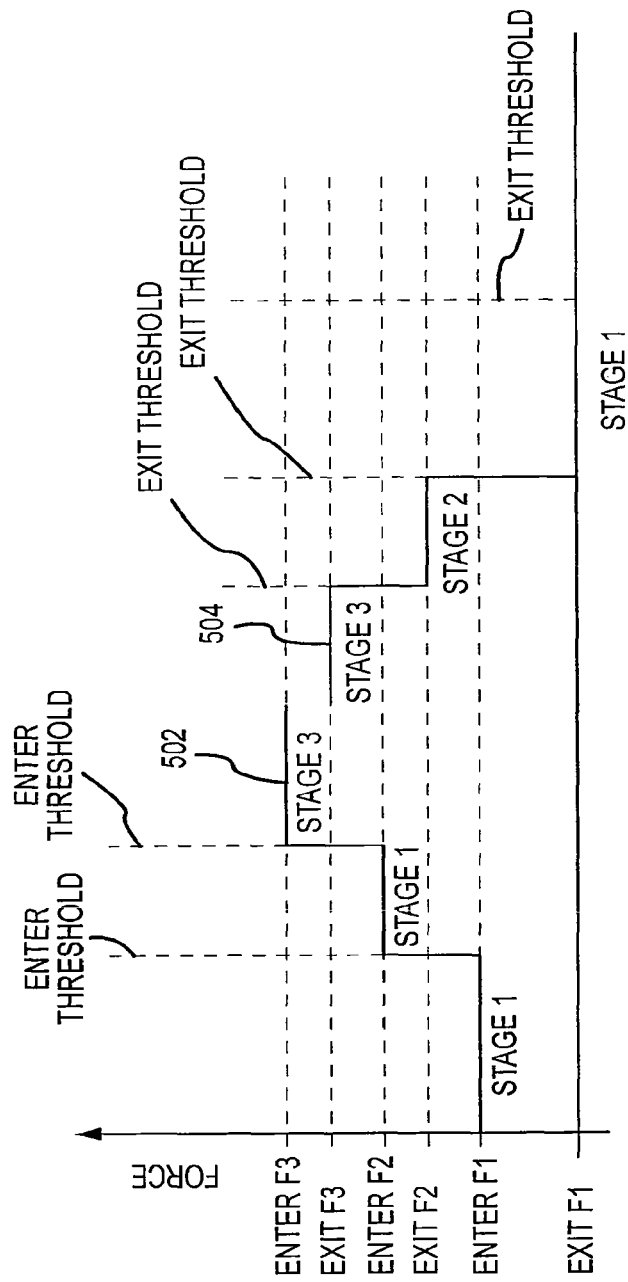
FIG. 16 is a chart illustrating an enter ladder and an exit ladder for three stages, Stage 1, Stage 2, and Stage 3, which may be used to provide different outputs.

In some embodiments, the haptic device 102 may provide different stages where the output provided to the user and/or inputs provided to a select application may be varied. FIG. 16 is a chart illustrating an enter ladder 502 and an exit ladder 504 for three stages, Stage 1, Stage 2, and Stage 3. Each of the stages Stage 1-3 may provide different inputs to the processor 116. For example, when the user provides an input force sufficient to enter Stage 1, the haptic device 102 may provide a single-click input to the processor 116, whereas if the user provides an input force sufficient to enter Stage 2, the haptic device 102 may provide a double-click input to the processor 116. Additionally, with each of the stages 1-3 the electronic device 100 and/or the haptic device 102 may provide varying feedback to the user, either visually, physically, or otherwise. As one example, during Stage 1 the haptic device 102 may activate the feedback surface 128 for a first time period and during Stage 2 the haptic device 102 may activate the feedback surface 128 for a second time period that is longer than the first time period. As another example, the display screen 104 may display an icon, such as a button or other element, and during Stage 1 the button or icon may become illuminated and during Stage 2 the icon or button may visually depress or change shape. In this manner, as the user varies a force applied to the feedback surface 128, the haptic device 102 may provide visual or physical feedback to illustrate a force progression through the ladders 502, 504. Other examples of varying outputs based on the Stages 1-3 include modifying one or more characteristics of an icon (color, size, etc.), providing various menus or windows based on the stage, animating one or more icons, zoom in/out, and so on. This type of output per stage may be triggered or otherwise associated with crossing the one or more stage thresholds, as discussed in more detail below.

The Stages 1-3 may vary the down-stroke threshold and/or the up-stroke threshold to determine when an output may be provided. For example, Stage 1 may have a down-stroke threshold set at a first force level and Stage 2 may have a down-stroke threshold set a second force level that may be higher than the force level for the down-stroke threshold in Stage 1. In this manner the user may have to provide an increased force during Stage 2 to receive feedback as compared to Stage 1. It should be noted that the force provided by each finger or portion of the hand F1-F6 may activate a separate independent ladder. For example, the index finger may have a first input force level that may trigger a first set of stages, whereas the pinky finger may have an second input force level that may trigger a second set of stages. Additionally, the Stages 1-3 and/or enter and exit ladders 502, 504 may be separate for each finger. For example, the index finger 336 may have a first set of ladders 502, 504 with separate stages as compared to the thumb 334, which may have a second set of ladders 502, 504 with separate stages. Alternatively or additionally, the enter and/or exit ladders 502, 504 may be different or the same for certain sets of fingers. For example, Stages 1-3 may be substantially the same for the thumb 334 and the index finger 336, but the forces to enter each of the stages may be increased by a scaling factor for the thumb 334. In other words, when using his or her thumb 334 to provide an input force, the user may have to apply a larger force to enter the Stages 1-3.

With reference to FIG. 16, the enter ladder 502 may have an enter force for each of the stages, EnterF1, EnterF2, and EnterF3, with each enter force requiring a larger force magnitude than the previous enter force. That is, the force threshold of EnterF1 may be larger than the force threshold of EnterF2. As the user provides an input force through one or more of the fingers 334-342 of the hand 330, the haptic device 102 may enter one or more of the three Stages 1-3. For example, while in Stage 1, the user must provide an input force larger than or equal to EnterF2 in order to enter Stage 2 or cross the Stage 2 threshold, and an input force larger than or equal to EnterF3 in order to enter Stage 3 or cross the Stage 3 threshold. In some embodiments, the Stages 1-3 or ladder rungs may be sequential and a user may have to enter Stage 2 in order to move from Stage 1 to Stage 3. In other embodiments, as long as the input force is equal to or more than EnterF3 the user may jump directly to Stage 3 from Stage 1. It should be noted that the stages or stage thresholds may be based on characteristics other than force, such as but not limited to, velocity, acceleration, or time of the input provided by the user. For example, as discussed in more detail below, the enter force levels for each stage may be varied based on external characteristics (such as ambient noise, location of the device 100, and so on) and/or internal characteristics (such as applications running, active application), and/or sensed characteristics (such as force input speed, yank, number of force inputs). These types of characteristics (and others) for changing the stage thresholds for varying feedback are discussed below.

With continued reference to FIG. 16, each of the Stages 1-3 may be configured to encompass a range of different input force values. For example, to climb from Stage 1 to Stage 2, the user may have to apply an input force of at least 101 grams and to climb from Stage 2 to Stage 3 the user may have to apply an input force of at least 201 grams. Accordingly, Stage 2 may encompass user input forces ranging between 101 and 200 grams. In other instances, the Stages 1-3 may encompass substantially any number of forces levels. Additionally, although three stages are illustrated in FIG. 16, it should be noted that substantially any number of stages are possible. As the input force from the user hits a respective enter force, the respective Stage may activate. For example, as the user provides an input force equal to or more than EnterF1, Stage 1 may be activated by the haptic device 102, which may provide an input to the processor 116 and/or one or more outputs to the user and/or display 104.

With continued reference to FIG. 16, the exit ladder 504 may determine the input forces required to exit a particular stage. In other words, the exit ladder 504 may determine the reduction in applied force for the haptic device 102 to switch between Stage 3 to Stage 2 and from Stage 2 to Stage 1, and so on. For example, to exit Stage 1, the user may apply a force equal to or less than ExitF1 or the force threshold of Stage 1, to exit Stage 2 the user may apply (or reduce their force) by a force equal to or less than ExitF2, and to exit Stage 3 the user may apply a force equal to or less than ExitF3. Similarly to the enter ladder 502, the exit ladder 504 may have input force levels that provide a threshold for each Stage 1-3. However, unlike the enter ladder 502, the thresholds or exit forces are the force levels necessary to exit a particular stage, rather than enter a particular stage. As shown in FIG. 16, the exit forces ExitF1, ExitF2, and ExitF3 are lower than the enter force for their respective stage, but are higher than the enter force for the below stages. That is, ExitF1 to exit Stage 1 is a lower force than the EnterF1 required to enter Stage 1, Exit F2 to exit Stage 2 is a lower force than the EnterF2 required to enter Stage 2, but is higher than the force EnterF1 required to enter Stage 1. Expressed mathematically the relationship between the enter force values and the exit force values may be expressed as:

$$ExitF1 < EnterF1 < ExitF2 < EnterF2 < ExitF3 < EnterF3$$

The relationship between the enter force values and the exit force values may provide hysteresis to the haptic device 102 with respect to switching between the Stages 1-3. In other words, for a particular stage, the input force may have to fall below the enter force in order for the haptic device 102 to exit the respective stage. This may provide the user a force cushion to help prevent inadvertent stage changes as a slight reduction in force may still allow a user to remain in a particular stage. It should be noted that in other embodiments, the haptic device 102 may be configured so that there may be a reduced hysteresis or no hysteresis within the system such that as soon as an input force may drop at or below the enter force it may exit the stage.

Figure 15:
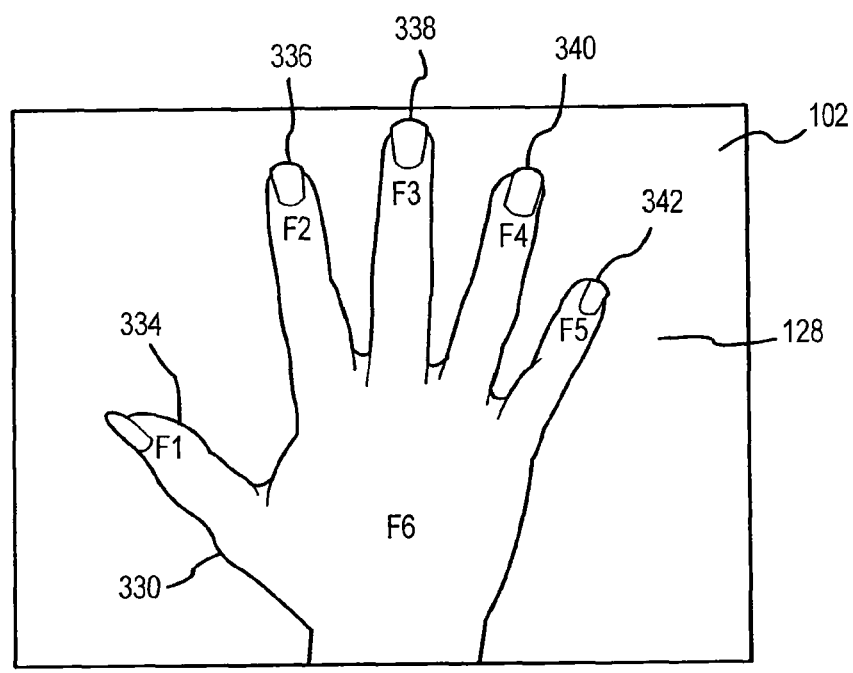
FIG. 15 is a simplified diagram of a user's hand applying force to the feedback surface of the haptic device.

With reference again to FIGS. 15 and 16, in other examples, the exit force for a particular stage may be set to be lower than adjacent lower stages. As a specific example, the exit force for Stage 2 ExitF2 may be set to be lower than the enter force EnterF1 for entering Stage 1. In this manner, the haptic device 102 may be configured to allow a user to "lock" into a particular stage. That is, once the user has entered an input force equal to or above EnterF2, he or she may remain in Stage 2, even if he or she reduces his or her force substantially. In some embodiments, there may be a double hysteresis and the Stage or threshold may be maintained although the force may have reduced below the threshold for multiple stages. For example, while in Stage 3 the user may decrease the input force, such that the input force may be less than the exit force Exit F1 to exit stage 1, but the haptic device 102 may be configured to remain within Stage 3. Similarly, the haptic device 102 may be configured to set the ladders 502, 504 such that whichever stage the user may enter based on an initial force input, he or she may be locked into.

As another example, the user may jump through multiple steps or stages of the enter and exit ladders 502, 504. If the initial force input by the user is equal to or greater than the enter force EnterF3 for Stage 3, the haptic device 102 may jump to Stage 3, although the user may not have yet entered Stages 1 or 2. Additionally, in some instances, the enter force values for the stages may be varied in a manner similar to varying the down-stroke and force-stroke thresholds, discussed in more detail below. Briefly, as an example, the harder a user may press on the feedback surface 128, the more quickly the user may jump through the Stages, as the force level for each stage may be lowered depending on the velocity of the initial input force.

Figure 17:
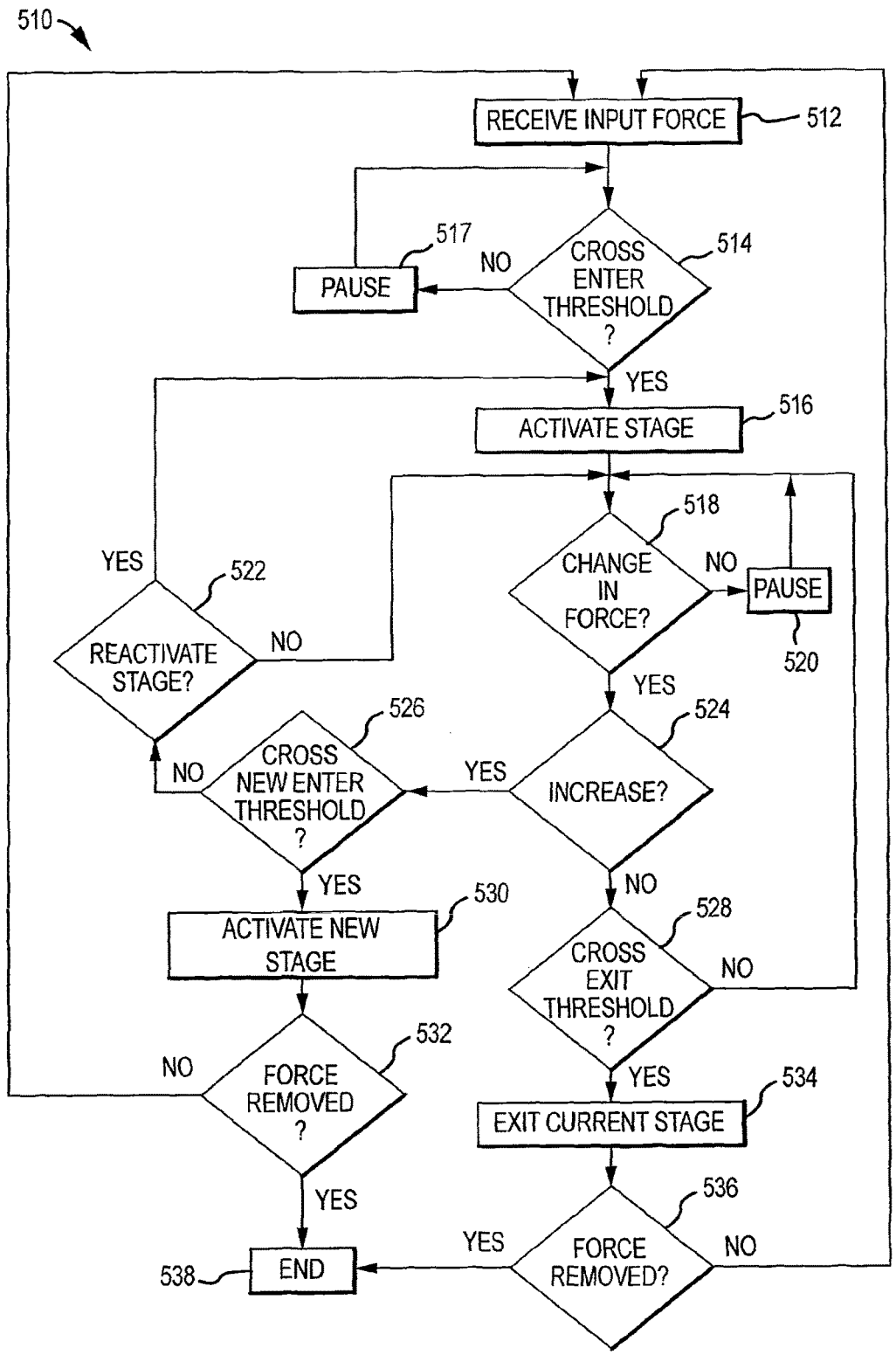
FIG. 17 is a flow chart illustrating a method for utilizing force ladders to enter and exit stages.

An illustrative method for utilizing the enter and exit ladders 502, 504 for determining feedback and/or input of the haptic device 102 will now be discussed. FIG. 17 is a flow chart illustrating a method 510 for utilizing force ladders to enter and exit stages. The method 501 may begin with operation 512 and the force sensors 130a-130d may sense one or more input forces. For example, the user may touch the feedback surface 128 to provide a down-stroke force FD to the feedback surface 128, which may be registered by the force sensors 130a-130d. Additionally, it should be noted that the other input sensors 122 may also receive other input signals related to the input force, such as the acceleration and/or position of the input force.

After the input force has been received, the method 510 may proceed to operation 514 and the processor 116 may determine whether the input force was sufficient to cross an enter threshold for one or more stages. For example, with reference to FIG. 16, the processor 116 may determine when the input force level was equal to or higher than EnterF1, EnterF2, and/or EnterF3. If the input force was sufficient to cross a threshold, the method 510 may proceed to operation 516 and the processor 116 may activate the respective stage. It should be noted that in some instances, the force may be sufficient to exceed two or more enter thresholds. In this instance, the haptic device 102 may activate the highest stage, or if the input is the first input within a predetermine time period, the haptic device 102 may activate the lowest stage.

While the respective stage is activated in operation 516, the haptic device 102 may provide feedback to a user as determined by the stage. For example, if the user has provided a force sufficient to enter Stage 1, the haptic device 102 may provide feedback to a user and/or may provide a first input to processor 116 regarding a particular selection. In some instances, the feedback provided by the haptic device 102 during the activated stage may occur substantially simultaneously as the user passes the enter threshold, in other instances, the feedback may be temporally separated from when the input force first passes the enter threshold.

In operation 514, if the enter threshold force is not crossed, the method 510 may proceed to operation 517. In operation 517 the processor 116 may pause and then return to operation 514 to determine if the threshold has been crossed. In this manner, haptic device 102 may not provide feedback and/or provide an input to the processor 116 until the user has enter a sufficient input force to cross at least one enter threshold in order to enter at least one stage. In these embodiments, the haptic device 102 may be configured to help prevent the user from providing an inadvertent input to the haptic device 102, as the haptic device 102 may not register an input until at least one stage is crossed. However, in other embodiments, alternative arrangements are envisioned. For example, the haptic device 102 may be configured to provide an input to the processor 116 whenever one or more of the input sensors 122 detect an input signal, regardless of the strength or type of the input signal. In these embodiments, the haptic device 102 may provide accidental inputs to the processor 116 where the user may not have desired to provide an input. For example, if a user grazed with his or her finger the feedback surface 128 while typing, the haptic device 102 may register an input although the user may not have wanted to provide an input.

With continued reference to FIG. 17, after operation 516, the method 510 may proceed to operation 518 and the processor 116 may determine whether a change in force has been detected. For example, while providing an input force to the feedback surface 128, the user may decrease or increase the pressure exerted on the feedback surface 128, and this pressure may be continuously or substantially continuously detected by the one or more input sensors 122. If the input sensors 122 do not register a change in force, the method 510 may proceed to operation 520 and may pause. After the pause in operation 520, the method 510 may return to operation 518 and the processor 116 may again determine if there is a change in a pressure, while remaining in the current stage.

In operation 518, if there is a change in force detected, the method 510 may proceed to operation 524. In operation 524 the processor 116 may determine whether force increased or decreased as compared to the originally detected force levels. If the force has increased, the method 510 may proceed to operation 526 and if the force has decreased the method 510 may proceed to operation 528.

In operation 528 the processor 116 may determine whether the exit threshold for the stage activated in operation 514 has been crossed. That is, the processor 116 may determine whether the decrease in force was sufficiently low to be lower than the exit force value for the stage. If the decrease in force was not low enough to cross the exit threshold, the method 510 may proceed to operation 518 and the processor 116 may continue to monitor if there is another change in force. However, if the decrease in force was sufficient to cross the exit force threshold, the method 510 may proceed to operation 534 and the haptic device 102 may exit the currently active stage. For example, if Stage 2 is currently activate and the force input by the user decreases past the exit force ExitF2 for Stage 2, the haptic device 102 may exit Stage 2 and may return to Stage 1 or to another initial stage.

Once the haptic device 102 has exited the current stage, the method 510 may proceed to operation 536 and the input sensors 122 may determine if the input force has been removed. If the input force has been removed, the method may proceed to an end state 538. However, if input force has not been removed, the method 510 may proceed back to operation 512 and the method 510 may be repeated.

With continued reference to FIG. 17, in operation 524, if the force has increased, the method 510 may proceed to operation 526. In operation 526 the processor 116 may determine whether the increase in force was sufficient to cross a new enter threshold. As a specific example, if the activate stage of the haptic device 102 is stage 1, during operation 526 the processor 116 may determine whether the force increase was sufficient to be equal to or larger than EnterF2 to cross the threshold for stage 2. If the force is sufficient to cross a new enter threshold, the method 510 may proceed to operation 530 and the new stage may be activated. As with operation 516, during operation 530 the haptic device 102 may provide feedback to the user (e.g., moving the feedback surface 128) and/or may provide an input to the processor 116 indicating a selection or the like.

Once the new stage has been activated, the method 510 may proceed to operation 532 and the haptic device 102 may determine whether the force has been removed. For example, the force sensors 130a-130d and/or the other input sensors 122 may determine whether the user is provide an input force to the feedback surface 128. If the force has been removed, the method 510 may proceed to an end state 538 and the method 510 may end. However, if the force has not been removed, the method 510 may return to operation 512 and the method 510 may repeat.

In operation 526, if the increase in force is not sufficient to cross a new enter threshold, the method 510 may proceed to operation 522. In operation 522, the processor 116 may determine whether to reactivate the currently active stage. For example, in some instances, the stage may have been activated for a set period of time, but the feedback and/or input set to be provided during the stage may have been activated when the haptic device 102 first entered the stage. Accordingly, although the user may have been providing a force for a set time period he or she may have only receive one feedback and the haptic device 102 may have only provided a single input or command to the processor 116. Thus, if in operation 522 the stage is to be reactivated, the method 510 may proceed to operation 516 and the stage may be activated and the user may again receive feedback from the haptic device 102 and/or the haptic device may register a particular input that may be provided to the processor 116 as selection or the like. If in operation 522 the processor 116 determines that the current stage should not be reactivated, the method 510 may return to operation 518.

It should be noted that the haptic device 102 reactivate a particular stage based on a variety of settings, characteristics, or parameters. As an example, the haptic device 102 may analyze the length of time from when the stage was first entered in operation 516 and if it is over a predetermined time period the haptic device 102 may reactivate the stage so that the user may not have forego receiving feedback during extended portions of time. However, other embodiments are envisioned as well.

With reference again to FIGS. 15 and 16, in some instances, the haptic device 102 may receive two or more inputs substantially simultaneously. For example, the user may provide an input force with both the index finger 336 as well as the thumb 334. In this instance, the haptic device 102 may determine the feedback/input stage based on the first input force received. Continuing with this example, the haptic device 102 may in effect lock out (temporarily) other input forces after a first input is received. In this manner, whichever finger first applied an input force (when timed closely together), may be set as the controlling force in determining what enter and/or exit thresholds are crossed. As a specific example, the index finger 334 may have an increased force stage scale as compared to the pink finger 342 and so if the input force is applied by both fingers 334, 342 at substantially the same time, the controlling force may be the pinky force 342. This may be because that same input force magnitude input by the pinky may place the haptic device 102 in Stage 3, whereas because the index finger 336 may have an increased stage scale, the same input force input by the index finger 336 may activate Stage 1. Alternatively, the index finger 336 may have been in the process of proceeding through the stages with different input forces when the pinky finger 342 started to provide an input force. In this case, if the pinky finger 342 force is between EnterF1 and EnterF2, and the index finger 336 force is between EnterF2 and EnterF3, the haptic device 102 may activate Stage 2 based on the index finger 336 input force. In other words, the haptic device 102 may choose to apply the feedback or activate the select stage based on the finger that is furthest through the stages.

As yet another example, the haptic device 102 may use whichever force from the two or more fingers 334-342 has the largest magnitude in order to determine which stage and/or ladder 502, 504 may be used. The largest force may be determined by a raw comparison, or a comparison after the forces may be scaled based on the inputting finger (e.g., certain fingers may require less force to move through the stages as other fingers).

In other examples, especially applicable in instances where two or more fingers may provide an input force simultaneously, the haptic device 102 may use other characteristics to determine the Stage and/or input and feedback. In one example, the controlling force may be the finger which has gone through the most stages. In this example, the stage (and thus feedback and input to the processor 116) may be determined based on the force provided by the finger in the highest number of stages. Accordingly, if the user applied a force with both the index finger 336 as well as the pinky 342, the haptic device 102 may determine the active stage for providing input and/or feedback based on which of the fingers had completed more of the stages.

As another example, the ladders 502, 504 may be determined by the number of fingers providing the input force. Continuing with this example, if both the index finger 336 and the middle finger 338 provide an input force at substantially the same time, the haptic device 102 may use an enter ladder 502 and an exit ladder 504 configured for two finger clicks. In this case the input force from each finger may be combined to determine the combined input force, which may be used to determine the position on each of the ladders 502, 504. That is, the haptic device 102 may include a set of stages that is based on an input for two fingers. In this example, the input force to cross the various thresholds may be generally increased as compared to single finger stages.

As briefly described above, with reference to FIGS. 15 and 16, the haptic device 102 may include separate ladders 502, 504 for different fingers. In some instances a user may tend to rest his or her palm 332 and/or thumb 334 on feedback surface 128 and may inadvertently apply an input force with either the palm 332 and/or thumb 334. In these instances, the haptic device 102 may be configured so that the threshold force EnterF1 for forces input by the thumb 334 and/or palm 332 may be substantially higher than the input force EnterF1 for input forces entered by the index finger 336. This may help prevent the haptic input device 102 from registering inadvertent inputs, despite the fact that the same force level may be used to actuate the haptic device if applied by other fingers.

Some examples of applications for the electronic device 100 utilizing the force ladders described herein will now be discussed. A first example may be a two-level virtual button or other graphic displayed on the display screen 104. The haptic device 102 may vary the visual display of the button, as well as the feedback provided to the user and inputs provide to the applicable application running. For example, with the two-level button when the user enters the first stage 1, a first option may occur (e.g., the button may appear to depress, change color, display a first menu), and as the user enters the second stage 2, a second option occur and/or a feedback may be provided (e.g., the button may "click," a second menu may be displayed, or the like). As discussed in more detail below, the thresholds and/or other characterizes for the inputs/commands from the haptic device 102 to the electronic device 100 may be varied based on the user input, and as applied to the two-level button example, a first input force may activate the two-level button and the user may enter the ladder, whereas a second input force may activate a one-level button and the user may receive an click without entering a force ladder.

Figure 18:
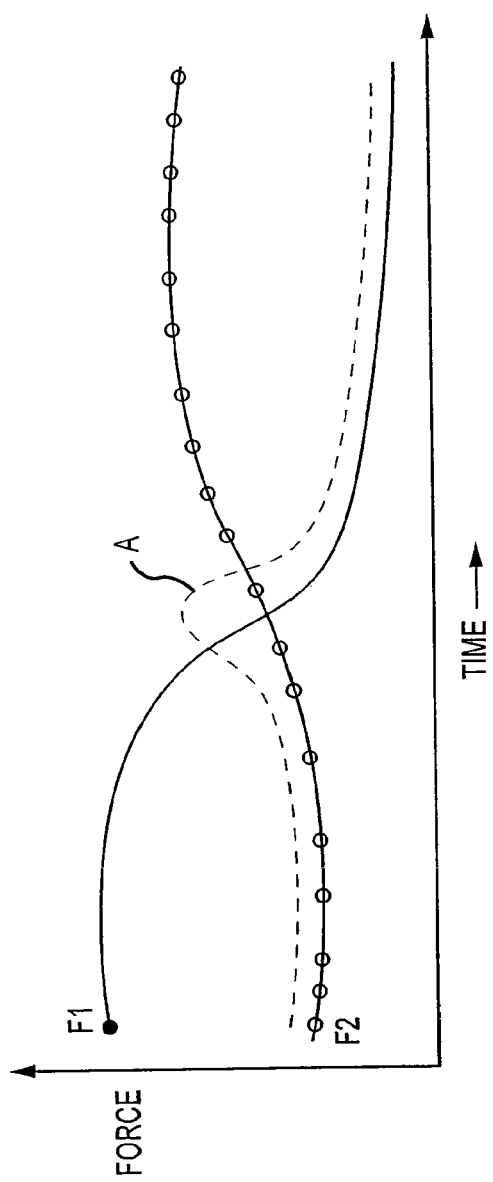
FIG. 18 is a simplified graphical illustration of a first finger force F1 and a second finger force F2 over time.

The haptic device 102 and the ladders 502, 504 may be used to detect force gestures. For example, if the input force continues to progress through the various ladders 502, 504 the haptic device 102 may determine that the input is part of a gesture. FIG. 18 is a simplified graphical illustration of a first finger force F1 and a second finger force F2 over time. In this example, the user may place two fingers F1 and F2 on the feedback surface 128 at substantially the same time, while also using both fingers F1 and F2 to provide an input force. Over time as both fingers F1 and F2 vary their applied forces, there may be a particular region—region A—where the collective force of both fingers F1 and F2 may be greater than either force separately. Based on the level of force required to enter to the next stage, the first to cross the particular threshold may be the dominate input. For example, if neither of the individual fingers F1 and F2 have crossed the next force threshold by the time the collective value in Region A is greater, than the dominate input may be determined to be a force gesture, whereas if the first finger F1 has crossed into the next threshold by the region A, then it may be determined to be the dominate finger.

In these instances, the common force F0 may be represented by: F0=min (F1, F2, F3, F4, F5, F6) and for multiple touches by different portions of the hand 330 at different times, the equation may be expressed as F0=min*number of touches (F1, F2, F3, F4, F5, F6).

Other Thresholds

With reference briefly to FIG. 9, in some instances, the force value for the down threshold and/or the up threshold may be a set value, e.g., at 100 grams of force, the down-stroke threshold is crossed and feedback 152, 154 is provided. In other instances, the down-stroke threshold and/or the up-stroke threshold may be varied based on a percentage of input rather than being statically defined. For example, the down-stroke threshold may be set as a percentage of the typical input force provided by a user. In this manner, the haptic device 102 may determine a user history or preferences (such as through tracking a set number of clicks, a number of days, etc.) and then may vary the down-stroke threshold and/or up-stroke threshold to be a percentage of that user's typical input force. In these instances the thresholds may be varied based on a change of users, may be varied over time, or may otherwise be varied.

As a specific example, the haptic device 102 may track the down-stroke force FD and the up-stroke force FU of a user over 10 (or other variable number) inputs. The processor 116 may then use those inputs to determine an average down-stroke force FD and an average up-stroke force FU. The processor 116 may then set the down-stroke threshold and/or the up-stroke threshold to be approximately 40% of the average applied force. It should be noted that in other embodiments, fewer or more inputs may be tracked to determine an average or otherwise set the threshold levels. Similarly, the thresholds may be set at substantially any percentage of the input levels.

Typically users may apply substantially more force to conventional track pads than may be necessary to provide an input to the device. As the haptic device 102 may vary the thresholds for providing feedback, the haptic device 102 may reduce the down-stroke threshold over time in order to help develop muscle memory or the like in a user for reducing the amount of force applied to the feedback surface 128. Thus, the thresholds may drift over time and so that it may be easier for a user to receive feedback or a "click" over time. By reducing the force necessary to cross the down-stroke and/or up-stroke thresholds, the user may learn to apply lower amounts of force to activate a feedback response form the haptic device 102. This may potentially decrease wear and tear, as well as other types of potential damage to the components of the haptic device 102, which may help to increase the life span of the device 102.

Alternatively, the down-stroke and/or up-stroke thresholds may be varied to be an increased percentage of a user's typically input force. In these instances, the user may be less likely to provide an accidental or inadvertent click to the haptic device 102 because to actually actuate and input and/or receive feedback, the threshold may be a larger percentage of a user's typical peak force.

In other embodiments, the up-stroke and/or down-stroke thresholds may be set to have a maximum or minimum value for which they are activated. For example, the down-stroke threshold may be set at a predetermined force (e.g., 300 grams or other desired force level), and may always provide feedback and/or an input when the down-stroke force FD reaches that level, regardless of other factors. In some embodiments, the floor and/or ceiling values for the up-stroke and/or down-stroke thresholds may be used in combination with other thresholds. For example, the a first down-stroke threshold may be set to be activated at a percentage of the user's typical force, but if that percentage is at a higher force level than the ceiling down-stroke threshold, the ceiling threshold may override the percentage threshold.

Drag Hysteresis

Figure 19:
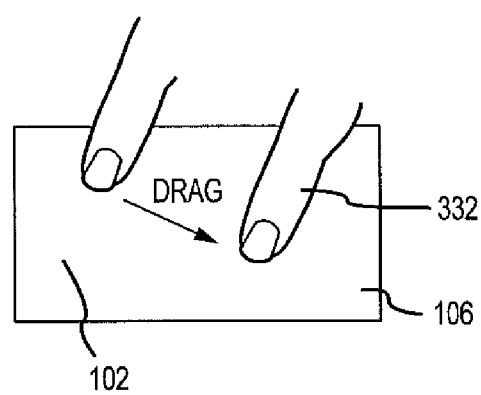
FIG. 19 is a top perspective view of a user dragging his or her index finger across the feedback surface.

As described above with respect to FIGS. 9-11, the haptic device 102 may have a down-threshold and an up-threshold, and when the input forces FD, FU, respectively, each cross the respective threshold, the feedback force FF may be applied to the feedback surface 128. In some embodiments, the input force FD or FU may be used by the haptic device 102 to vary the force required to cross the down threshold and/or the up threshold. As an example, the haptic device 102 may be configured so if a user drags his or her finger across the feedback surface 128, the haptic device 102 may enter a "drag mode" and the force necessary to cross either or both the down-stroke threshold and/or the up-stroke threshold may be varied. FIG. 19 is a top perspective view of a user dragging his or her index finger 336 across the feedback surface 128. It should be noted that although FIG. 19 illustrates an index finger 336, in other embodiments, any portion of the hand 330 may be used to activate a "drag mode."

It should be noted that the phrase increasing the down-stroke threshold may generally refer to increasing the level of force a user must provide to the feedback surface 128 in order to register an input to the haptic device 102, as well as to receive feedback from the haptic device 102. Alternatively, the phrase increasing the up-stroke threshold may generally refer to increasing the negative amount of force that a user applies to the feedback surface 128. In other words, how much a user must reduce the force applied to the feedback surface 128 to receive feedback and/or provide an input to the haptic device.

With reference to FIG. 19, to enter drag mode the user may move his or her finger 336 across the feedback surface 128 a predetermined distance without substantially pausing. In other words, the finger 336 may have a constant or varying speed across a portion of the feedback surface 128, rather than a discrete force location without substantially moving a distance across the feedback surface 128 such as during a down click. During the drag, the user may also apply some down-stroke FD force, which may be constant force or may be non-constant force and thus increase when a user wishes to provide an input to the haptic device 102. Further, the down-stroke and/or up-stroke thresholds for other portions of the user's hand 330 not providing the drag input may be lowered during a drag of the finger 336.

Figure 20:
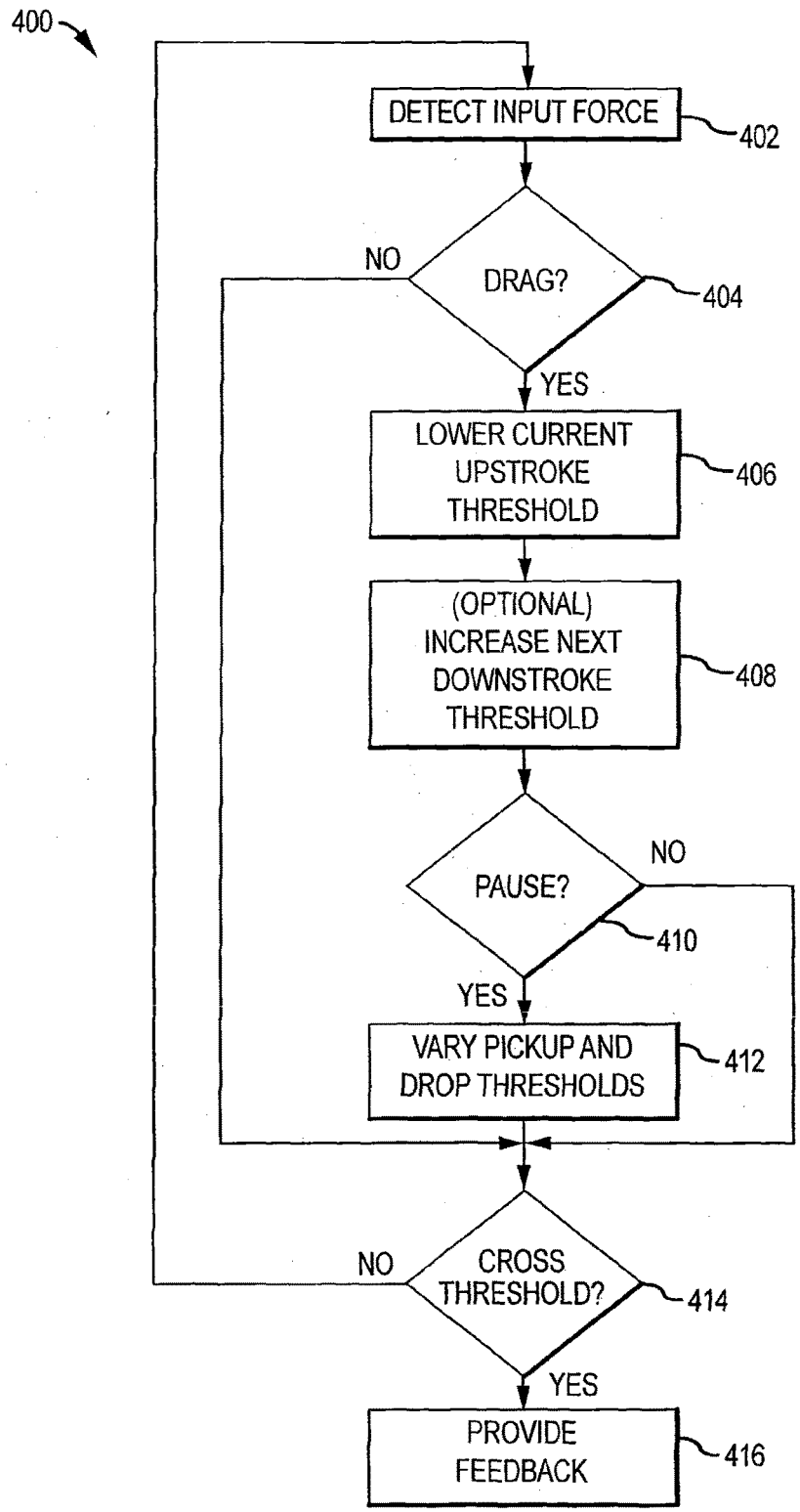
FIG. 20 is a flow chart illustrating a method for using a drag force to modify the down-stroke and/or up-stroke thresholds.

A method for varying either or both the up-stroke threshold and the down-stroke threshold will now be discussed. FIG. 20 is a flow chart illustrating a method for using a drag force to modify the down-stroke and/or up-stroke thresholds. The method 400 may begin with operation 402 and the haptic device 102 may detect an input force. For example, the input sensors 122 may detect whether a user is touching the feedback surface 128 and/or providing a down-stroke force FD or other input to the haptic device 102. If an input force is detected, the method 400 may proceed to operation 402 and the haptic device 102 and/or the processor 116 may determine whether a drag is initiated. In some instances, the force sensors 130A-130D may detect a relatively constant force that moves across various positions of the feedback surface 128. For example, the global force centroid $C_{GF}$ may change locations, but the down-stroke force FD may remain relatively constant. In this instance, the processor 116 may determine that a drag is being implemented across the feedback surface 128 and the method 400 may proceed to operation 406. If a drag is not detected the method 400 may proceed to operation 418, discussed in more detail below.

When a drag is detected and the method 400 proceeds to operation 406, the haptic device may increase the up-stroke threshold. In this manner, the haptic device 102 may require a larger decrease in force in order to provide an input to the electronic device and/or feedback to the user. This may allow the haptic device 102 to continue to receive the "drag" input, even if the user inadvertently further reduces the force applied to the feedback surface 128 as the finger 336 moves from a first location to a second location. Additionally, as a user drags his or finger 332 across the feedback surface 128, the down-stroke force FD and the up-stroke force FU applied by the user may be "noisy" in that the force levels may vary across the drag. Thus, the haptic device 102 may help prevent inadvertent de-selections by the user during a drag movement. As a non-limiting example, the drag motion may be used by the haptic device 102 to move an icon, graphic, or other element across a display screen, and by reducing the maintenance force required for the user to maintain the "drag" motion, the haptic device 102 may not instruct the processor to "drop" an item if a user reduces his or her force applied to the feedback surface 128 during the drag motion. As a specific example, the up-stroke threshold may be set to be 90% less than the down-stroke threshold so that the user may have to remove a significant amount of force from the feedback surface 128 in order to cross the up-stroke threshold. In some embodiments, the drag motion could activate the exit threshold for a particular force ladder.

This type of force laddering is discussed in more detail below with respect FIG. 13.

After or during operation 406, the method 400 may proceed to operation 408 and the haptic device 102 may increase the force necessary to cross the down-stroke threshold. In some instances, when a user is dragging his or her finger 336 across the feedback surface 128 he or she may also be applying a certain level of down-stroke force FD. In these instances, the haptic device 102 may increase the down-stroke threshold, so that the user may be prevented from inadvertently crossing the threshold while dragging. As a non-limiting example, the dragging motion may be used by an user to drag an icon or other item across a display screen, and when the down-stroke threshold is crossed the haptic device may provide input to the processor 116 to de-select or "drop" the icon. Accordingly, during the drag motion, the down-threshold may be increased by the haptic device 102 to help prevent inadvertent dropping of the icons. In other words, typically during a dragging motion, a user may apply some down-stroke force FD as the finger 336 moves across the surface 128, and so the originally set down-stroke threshold may only require a slight increase of force from the drag increase and could potentially be inadvertently crossed. Hence, by increasing the down-stroke threshold during a drag motion, the user may be less likely to inadvertently the threshold to cause an accidental input to the processor 116.

After operations 406 and 408, the method 400 may proceed to operation 410 and the haptic device 102 may determine whether there has been a pause in the dragging motion. A pause may be determined by the input sensors 122 detecting a relatively constant force on the feedback surface 128 as during the drag, but with little or no movement across the surface 128. For example, the user may while dragging his or her finger 332 on the feedback surface 128 pause movement but may maintain relatively the same amount of force or pressure on the feedback surface and may not release his or her finger 332. In this instance, the user may wish to maintain the "dragging," but may not move his or finger. Alternatively, the input sensors may detect an increased amount of force with a reduced velocity across the feedback surface 128.

If a pause is detected, the method 400 may proceed to operation 412 and the up-stroke threshold may be increased from the level set in operation 406. This may require the user to release more pressure or force from the feedback surface 128 in order to cause an input and/or receive feedback from the haptic device 102. In other words, the release or up-stroke threshold may be more "forgiving" while the finger 332 is moving versus when the finger 332 has paused on the feedback surface 128.

Additionally, during operation 412, the down-stroke threshold may be reduced so that a user may have to apply less additional force in order to receive feedback and/or provide an additional input to the haptic device 102. As an example, the dragging motion may be used to move a cursor with an attached icon or element across a display screen. In some instances, the haptic device 102 may provide inputs to the processor 116 that a user wants to "drop" the icon. As briefly discussed above, the haptic device 102 may increase the up-stroke threshold so that the user may have to significantly reduce the dragging force in order to provide an input to drop the item. However, in this instance, because the haptic device 102 may also increase the down-stroke threshold, the user may move the cursor over an second time to be "picked up" and may pick that item up with only a slight increase in the force applied to the feedback surface 128. In other words, the method 400 may allow the user to maintain a drag even during pauses, while at the same time making it easier to add additional items to the drag while paused. Other configurations are also possible. For example, the method 400 may cause the down-threshold to be increased during a pause to help prevent a user from inadvertently picking up items the cursor may be paused over, while reducing the up-stroke threshold so that it may be easier for a user to exit the drag mode and/or drop any items carried by the cursor.

After operation 412, or after operation 410 if no pause is detected, the method 400 may proceed to operation 414. In operation 414, the method 400 may determine if the force applied by the user has cross a threshold, either the down-stroke threshold or the up-stroke threshold. As described above with respect to FIGS. 9-11, the input sensors 122 may detect whether the force level has increased sufficiently to cross the down-stroke threshold or conversely has decreased sufficiently to cross the up-stroke threshold. If force has increased or decreased sufficiently to cross a respective threshold, the method 400 may proceed to operation 416. In operation 416, the haptic device may provide feedback to the user by moving the feedback surface and may also provide an input or command to the processor 116. However, if neither of the thresholds have been crossed, the method 400 may return to operation 402 and the haptic device 102 may continue to sense the input force provided by the user.

It should be noted that as described above, the operations of the method 400 may be performed by the haptic device 102 and/or the processor 116. In some instances, the haptic device 102 itself may perform the operations and in other instances the processor 116 within the electronic device 100 may perform the calculations. Additionally, the up-stroke threshold and/or down-stroke thresholds may be selectable by the user for drag motions through a user interface, and may be set based on substantially any type of characteristic or setting. For example, the user may select a particular drag threshold settings to be active when certain applications are running versus when other ones are not running. Also, in some instances a drag may be part of a gesture that may be used to provide data and other inputs to the haptic device 102. Gestures for inputting data to the haptic device 102 are discussed in more detail below. Moreover, although the above method and embodiments are discussed with respect to "dragging" one or more items, icons, or graphics across the display 104, these methods may be applied to other applications. For example, the thresholds for certain motions may be varied as desired to enhance the user experience with a particular input and/or feedback.

Varying Thresholds

As mentioned above with respect to FIGS. 9-11, the down-stroke threshold and the up-stroke threshold may be changed based on one or more characteristics of the input force or down-stroke force FD and/or the up-stroke force FU, as well as one or more external, internal, or sensed characteristics of the haptic device or electronic device. It should be noted that as described herein, varying the thresholds is meant to encompass changes in the input required to cross a threshold, as well as varying the corresponding feedback associated with the threshold (e.g., the actuation of the feedback surface may change), and/or other characteristics associated with the output by the haptic device 102 may also be varied. For example, if a user is applying an increasing force level, the down-stroke threshold for providing feedback to the user may increase or vary, as well as a visual output or other element for the computing device (e.g., graphic or icon displayed on the display 104). Continuing with the example, if the user is utilizing a web browser program, by pressing harder the user may activate a scrolling function, which may continuing speed up with the increase in force; however, the user may not cross the input threshold to activate a "click" from the haptic device or provide an input selection, or the like to the haptic device.

As a first example, either of the thresholds may be varied based on a characteristic of the user input force (either FD or FU), such as but not limited to magnitude, direction, or acceleration. As a second example, the thresholds may be varied based on the number of fingers of a user providing the input to the feedback surface 128, the finger providing the input (e.g., thumb versus index finger), or input gesture that may be detected by the input sensors 1222. As a third example, the thresholds may be varied based on other characteristics or settings, such as situational and/or environmental characteristics. Methods for varying either or both the down-stroke threshold and/or the up-stroke threshold based one or more of the characteristics will now be discussed in more detail.

Varying Thresholds Based on Force Characteristics

As briefly described above, in some instances the down-stroke and/or up-stroke thresholds may be varied based on one or more characteristics of the input force. Some example force characteristics include, but are not limited to, the acceleration of the force, magnitude of the force, direction of the force (e.g., lateral, straight downwards, etc.), yank (force magnitude plus the rate of change of the force magnitude). As a first example, if a user is playing a video game and using the haptic device 102 as an input device, the user may rapidly provide inputs (e.g., clicking on the feedback surface 128 quickly) and in succession. In this instance, the haptic device 102 may decrease the down-stroke and/or up-stroke thresholds so that it may be easier for a user to receive feedback from the haptic device 102, as well as cross an input threshold to provide an input to the haptic device 102. In this manner, the user may be able to more quickly and easily provide input to the electronic device 100.

The haptic device 102 may also vary the thresholds based on a velocity of the down-stroke force FD and/or the up-stroke force FU. For example, the processor 116 may have predefined input waves or signals to the actuator 124, such as a high velocity input wave and a low velocity input wave, which may cause different outputs by the feedback surface 128 (see FIGS. 21-21D for different input wave examples). In this example, if the input velocity is a "high" range the actuator 124 may activate the high velocity input wave and vice versa if the input velocity is within a "low" range. Additionally, if the velocity is between the two predetermined velocities, the actuator 124 may actuate a waveform that may be between high velocity waveform and the low velocity waveform. Similarly, the haptic device 102 may reduce the force required to cross one of the thresholds based on how fast/slow the user is providing the force. In this manner the more quickly the force is applied the easier it may be to cross a particular threshold. Moreover, in some instances, the thresholds may be set to correspond to a particular velocity. As an example, the down-stroke velocity may only be crossed when the input force is applied at a predetermined velocity, such that regardless of the magnitude of the force, the user may not receive feedback if he or she does not provide a force that exceeds the velocity threshold.

The haptic device 102 may also vary the thresholds based on an angle of the force. A user may in some instances provide a force that may be substantially perpendicular to the feedback surface 128 and in other instances the user may provide a force that may be at another angle to the feedback surface 128 (e.g., his or her finger may be angled relative to the feedback surface 128). The haptic device 102 may detect or estimate the angle of the force using the position sensors 127, which may detect the position of input finger or fingers on the feedback surface 128, as well as the force sensors 130A-130D and/or gyroscopes which may detect twisting in the feedback surfaces 128 as the input force is applied. In other instances, the angle of the input force or down-stroke force FD may be detected in other manners.

Continuing with this example, the haptic device 102 may lower the down-stroke threshold if the input force is at an angle other than perpendicular to the feedback surface 128, and may raise the down-stroke threshold if the input force is perpendicular to the feedback surface 128. In this manner, the same amount of input force may cross the down-stroke threshold if the user has his or her finger angled at 30 degrees relative to the feedback surface 128 but may not cross the down-stroke threshold if the user has his or her finger angled at 90 degrees relative to the feedback surface. Thus, the user may have to apply more force when his or her finger is directly perpendicular to the feedback surface 128. It may be desirable to vary the thresholds in this manner because a user may press harder when his or her finger is directly perpendicular to the feedback surface. However, in other instances it may be desirable to lower the threshold for perpendicular inputs as compared to other angled inputs. For example, some users may rarely apply an input force at an angle directly perpendicular to the feedback surface 128, and in these instances, a directly perpendicular force may indicate a special or certain (i.e., non-accidental) input force and thus may have a lowered down-stroke threshold to allow the user to receive feedback at a lower force magnitude.

It should also be noted that in some instances the angle of the input force may also be used to vary the input or commands communicated to the computing device 100 from the haptic device 102. For example, an input force having a first angle may represent a first input whereas an input force having a second angle may represent a second input. Also, in some instances, the haptic device 102 may reduce the threshold for the range of input force angles that are most commonly input to the feedback surface 128 and may increase the threshold for the range of angles that are uncommon. In these embodiments, the haptic device 102 may reduce the chance that inadvertent touches may be treated as an input. For example, a user may typically provide an input force generally straight up and down relative to the feedback surface 128 and so a force detected at another angle may indicate that the user accidentally provided a force while typing on the keyboard, or other accidental touch.

As yet another example, in some instances, the angle of the input force may represent different types of inputs, e.g., a perpendicular force may represent a "jump" move in a video game and 40 degree force may represent a "duck" input for a character in the video game. In this instance, the thresholds may be varied to vary the feedback and input required to activate a particular input, e.g., the jump function may require more force than the duck function.

In some instances the haptic device 102 may vary the one or more thresholds based on the yank or thrust of the input force which may be defined as a value including the magnitude of the force, as well as the rate of change of the force. In this manner, the same magnitude forces may activate different thresholds depending on how quickly those forces are applied, e.g., a slowly applied large force may activate a first feedback response whereas a quickly applied force of the same magnitude may activate a second feedback response.

As briefly discussed above in some instances, the haptic device 102 may vary the thresholds based on a magnitude of the down-stroke force FD and/or up-stroke force FU. For example, the haptic device 102 may allow users that are relatively light "pushers" to more easily cross the down-stroke threshold and/or up-stroke threshold, as well as accommodate the heavy "pushers" so that they may have to provide an increased force to cross a particular threshold. In this manner, users that provide varying input force amounts may receive feedback at relatively corresponding levels of perceived input force. That is, light and heavy pushers may receive feedback at 80% of their highest force magnitude, despite that each the heavy pushers and the light pushers may have drastically different highest force magnitudes.

Alternatively, as briefly discussed above, the haptic device 102 may vary the thresholds to encourage a particular input type. For example, the down-stroke threshold may be reduced over a period of time to encourage users to provide a reduced down-stroke force FD. This may help to increase the longevity of the haptic device 102 by reducing the potential wear due to increased force levels. As another example, the haptic device 102 may increase the down-stroke threshold over a period of time to encourage user press harder on the feedback surface 128.

In some embodiments, the haptic device 102 may vary the down-stroke threshold based on a first characteristic and may vary the up-stroke threshold based on a second characteristic. For example, the down-stroke threshold may be set to be activated a particular velocity of the input force and the up-stroke threshold may be varied based on a force magnitude that was reached when the input force reached the down-stroke threshold velocity. In this example the down-stroke threshold may be constant in that it may be always be crossed when the input force reaches a particular velocity, but the up-stroke threshold may vary with every input force. That is, because the user may apply different magnitudes of the input force at the same velocity, the up-stroke threshold may be varied although the down-stroke threshold may be the same.

The haptic device 102 may also be configured to vary the output or feedback to the user based on the number of fingers providing the input force. For example, if a user provides the input force with two fingers the down-stroke threshold may be increased as compared to instances where the user may provide the input force with only a single force. Similarly, as briefly discussed above, the haptic device 102 may vary the thresholds based on which finger is providing the input force. As discussed above, the haptic device 102 using the position sensors 127 and the force sensors 130A-130D may determine the finger or fingers used to provide an input force to the feedback surface 128. In these instances, the haptic device 102 may increase, decrease, or otherwise vary the thresholds based on the fingers providing the input fore, e.g., the index finger may have to apply an increased force to cross the thresholds as compared to the pinky finger.

Similarly, the haptic device 102 may vary the thresholds based on a contact shape of the input force. In this example, a larger contact shape of the input force may require a larger force level, such that a user using a pad of his or her finger to apply the input force may have to apply a larger force as compared to a user using a tip of his or her finger to apply the input force. Alternatively, in some embodiments, the smaller the contact shape the increased force required. For example, children may typically have smaller fingers, and may have a smaller contact area when providing a force to the feedback surface 128. In some instances the haptic device 102 may vary the thresholds to act as a child-lock, such that if a small contact shape is detected as providing the input force the haptic device 102 may assume that the user is a child and may substantially increase the down-stroke threshold. In this way it may be difficult for the child to provide inputs to the electronic device 100. Conversely, if a user is presumed to be a child, the haptic device 102 may lower the down-stroke threshold so that it may be easier for the user to provide input.

As another example, the thresholds for the haptic device 102 may be varied based on the number or type of touch inputs to the feedback surface 128. For example, if the user provides an input force with two separate fingers substantially simultaneously, one or both of the thresholds may be changed as compared to instances where the user may provide an input force with a single finger. Additionally, in such embodiments, the haptic device 102 may vary the thresholds based on an anticipated gesture. For example, if the haptic device 102 detects that the user may be entering a particular gesture, such as pinching his or her fingers together, the haptic device 102 may vary one or both thresholds. Continuing with this example, the force required to cross the down-stroke threshold for a "pinching" gesture may be reduced as compared to a "pulling" gesture. In this manner, the thresholds may be used to also provide a level of output to the user, e.g., the pulling gesture may be perceived as being different than the pinching gesture.

It should be noted that varying the thresholds may be used to modify the output provided by the haptic device 102, in addition to or instead of varying the force level for crossing the threshold. That is, the movement of the feedback surface 128 may be changed for a particular threshold (e.g., the provided feedback), rather than the input force or timing required to cross a threshold and provide feedback to the user. In these embodiments, the output sensed by the user may be varied based on the various characteristics described herein. As one example, the down-stroke threshold may be varied to decrease the movement of the feedback surface 128 for inputs provided by a user's thumb as compared to the movement of the feedback surface 128 for inputs provided by a user's index finger. In this instance, the feedback surface 128 may be configured to have a consistent output feel regardless of the finger providing the input. The feedback perceived by a user may be related to the surface area of his or her finger on the feedback surface 128. Accordingly, smaller movements may be felt more strongly by the thumb than the pinky finger and by reducing the movement of the feedback surface 128 for inputs by the thumb, the user may perceive the feedback for both pinky inputs and thumb inputs to be relatively constant.

The haptic device 102 may also vary the thresholds based on a motion of the input force. The position sensors 127 may track a user's motion across the feedback surface 128 when providing a particular input force. In other words, the position sensors 127 may determine if a user is moving his or her fingers right to left across the feedback surface 128, moving them vertically across the surface, or the like. In some instances, the haptic device 102 may activate different thresholds based on the direction of the input movement on the feedback surface 128. As a specific example, an input that swipes right to left may have a first threshold setting and an input that swipes up to down vertically may have a second threshold.

Non-Force Related Characteristics

The haptic device 102 may vary the down-stroke threshold and/or the up-stroke threshold, as well as the corresponding output associated with each threshold, based on non-force related characteristics. For example, the haptic device 102 may vary the thresholds based on inputs sensed by the sensors 140 of the electronic device 100, application instructions, user settings, system state, environment of the electronic device, or the like.

A first example of modifying the thresholds based on non-force related characteristic may be to vary the down-stroke threshold based on whether a user is present in front of the display 104 or other portion of the computing device 100. The sensors 140 may include a camera or other presence detecting mechanism which may be used to determine if a user is positioned near the electronic device. In instances where a user may not be present, the down-stroke threshold may be significantly increased so that elements, objects, or animals (e.g., cats) may be less likely to activate an input from the haptic device 102. For example, in this embodiment, when a user is not present, if a cat were to brush its tail against the feedback surface 128, the haptic device 102 may not register an input. In a specific example, this may allow the electronic device 100 to remain in a sleep mode, despite a force being applied to the feedback surface 128, thus potentially saving power and reducing accidental inputs.

A second example of modifying the thresholds may be varying the thresholds based on an environment of the electronic device. The sensors 140 of the electronic device 100 may be used to detect at least one environmental characteristic of the haptic device 102 and/or electronic device 100, which may then be used to adjust one or more thresholds. As a specific example, the electronic device 100 may include an accelerometer and/or gyroscope and may detect whether the electronic device 100 is being moved around and/or rotated and may vary the thresholds correspondingly. This may help to prevent the electronic device for registering accidental inputs, such as if a user is riding in a bus which may have a rough ride, causing the device 100 to bump up and down. In this instance, the user may accidentally provide a force to the haptic device 102 as the electronic device 100 bumps up and down. By increasing or otherwise varying the thresholds, the haptic device 102 may be less likely to register an input from accidental bumps.

As another example, the electronic device 100 may use its sensors 140 determine if it is positioned on a flat surface such a desk or a non-planar surface, such as a user's lap. In these instances, the thresholds may be varied, as desired. In some instances it may be desirable to lower the threshold when the device 100 is in a user's lap as it may be somewhat more difficult for a user to provide as much force to the feedback surface 128 while holding the electronic device 100. Similarly, the haptic device 102 may use a gyroscope to determine if the electronic device 100 is being tilted or otherwise oriented in a non-typical manner. In these examples, the thresholds may be decreased assuming that it may be more difficult for a user to enter an input as he or she may be balancing the electronic device 100.

In some embodiments a three-axis accelerometer may be used to sense environmental characteristics. In this case the processor 116 may analyze a signal from the accelerometer to analyze the three axes and depending on the noise signal level, may vary the thresholds. In some instances, the input sensors 122 of the haptic device 100 itself may be used to determine one more of the environmental characteristics which may be used to vary the thresholds. For example, the acceleration sensor 132 within the haptic device 102 may determine an acceleration of the feedback surface 128 itself, which may then be used to vary one or more of the thresholds.

A third example of modifying the thresholds based on a non-force characteristic may be to vary the thresholds based on a particular user. Either using a user logon information, facial recognition (e.g., via the input sensors 140 of the device 100), or other types of user recognition (voice, finger print, and so on), the haptic device 102 may change the thresholds to either those set by the user or those determined to best accommodate a particular user's typical habits. With the first option, the user may have selected particular settings for the thresholds, either overall or with respect to select programs, and once the electronic device 100 recognizes the particular user the electronic device 100 may activate those particular user thresholds. With the second option, the haptic device 102 may have stored typical user behavior information such as typical force input, finger typically used, and/or click frequency, which may then be used to vary the thresholds in a manner desired.

A fourth example of modifying thresholds based on environmental factors, may be a more generic option to the third example. Specifically, the haptic device 102 may track behavior, which may or may not be specific to a particular user, over a predetermined time period. After which the haptic device 102 may modify one or more thresholds based on the history of the previous clicks, typical input behavior during one or more applications, and/or typical time usage.

A fifth example may be to use time to vary one or more thresholds. The time used may be the time of day (e.g., at night the thresholds may be increased), the time between clicks (e.g., the more rapidly the thresholds provide input, the easier it may become to cross thresholds), or the like.

A sixth example of varying the thresholds based on environmental factors may be based on an acoustical environment of the electronic device 100. For example, the sensors 140 of the electronic device 100 may be configured to detect changes in ambient noise, which may then be used to vary the thresholds. Such embodiments may increase the down-stroke threshold if the ambient noise increases past a certain decibel level. Similarly, the electronic device 100 may include an ambient light sensor which may detect changes in an ambient light, and the haptic device 102 may vary the thresholds based on the surrounding light.

A seventh example of varying the thresholds based on environmental factors may be based on a stress/strain analysis. For example, the force sensors 130A-130D may detect stress and/or strain forces as applied to the feedback surface 128. The presence of stress and/or strain may indicate that the haptic device 102 is being warped or a force is applied unintentionally. This may be based on the assumption that a user input force may generally be applied without providing a bending force to the feedback surface 128 which could cause stress or strain on portions of the surface 128. As one example, a force detected by each of the force sensors 130A-130D may be compared to determine if there is a stress/strain on the feedback surface. As a second example, a time-weighted or backward-looking force curve of the input force may be analyzed to determine if the input force included stress and/or strain.

An eighth example of varying the thresholds based on environmental factors may be to vary the thresholds based on context. For instance, the location of a cursor correlated to the haptic device 102 may be used determine certain thresholds or other behaviors. If the cursor is positioned in the window of a particular application, the application may have a set "force profile" which may vary the thresholds accordingly (see FIGS. 22-24 for examples of applications setting profiles for the haptic device). As an example, an application may have a down-stroke threshold for a certain icon that is relatively low for a first icon and an increased down-stroke threshold for a second icon. Similarly, the thresholds may be varied based on the current application running, state of the electronic device 100 (e.g., sleep or standby), or other system inputs separate from the haptic device 102 specifically.

The above examples of varying the thresholds are meant as illustrative only, and there are many other manners in which the thresholds may be changed or otherwise altered. Further, although the thresholds may be discussed with reference to certain inputs, applications, or the like, it should be noted that the thresholds may be varied in other manners as well.

Enabling or Disabling Thresholds

In addition to varying the down-stroke and/or up-stroke thresholds, in some instances the haptic device 102 may enable or disable particular thresholds based on or more characteristics. As one example, a user may have multiple fingers on the feedback surface 128 and may inadvertently apply a force with one finger. The haptic device 102 may analyze the input force and determine whether the input is deliberate, accidental, or a resting position of the user's hand. For example, if the haptic device 102 receives a strong force input from the index finger and small force input from a palm portion or thumb, the haptic device 102 may disregard the small input and assume it was inadvertent (e.g., due to a user resting his or her hand on the feedback surface 128 while correspondingly using his or her index finger to provide input to the haptic device). In other words, the thresholds for the thumb or palm of the hand may be disabled and forces input by those portions of the hand may not be able to (at least temporarily) cross a threshold.

Similarly, as discussed above with respect to varying the thresholds, the thresholds may be disabled based on the contact shape for the input force finger. In this manner, the down-stroke and/or up-stroke thresholds may be disabled if the contact area is below a normal contact area size, which may indicate that a child is using the haptic device 102. As another example, a user may generally not provide input with his or her thumb, and so in instances where the contact shape may be larger than the typically received shape, the thresholds may be disabled to help prevent inadvertent inputs being recognized by the haptic device 102.

Varying Input

As briefly discussed herein, the haptic device 102 may be configured to receive different types of inputs from the user. For example, the haptic device 102 may be configured to receive input from a single finger, a combination of fingers, as well as differing force levels for each finger or fingers. Additionally, the haptic device 102 may be configured to receive gesture input, e.g., certain input characteristics may be mapped to additional data or information input to the haptic device 102. As an example, the user may swipe his or her finger across the feedback surface 128 at a particular force, and the swiping motion as well as the direction and force level may be all be considered different inputs, which may be used to provide various inputs to an application or the like. As another example, the user may pinch or pull his or her fingers across the feedback surface 128, and the gesture as well as the fingers and/or the force of each finger may be used by the haptic device 102 as separate inputs.

It should be noted that using the stages or ladders as described above, may allow the haptic device 102 to recognize particular gesture within stages. This may allow the user to receive feedback while inputting the gesture. For example, as the user first applies an input force that is ultimately part of a gesture, the haptic device 102 may provide a first click and then as the user transitions through the stages, the haptic device 102 may continue to provide feedback to the user indicating the progression of the gesture through the stages.

In yet other examples, the haptic device 102 may determine whether a particular input is capacitive or resistive and based on the particular type of input the haptic device 102 may vary the thresholds. As an example, a resistive input might require more or less force to achieve the same feedback as a capacitive input.

Generally, it should be noted that the present disclosure of thresholds, entering thresholds, crossing thresholds, and so on may apply to components other than movable or output devices. For example, a computing device may use the force, position, velocity, and/or other sensors to detect one or more user inputs, and how those inputs change over time or the like, although those inputs may not be correlated to a specific output. In other words, the thresholds may be used to track user inputs and/or provide output separate from a haptic device, such as a varying display output or the like. Thus, many embodiments herein may be implemented without a movable surface, and may not be correlated to an output or feedback produced by the feedback surface or other similar surface.

Varying Actuator Waveforms

The waveforms input to the actuator 124 may be varied to change the output perceived by a user. The output perceived by the user may be a combination of the contact experienced by the user's finger or fingers when touching the feedback surface 128 as well as the output heard by the user (e.g., a sound due to the movement of the feedback surface 128 as pulled by the actuator 124). Accordingly, in many instances, the feedback perceived by a user may be varied by not only changing the displacement of the feedback surface 128, but the sound created by the haptic device 102 as well. It should be noted that the sound produced by the haptic device 102 may be the sound from the actual displacement of the feedback surface 128 or may be a sound emitted by a speaker or other element to enhance the feel of the output.

As briefly described above with respect to FIGS. 2-7A, the actuator 124 may physically move the feedback surface 128 based on one or more input signals, which may be one or more waveforms. In some embodiments, the input waveforms may be waveforms such as, but not limited to, a half sine wave, half elliptical wave, a saw-tooth wave, a sine-squared function, a ramp down wave, and/or a square wave. However, it should be noted that the type, period, amplitude, and/or frequency of the input waveforms may be varied as desired, and the above-listed waveforms are illustrative only. As the actuator receives a specific waveform, the mechanical movement output by the actuator may vary, such that a half sine wave may have a different output profile as compared to the square wave. In other words, the displacement distance and/or speed of the feedback surface 128 may be varied by changing the shape, magnitude, and/or duration of the input waveform. Thus, by changing the input waveform the feedback experienced by the user may be changed. Additionally, as will be discussed in more detail below, the sound experienced by a user while experiencing the other feedback from the haptic device 102 may alter the actual feedback perceived by the user.

Figure 21:
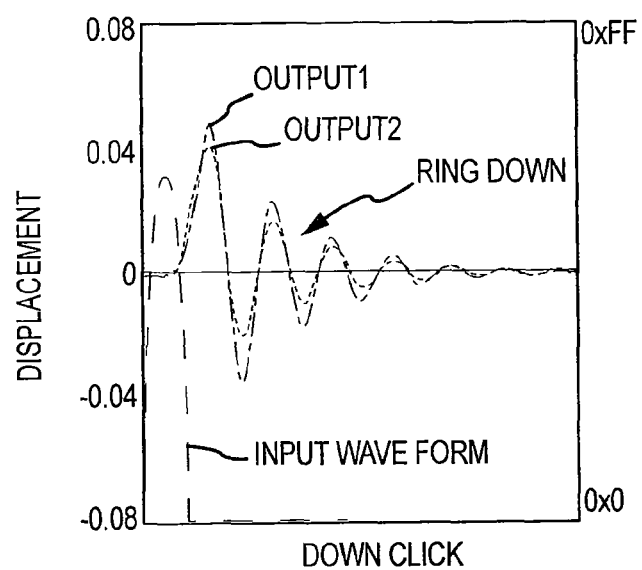
FIG. 21 is a graph illustrating an input waveform input to one or more actuators of the haptic device to cause a feedback surface to move in at least one direction.

In some instances, movement of the feedback surface 128 in response to a particular waveform may be a damped response, in that the feedback surface 128 may be actuated by the actuator 124 and then may oscillate at reduced levels towards the normal position. In other words, the feedback surface 128 may have an initial displacement and then a series of smaller displacements as the feedback surface 128 is acted upon by the biasing members 134A-134D. FIG. 21 is a simplified graph illustrating a single input waveform and the corresponding displacement profiles, output displacement 1 and output displacement 2, of a first actuator and a second actuator, respective. In some embodiments, the haptic device 102 may include two actuators 124 which may be configured to each provide a mechanical force in response to the input waveform to move the feedback surface 128. Thus, as shown in FIG. 21, there may be two separate displacement outputs, as the feedback surface 128 may be moved by two separate actuators.

As can be seen in FIG. 21, after the initial pulse by the input waveform, the output displacement of the feedback surface 128 may have additional oscillations or ring down waves. The ring down output response may be due to the fact that feedback surface 128 is supported on the biasing supports 134A-134D (which may be resilient) and thus the structure may act as a mass (feedback surface 128) on a spring (biasing supports). Thus, although the actuator 124 may provide only a single movement impulse in response to the single peak input waveform (e.g., a half sine wave), the feedback surface 128 may oscillate slightly after the original movement. In some instances the oscillations may feel "buzzy" or non-crisp to the user. In other words, because the feedback surface 128 may oscillate, a single "click" or movement may feel like a series or movements, rather than a discrete output.

Figures 21A, 21B:
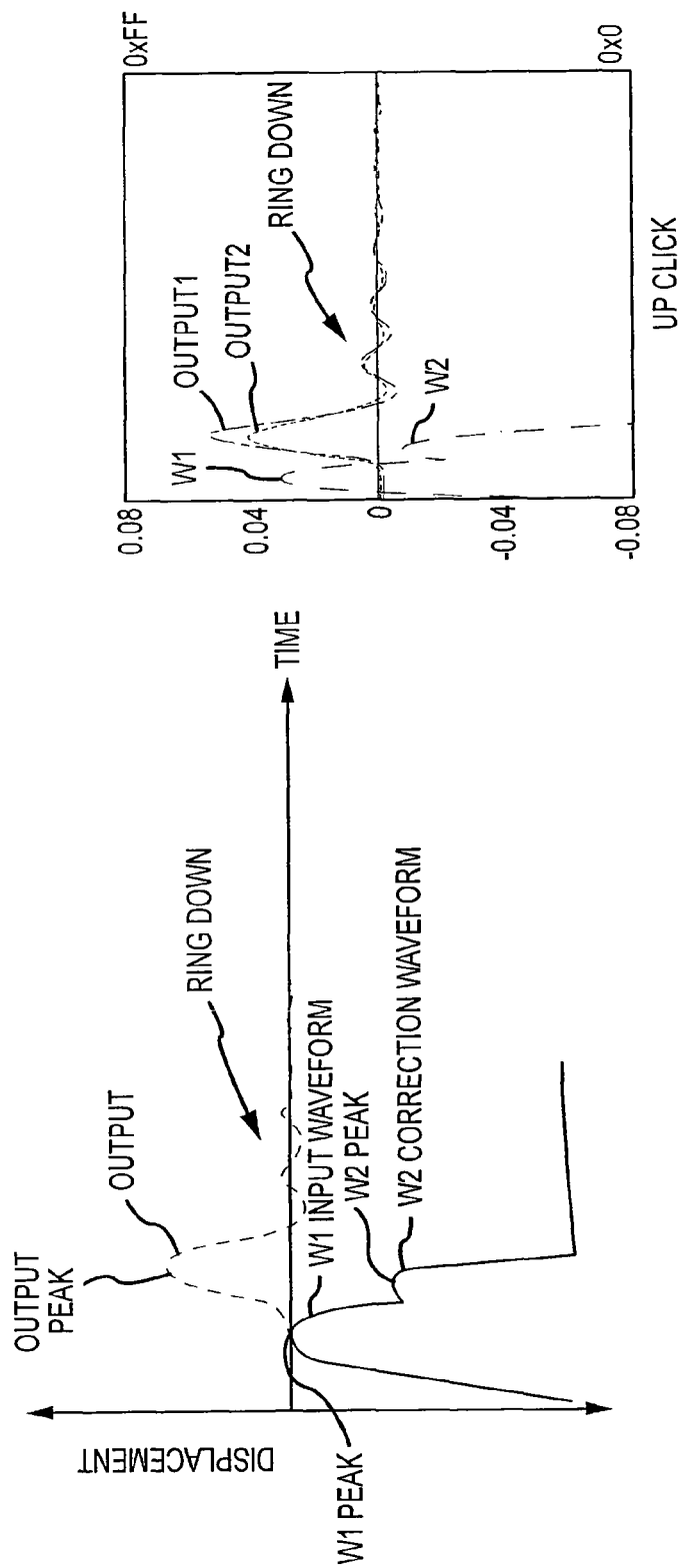
FIG. 21A is a simplified graph illustrating a first input waveform W1 and a second input waveform W2 applied and the corresponding output response of the feedback surface.
FIG. 21B is a graph illustrating the first input waveform and a correction waveform applied to the actuators on a down-stroke and an up-stroke and the corresponding output response of the feedback surface.

In order to reduce the oscillations of the feedback surface 128 and produce a "crisper" or "cleaner" output feel to the user, the input waveforms to the actuator 124 may be varied. FIG. 21A is a simplified graph of an input waveform including a correction waveform peak. As one example, a second input waveform may be applied to the actuator 124 after the first input waveform is applied. The second input waveform may counteract the oscillation movements of the feedback surface 128 resulting from the application of the first waveform. In other words, the second input waveform may function to cancel the ring of the first waveform. In some embodiments, the second waveform may be selected based on a desired amplitude ratio and interval of separation between the first waveform to minimize the number of rings or number of oscillations.

In one embodiment, the second input waveform may be applied to the actuator 124 at a down-swing in the first waveform. FIG. 21A is a simplified graph illustrating a first input waveform W1 and a second input waveform or correction waveform W2 applied, as well as a simplified view of the corresponding output response of the feedback surface 128. FIG. 21B is a simplified graph illustrating two displacement outputs (due to two actuators) in response to the first input waveform W1 and the second or correction waveform W2.

With reference to FIGS. 21A and 21B, in some embodiments, the first input waveform W1 may be a half-elliptical wave, which may result in the output peak in the output displacement of the feedback surface 128. For example, in embodiments where the actuator 124 is a solenoid, as the input waveform W1 is applied to the actuator 124, the waveform may cause the core or plunger of the solenoid to move, which may correspondingly move the feedback surface 128 which may be operably connected thereto. This allows the actuator(s) 124 to displace the feedback surface 128 in at least one direction. For example, with brief reference to FIG. 3, the actuator may displace the feedback surface 128 in the Y direction. It should be noted that in embodiments where there may be two actuators, each actuator may be provided with the same input waveform.

With reference again to FIGS. 21A and 21B, there may be a time differential between when the input signal is first received by the actuator 124 and the corresponding displacement or movement of the feedback surface 128. Thus, as shown in FIGS. 21A and 21B the output peak(s) may be offset from the first input waveform peak W1Peak. After the first waveform W1 has been applied to the actuator 124 and the feedback surface 128 has begun to displace, the second input waveform W2 may be applied to the actuator 124. As shown in FIGS. 21A and 21B, the second wave-form W2 may also be an half-elliptical wave, but may have a lower amplitude than the amplitude of the first input waveform W1. However, as will be discussed in more detail below, the correction waveform or pulse may be a different shape and/or amplitude from the initial waveform. Additionally, although the input waveform and the correction waveform are discussed as being half-elliptical waves, as will be discussed in more detail below, the shape of the waveforms may be varied depending on the desired output response from the feedback surface 128.

The timing of the application of the second input waveform W2 may be varied depending on the desired output response of the actuator 124. However, in some embodiments, the second input waveform W2 may be applied at a midpoint in the down-swing of the first input waveform W1. In some instances it may be desirable to apply the second input waveform W2 while the feedback surface 128 is still moving due to the first input waveform W1, e.g., during the first peak amplitude of the feedback surface 128 displacement. Specifically, the second input waveform W2 may be activated during the down-stroke of the first input waveform W1, but while the feedback surface 128 is moving. This may allow the second input waveform W2 to hit the actuator 124 at approximately a first overshoot of the first input waveform W1's ring down. In this manner, the second waveform W2 may cause the actuator(s) 124 to counteract the oscillating force due to the biasing members.

As shown in FIG. 21A, the second input waveform W2 may have a peak W2Peak that may be a lower amplitude than the peak W1Peak of the first input waveform W1. It should be noted that the timing between the first input waveform W1 and the second input waveform W2, as well as the amplitudes or peaks W1Peak and W2Peak may be varied depending on where the additional actuation by the actuator 124 may be desired. The second waveform W2 may cause the actuator 124 to move sufficiently to help reduce the oscillations experienced by the feedback surface 128, which may allow the output to be flattened out and provide a "cleaner" output feel. That is, the second waveform W2 may allow the feedback surface 128 to move at a single movement pulse (rather than a damped ring). Comparing FIG. 21 to FIGS. 21A and B, the ring down oscillations have been significantly reduced and a user may be less likely to feel the small displacements, which may make the initial peak movement feel like a single isolated movement, and thus a "clean" click.

Figure 21C:
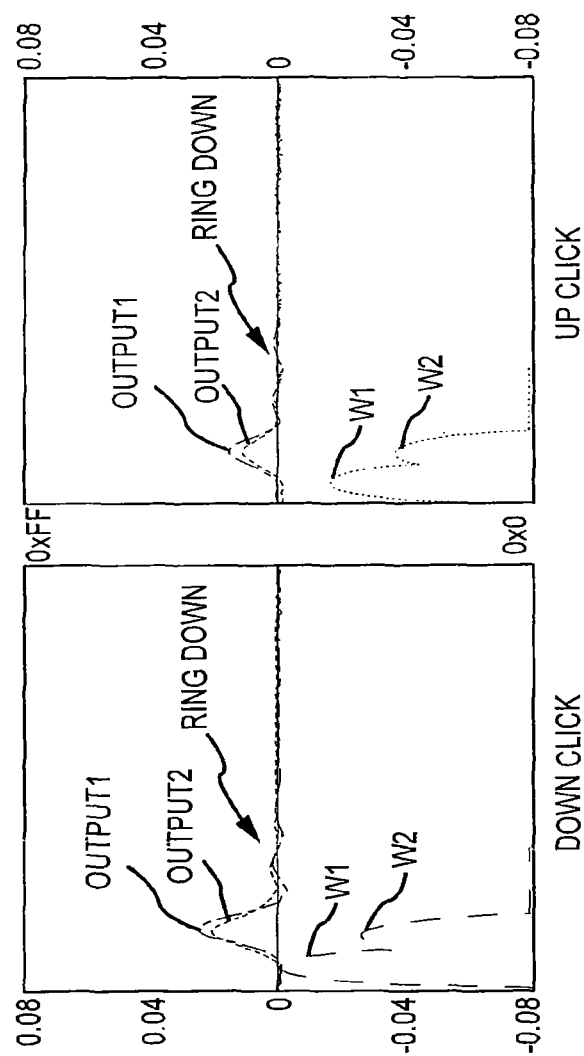
FIG. 21C is a graph illustrating the first input waveform having a first amplitude and a correction waveform having a first amplitude applied to the actuators on a down-stroke and an up-stroke and the corresponding output response of the feedback surface.
Figure 21D:
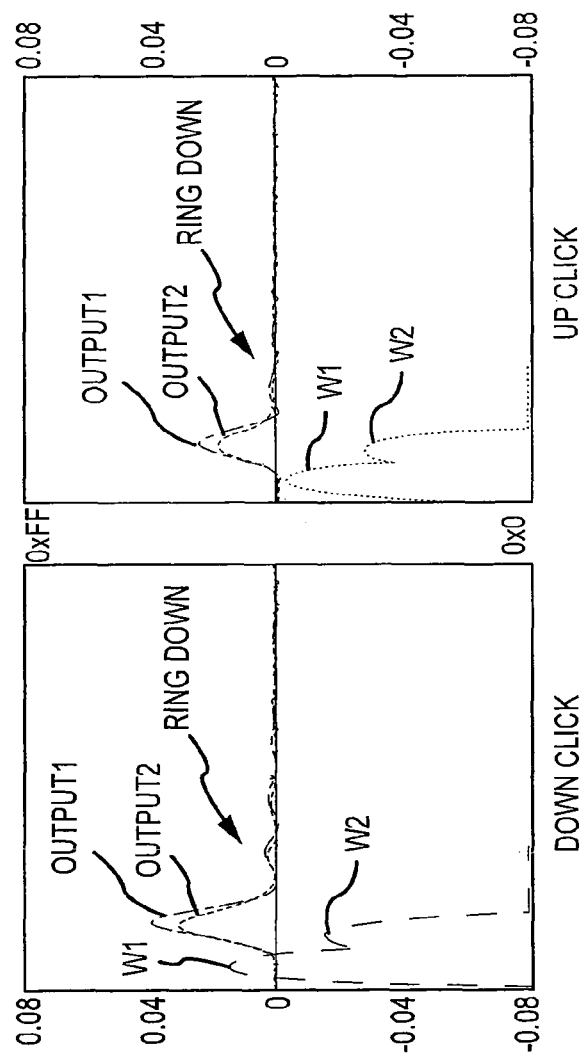
FIG. 21D is a graph illustrating the first input waveform having a second amplitude and a correction waveform having a second amplitude applied to the actuators on a down-stroke and an up-stroke and the corresponding output response of the feedback surface.

It should be noted that the amplitude of the input waveform W1 and the correction waveform W2 may be varied, depending on the desired feedback response (e.g., more or less forceful, and/or the ring down correction that may be required. FIGS. 21B-21D are simplified graphs illustrating input waveforms and correction waveforms with different amplitudes. As can be seen in FIGS. 21B-21D, the displacement distance (y axis of the graphs) may be increased, as the amplitude of the input waveform increases. Thus, the correction waveform of second input waveform W2 may have an amplitude that increases relative to the input waveform, to better counteract the ring downs.

As discussed above, in some embodiments, the haptic device 102 may provide feedback force FF in response to an up-stroke and/or a down-stroke force by the user. Therefore, in some embodiments, the feedback force in response to the down-stroke and the up-stroke may include the input waveform and the correction waveform. As shown in FIGS. 21C and 21D, the up-stroke waveforms may have a reduced amplitude as compared to the down-stroke waveforms, but also may include a correction waveform that may be applied in a similar manner as the input waveform for the down-stroke force. In this manner, the feedback force provided by the haptic device in response to either a down-stroke or an up-stroke may feel crisper.

In some embodiments, the first input waveform W1 and the second input waveform W2 may be elliptical or square waves (or portions of those type of waves). In some instances, the square waves and elliptical waves may be more efficient than sine waves in reducing or preventing the oscillations of the feedback surface 128. However, in some instances other considerations may be used to determine the input waveforms W1, W2.

Sound produced by the haptic device 102 may vary based on the wave type, which may be another factor besides oscillations that may be taken into account in adjusting the desired feedback perceived by a user. As described above, the output experienced by the user may be a combination of the tactile feel of the displacement of the feedback surface 128 as well as the sound as the displacement occurs. This is because in some instances the frequency of a sound can affect the frequency of a movement felt by the user. Accordingly, in some instances different waveform shapes may have different sound characteristics, the output perceived by a user, which may include any oscillations, may depend at least partially on the sound produced by the haptic device 102.

In some instances, a sine input wave may have a relatively low pitch frequency, an elliptical input wave may have a high frequency component and may sound higher than a sine wave, a square wave may have the highest frequency between the elliptical wave and the sine wave. Hence, depending on the desired output feel desired, the square wave, which may be the most efficient at reducing oscillations, may produce a sound that may be unappealing to one or more users and may counteract the tactical feel produced by the wave.

However, in some instances, certain shapes of input waves may be combined to create a general shape that matches another type of input wave. For example, multiple sine waves in series could be used to create a square wave, and in this case, the created "square: wave may include the high frequency component of the sine waves.

With reference again to FIG. 21A, in some examples, the sound of the waveforms W1 and W2 may be controlled independently of the displacement effects of those waveforms W1 and W2. Some control techniques which may be used to adjust the sound characteristics of the haptic device 102 to more accurately match the desired output may include filtering the waveforms W1, W2, dampening the waveforms W1, W2 and then applying the damped waveform to the actuator 124, or creating an input wave shape from a combination of other wave shapes.

Furthermore, it should be noted that in some instances, different waveform shapes may produce the substantially the same displacement characteristics for the feedback surface 128. In these instances, the output of the haptic device 102 may be tuned based on the sound of a particular waveform alone. As an example, a user interface of the electronic device 100 may allow a user to adjust the tactile response of the haptic device, as well as the sound produced by the haptic device 102.

In some embodiments, waveforms may be selected using a characteristic matrix. The characterization matrix may include a number of different waveform characteristics or parameters that may correspond to one or more particular feedback characteristics. As an example, large displacement or a deep sound may be characteristics that may be used to select waveforms for a particular use. Table 1 below is an illustrative matrix that may be used to select one or more waveforms.

TABLE 1

|  | Strong down-click | Strong up-click | Light down-click | Light up-click | Low Frequency Content | High Frequency Content | Needs Dampening |
| --- | --- | --- | --- | --- | --- | --- | --- |
| Waveform 1 | 1 | 0 | 0 | 1 | 1 | 0 | 1 |
| Waveform 2 | 0 | 1 | 0 | 0 | 0 | 1 | 0 |
| Waveform 3 | 1 | 1 | 0 | 0 | 0 | 1 | 1 |
| Waveform 4 | 0 | 1 | 1 | 0 | 1 | 0 | 0 |

With reference to Table 1 above, each waveform may have one or more characteristics, such as a strong down-click force, a strong up-click force, a light down-click force, a light up-click force, predominately low frequency content, predominately high frequency content, and/or may need dampening. Many other characteristics are envisioned, such as, but not limited to, amplitude, symmetry (e.g., symmetric or asymmetric), frequency, duration, voltage range, and so on. As such, it should be noted that the characteristics list in Table 1 are illustrative only and not meant as limiting.

Using a matrix, such as the one illustrated in Table 1, or another selection method, waveforms for a particular use (e.g., threshold setting, application, particular user interface feature, or the like), may be selected by choosing desired characteristics and then matching those to a particular waveform. As an example, in some embodiments, a waveform with a bass sound or tone may be desired and Waveform 1 in Table 1 may be selected due to its low frequency content. In the above example, Waveform 1 may be used to provide output for a deep click, or a click that has crossed multiple ladders or thresholds as discussed above. This may allow the user to experience not only a haptic feedback (e.g., movement), but also audio-feedback as the waveform may produce a deep bass sound. In a second example, a waveform with a high pitch or "chirp" sound may be desired. In this example, a single saw-tooth wave with a low amplitude and duration may be selected which may produce a chirp sound, without the low frequency or bass components. Additionally, the weak duration and strength may not require dampening or ring cancellation, which may also be desired.

As other examples, waveforms may be varied based on status of a button (e.g., enabled, disabled), type of button (e.g., slider, detent), location on a scale (e.g., crossing one or more hash marks on a sliding input), or the like. Yet other examples include using an asymmetric waveform for two similar types of inputs, such as a button input that is toggle on/toggle off. In these examples, a first waveform may produce a strong down-click, but weak up-click when the toggle on is selected by a user, but may produce an opposite response for when the button is toggled off.

As described above with respect to dampening, secondary waveforms may be combined with initial waveforms. However, in some instances, the combined waveforms may be selected to vary the audio output of the actuator due to the waveform. For example, a 1 kHz modulation wave may be applied on top of an initial hump or half-sine waveform in order to vary the output sound. In these embodiments, the secondary waveform may be chosen to vary only the sound and may not substantially affect the movement characteristics of the platform produced by the waveform.

By varying one or more characteristics of an input waveform, the movement characteristic of the input surface, as well as audible characteristics of the device may be varied. Additionally, by applying a combination of two or more waveforms at select intervals, the sound and dampening or ring characteristics may be further modified. By varying a plurality of characteristics, the movement and audible output of the feedback device may be tailored for any number of desired variations of feedback.

Tracking Areas for Varying Feedback Profiles

In some instances the electronic device 100 may include a number of different applications which may vary the feedback provided to a user as compared to other applications. For example, certain applications may select certain icons as "double-click buttons," single click buttons, drag buttons, or the like. Additionally, because the haptic device 102 may receive different types of inputs, such as input gestures, varying force amounts, and so on, the haptic device 102 may provide a substantially unlimited number of different inputs or commands to the electronic device 100. Similarly, because the haptic device 102 may be configured to vary the feedback provided to a user, based on a variety of different profiles, characteristics, or settings, the applications may select substantially any combination of feedback, characteristics or settings to provide feedback to a user. However, applications and/or programs on the electronic device 100 may wish to use certain inputs from the haptic device 102 in different manners. For example, one application may wish to provide a strong feedback force in response to an input, whereas another application may wish to provide no feedback force in response to the same type of input.

Figure 22:
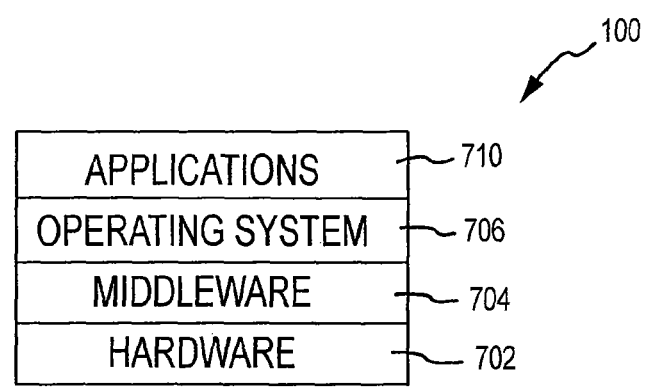
FIG. 22 is a simplified block diagram of the software architecture of the electronic device.

In some embodiments, the electronic device 100 may include one or more software layers that may interact with the hardware layer. FIG. 22 is a simplified block diagram of the software architecture of the electronic device 100. The electronic device 100 may include a hardware layer 702, which may generally include components of the haptic device 102, as well as other components of the electronic device 100 (such as the processor 116, memory 120, etc.). The electronic device may also include a middleware layer 704 and an operating system 706 layer. The middleware layer 704 and/or the operating system 706 may communicate with one or more applications 710 to cause one or more components of the hardware 702 to be activated. For example, the middleware layer 704 may include basic level software that may directly control one or more components of the hardware layer 702, as well as provide data to and from applications. Similarly, the operating system 706, which may include a windows server, may interact with the hardware 702, applications, and/or middleware 704 to control one or more components of the hardware 702 in response to a request for an application, to provide a particular functionality, or the like.

In some embodiments, as will be described in more detail below, the middleware layer 704 may interact with the operating system 706 and/or the applications 710 to determine the location of a cursor or other element corresponding to the haptic device 102 in order to enable a feedback profile for the haptic device 102 that may be selected by a particular application. This may allow the electronic device 100 to seamlessly provide feedback across various active applications, as well as across different locations of the screen. As one example, even if an application is busy processing one type of data, the method may allow for the hardware layer 702 to activate the haptic device 102 as may be desired by the application.

In some instances, the operating system 706, or lower level software such as the middleware 704, may set certain rules for applications in applying the inputs from the haptic device 102. The applications or programs may select certain icons or other elements displayed on the screen 104 as having a particular functionality. These areas may be marked by the application as "tracking areas," which may indicate to the middleware or other software that when a cursor corresponding to the haptic device is in a particular location, a particular feedback setting or profile should be implemented by the haptic device. In these instances, any inputs into the haptic device 102 when the cursor is in a tracking location will be provided to the application, and the haptic device 102 may provide feedback according to a feedback profile selected by the particular application. The tracking areas may be defined by a location within a window or area of the display 104, and based on a location of an icon such as a cursor which may be correlated to the input of the haptic device 102, the processor 116 may determine whether the cursor is within a particular tracking area.

Figure 23:
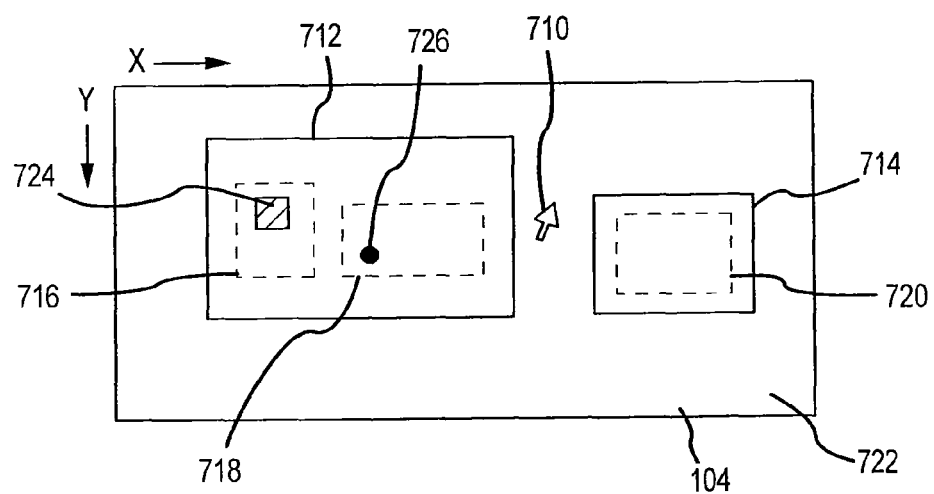
FIG. 23 is a front elevation view of an exemplary output on a display of the electronic device illustrating a plurality of application windows.

The tracking areas will now be discussed in more detail. FIG. 23 is a front elevation view of an exemplary output on the display 104 including application windows. With reference to FIG. 23, the display 104 may include one or more windows 712, 714 corresponding to one or more applications. For example, a first window 712 may correspond to a first application and the second window 714 may corresponding to a second application. The windows 712, 714 may display output as desired by the application, such as a web browser, a word processing window, an email inbox, and so on. The display of the windows 712, 714 may be varied depending on the application, and thus each application may have similar windows or different windows. The windows 712, 714 may include one or more icons 724, 726 or other visual indicators. The icons 724, 726 may allow the user to select (via a cursor 710 or other input mechanism) one or more options for the application. For example, with a word processing application the icons 724, 726 may allow the user to create a new document, save a current document, print one or more documents, and so on. It should be noted that each of the windows 712, 714 may further include additional visual outputs other than the icons 724, 726. For example, each window 712, 714 continuing with the word processing application, the windows 712, 714 may display a "page" graphic that illustrates characters as they are input by the user.

In some embodiments, the windows 712, 714 may be presented as part of a background display 722, e.g., a desktop display presented by the operating system 706. The background display 722 may include one or more icons that correspond to different applications, files, or the like for the electronic device 100. Additionally, the background display 7222 may form a visual output for the user between application windows 712, 714 and/or when no applications include active or open windows.

The windows 712, 714 may be open, closed, and/or active/inactive. While open, the windows 712, 714 may be displayed on the background display, whereas while closed the windows 712, 714 may be presented as an icon on the background display 722 and/or smaller than when open. Similarly, although a window 712, 714 may be open, the application window may not necessarily be active. In some instances, a window may be active if the cursor 710 is located in a portion of the window 712, 714 and/or if the cursor 710 has selected one or more icons within the window 712, 714 or the user is otherwise providing or receiving input from application. As one example, the second window 714 may transition from active to inactive as the cursor 710 tracks from the first window 712 across the background 722 to the second window 714 and then optionally if the cursor 710 (through user input) selects or provides input to an area of the second window 714 and/or an icon within the second window.

It should be noted that the applications corresponding to each of the windows 712, 714 may want to provide different output from the haptic device 102 for different icons 724, 726, as well as may have different visual outputs corresponding to different outputs of the haptic device 102. As one example, a first application window 712 may have an icon 724 that when selected by the user (via input to the haptic device 102) may provide a visual output that corresponds to a particular feedback profile of the haptic device 102. Continuing with the example, the haptic device 102 may have a "double click button" feedback profile that may actuate the feedback surface 128 at two separate thresholds to provide two separate feedback instances. The visual output may illustrate two different outputs for the icon 724, one for the first threshold and one for the second threshold.

As discussed above, the haptic device 102 may be configured to have substantially any number of different feedback profiles (i.e., threshold variations) which may selectively provide feedback to a user as desired. Similarly, each application on the electronic device 100 may vary the visual output for a particular icon 724, 726 based on one or more feedback profiles and/or may select certain profiles for the haptic device 102 to best provide haptic feedback to a user. However, because the electronic device 100 may include multiple applications, where each application may have one or more open window 712, 714, with each window including one or more icons 724, 726 that have a particular functionality, the haptic device 102 may have a number of different feedback profiles to be activated. Requiring each application to alert the haptic device 102 when it requires a particular feedback profile to be activated, e.g., in response to a user input from the cursor, may delay the feedback response of the haptic device 102. For example, an application may be busy, the application may first have to ask the middleware and/or operating system for the cursor location and then respond with a select feedback profile, which can increase the feedback latency (in some instances the applications may not directly track the cursor across the display), or the like. Accordingly, in some embodiments, the electronic device 100 may select the middleware 704 and/or operating system 706 to track the location of the cursor 710, as well as vary the feedback profiles for the haptic device 102 based on the location of the cursor 710.

With reference again to FIG. 23, each application may define one or more tracking areas 716, 718, 720. The tracking areas 716, 718, 720 may be selected to be within or outside of each of the application windows 712, 714. However, generally, the tracking areas 716, 718, 720 or declared regions may be encompassed within or be aligned with the application windows 712, 714. Additionally, each window 712, 714 may include one or more tracking areas 716, 718. The tracking areas 716, 718, 720 may correspond to a single icon 724, multiple icons, and/or other areas defined in the window. The applications may each define the tracking areas 716, 718, 720 for a particular window, and as will be discussed in more detail below, each application may set a feedback profile for the haptic device 102 for particular tracking areas and/or may select a feedback profile for the haptic device 102 for the tracking area.

Generally, when the cursor 710 enters a particular tracking area 716, 718, 720, the middleware 704 and/or operating system 706 may activate a particular feedback profile for the haptic device 102, which may be selected by the application. While the cursor 710 is within the tracking area 716, 718, 720 and selects a particular icon 724, 726 or the user otherwise provides input through the haptic device 102 (e.g., through a gesture or other input), the haptic device 102 may provide input in a manner dictated by the selected profile. In this manner, as the cursor 710 changes position on the display to enter one of the windows 712, 714 the feedback experienced by a user may be varied. As each tracking area may have a feedback profile that includes different thresholds, stages, or the like, which may effect the output of the haptic device 102, each application may have a different feedback feel to the user. It should be noted that a particular feedback profile for an application may include additional tracking areas and/or have different feedback settings for each icon 724, 726 or other select inputs for the application.

In some embodiments, as the middleware 704 or other software at a lower level than the application software may vary the feedback profiles for the haptic device 102, rather than each application, the user may more seamlessly experience feedback from the haptic device 102 as he or she moves the cursor 710 between different application windows 712, 714. This is because the application may not monitor the location of the cursor outside of its window, and therefore may not know when the cursor has left its tracking area.

For example, when the cursor enters a particular tracking area, the middleware may then provide the haptic device 102 the particular profile which may be associated with the tracking area. The profile may include settings for thresholds, stages, as well as gestures, etc. which may be recognized by the haptic device 102. As a specific example, with a first application a two finger press may indicate a zoom function, whereas for a second application a two finger press may activate a menu option, and so when the cursor is in the tracking area for a particular application, the middleware may activate the particular profile for the specific application for the haptic device 102.

Figure 24:
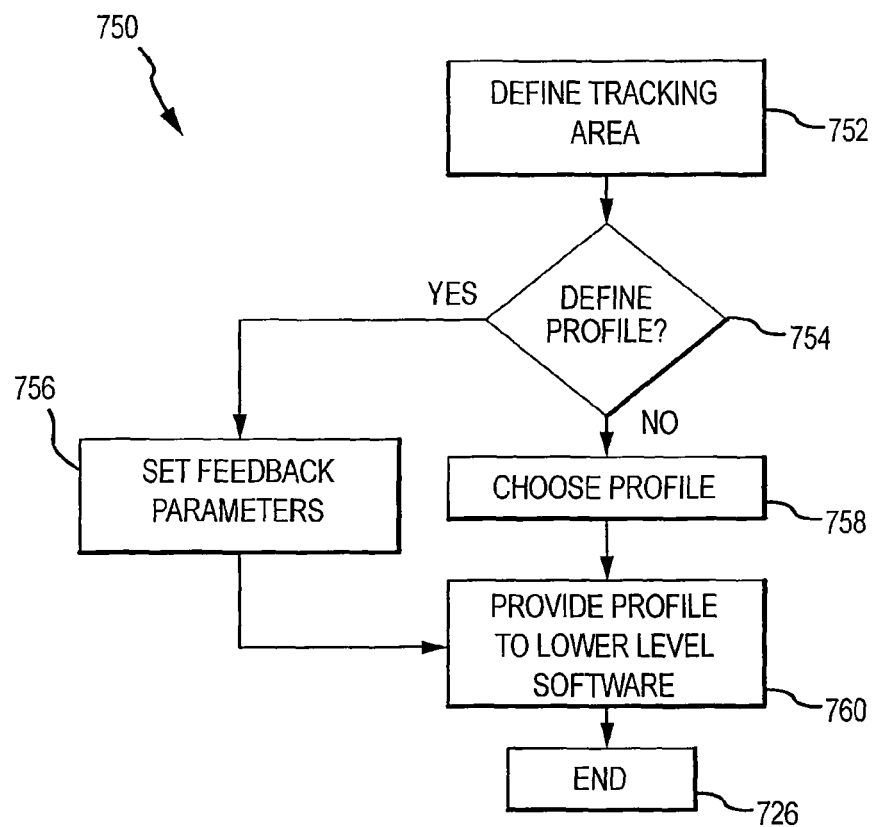
FIG. 24 is a flow chart illustrating a method for defining a tracking area and desired feedback profile.

A method for defining declared region or tracking area will now be discussed in more detail. FIG. 24 is a flow chart illustrating a method 750 for defining a tracking area and desired feedback profile. The method 750 may begin with operation 752 and the application may define a tracking area. Generally, the tracking area 716, 718, 720 may be defined as a region within the application window 712, 714; however, in some instances, the tracking area may be defined in a region outside of partially outside of the application window 712, 714. In instances where the tracking area 716, 718, 720 is defined within one or more of the application windows, the application may define the location of the tracking area relative to the window (as often a user may be able to move the windows across the display). As one example, the tracking area may be defined at a location relative to a middle location of the application window. In instances where the tracking area may be defined outside of the application windows, the tracking area may be defined relative to the window (e.g., 5 mm border around the application window), or may be defined relative to the entire display (e.g., at a horizontal distance of 10 mm and a vertical distance of 7 mm relative to the x, y axes of the display).

The applications may select the tracking regions 716, 718, 720 based on desired graphics, or icons 724, 726 where feedback may be desired when a user provides input. The tracking areas may be defined differently between windows 712, 714 depending on the desired feedback and/or inputs provided to the application. In some embodiments, application may also define one or more gestures which may be used part from an icon or graphics to enter an input. For example, the haptic device 102 may be configured to sense one or inputs other than down-stroke forces, such as, but not limited to, finger locations, different pressure from fingers, and so on. In these examples, the application may not only define icons as having a particular feedback setting, but may also define one or more gestures that may be used within the tracking areas 716, 718, 720.

After the application has defined the desired tracking areas, the method 750 may proceed to operation 754. In operation 754 the application (or user through input to the application) may determine whether to define its own feedback profile or select a feedback profile of the haptic device 102. If the application defines it own profile, the method 750 may proceed to operation 756 and the application may determine select characteristics for the haptic device 102. For example, the application may select certain feedback responses, such as selecting ladder values (thresholds), threshold crossing parameters, and so on. The feedback responses may be tailored to select icons 724, 726 and/or generalized for tracking areas. Alternatively, the user may select certain thresholds or other characteristics of a feedback profile for the application. However, if the application or user chooses a profile, the method 750 may proceed to operation 758. In operation 758, the application (or user) may select a particular feedback profile from the haptic device 102. In other words, the haptic device 102 may have generalized feedback profiles, such as, but not limited to, "deep press," "double click," "light pres," and so on. In these instances, the application may select a particular feedback profile based on set profiles of the haptic device 102, versus setting thresholds, ladders, or the like for various inputs.

After either operation 756, 758 the method 750 may proceed to operation 760 and the selected tracking areas and corresponding feedback profiles may be provided to the middleware 704 and/or operating system 706. As discussed above, the middleware 704 and/or operating system 706 may implement the selected profile when the cursor 710 enters the defined tracking area and if the user provides an input to the haptic device 102 and/or if feedback is otherwise desired. After implementation, the middleware may track the cursor to determine whether a select feedback profile should be activated, this is discussed below.

Figure 25:
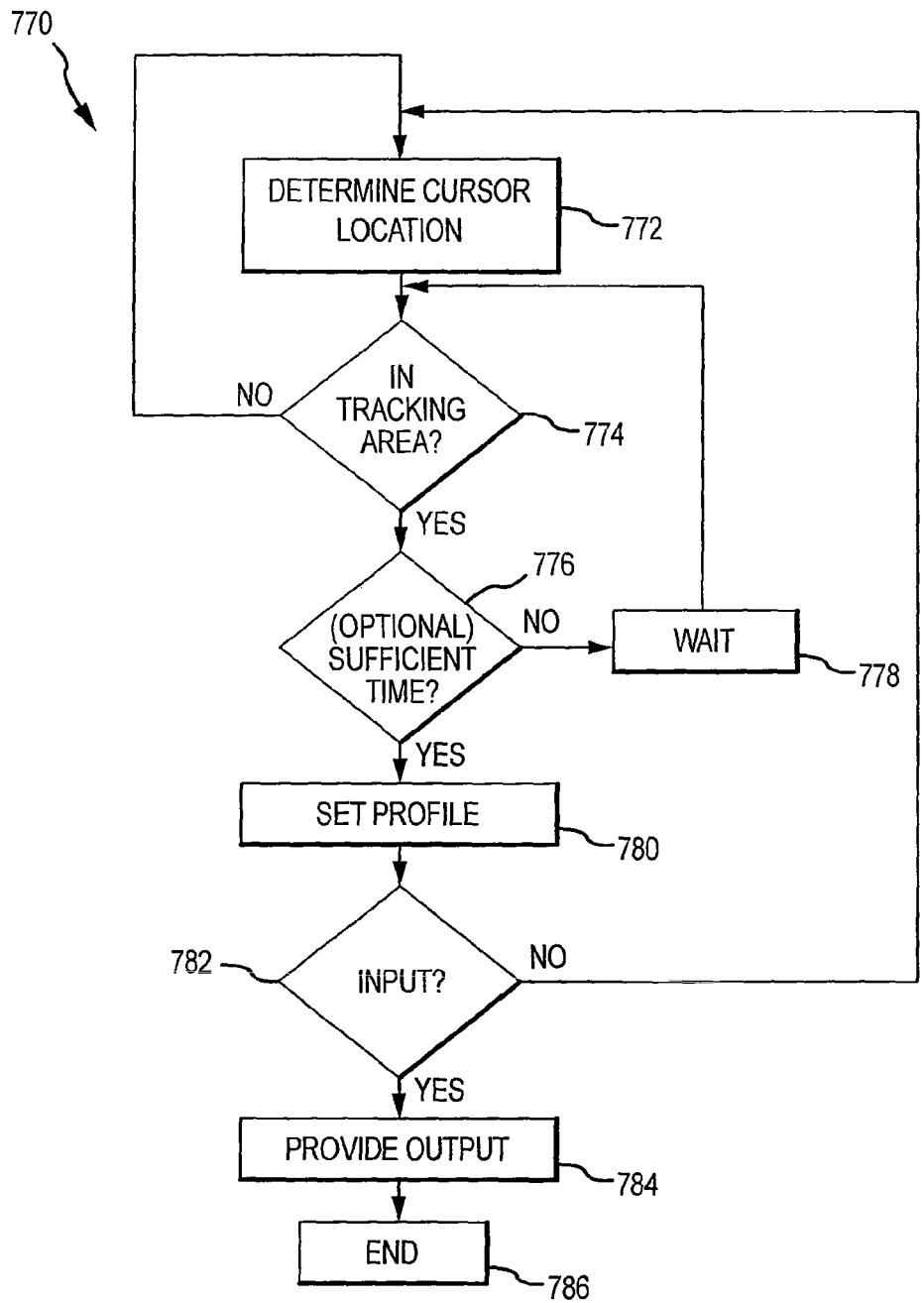
FIG. 25 is a flow chart illustrating a method for utilizing the tracking areas that may be selected in method.

A method for using the tracking areas to vary the feedback experienced by a user will now be discussed in more detail. FIG. 25 is a flow chart illustrating a method 770 for utilizing the tracking areas that may be selected in method 750. The method 770 may begin with operation 772 and the electronic device 100 may determine a location of the cursor 710. In some embodiments, the location of the cursor 710 may be tracked by a window server or other portion of the middleware 704 and/or operating system 706. For example, as a user moves his or her finger across the feedback surface 128, the haptic device 102 may track changes in the location of the user's finger and that may be correlated to a position of the cursor 710 on the display. The cursor location 710 may thus be provided (either directly or indirection) from the haptic device 102 to the middleware 704.

After operation 772, the method 770 may proceed to operation 774 and the electronic device 100 may determine whether the cursor 710 is in a tracking area 716, 718, 720. As discussed above, the tracking areas 716, 718, 720 may be defined relative to one or more application windows 712, 714, global coordinates of the screen, or other parameters. In these examples, the processor 116 may compare the known location of the cursor 710 with the previously defined tracking areas, such as those defined in method 750. In embodiments where the tracking areas 716, 718, 720 may be defined relative to a window, the processor 116 may only have to compare the location of the cursor relative to the application window, but in instances where the tracking areas may be defined outside or without regard to an application window, the processor 116 may have to compare the location of the cursor 710 relative to the entire screen.

If the cursor 710 is not a tracking area, the method 770 may return to operation 774. However, if the cursor 710 is within a tracking area, the method 770 may proceed to optional operation 776. In operation 776, which may be omitted, the electronic device 100 may determine whether the cursor 710 has been in the tracking area for a sufficient period of time. The time period may be selected based a number of parameters, such as average time in an application window, tracking speed, number of application windows open, time last application window was opened, or the like. Additionally, the time period may be static or dynamic, e.g., the time period may be set as a predetermined amount or may be dynamically altered. The time period may help avoid the electronic device 100 from selecting and changing the profiles for the haptic device 102 too quickly, e.g., if the user is passing the cursor over a particular window without meaning to select any icons within that window. In this manner, if the cursor 710 is only passing through an application window 712, 714, the method 770 may not cause the haptic device 102 to switch between feedback profiles. This may help to prevent the haptic device 102 from constantly updating profiles, which could require additional power, decrease feedback performance time, or otherwise cause lag or latency in the system.

In operation 776, if the cursor 710 has not been present in the tracking area for the time period, the method 770 may proceed to operation 778 and the electronic device 100 may wait for the time period. After waiting, the method 770 may return to operation 774 and the middleware or operating system may check to determine if the cursor is still within the tracking area.

In operation 776 if the cursor has been in the tracking area for the selected time frame or if operation 776 is omitted, the method 770 may proceed to operation 780. In operation 780 the haptic device 102 may update its profile to be the select feedback profile for the respective tracking area 716, 718, 720. For example, the haptic device 102 may select the thresholds for one or more force ladders, may select the length of time and/or forcefulness of the actuator as it moves the feedback surface 128, and/or may select the types of down-stroke inputs that may activate feedback (e.g., gestures, force thresholds), and so on. It should be noted that in some instances, the haptic device 102 may load the desired profile and then play or activate that profile when there is a user input to the haptic device 102.

Once the feedback profile for the active tracking area is selected, the method 770 may proceed to operation 784. In operation 784 the haptic device 102 may determine whether an input is detected. For example, the haptic device 102 may determine whether the user has provided a down-stroke and/or upstroke force to the feedback surface 128. If the user has not yet provided input, the method 770 may return to operation 774 and the cursor location may continued to be tracked. On the contrary, if the user has provided an input, the method 770 may proceed to operation 784 and the haptic device 102 may provide output to the user. It should be noted that in operation 784, the application may be altered that the user has provided a particular input and may correspondingly provide a visual output to the icon 724, 726 or other graphic that may correspond to the input. For example, the application may cause the icon 724, 726 to illuminate, zoom, change color, and so on, based on the type input received by the haptic device 102. After operation 784, the method 770 may proceed to an end state 786.

In the above embodiments, the electronic device 100 may use lower level software, such as the middleware 704 and/or a windows server as a touch platform. In other words, rather than providing notification to the application directly of an input on the haptic device 102, the electronic device 100 may alert the middleware layer 704, which may then execute the desired feedback profile on the haptic device 102. In this manner, the feedback actuated by the haptic device 102 may be separated from the application (after the application has declared the tracking regions), and thus the haptic device 102 may provide feedback faster and more seamlessly than if the operating system or middleware alerted the application that the cursor 711 was in a tracking area and left the application to actuate its desired feedback. Additionally, because the feedback may be relatively independent from the application (after the tracking areas have been defined), feedback may be provided to a user even if the application is busy, hung up, or otherwise unresponsive.

Moreover, because the applications may not handle inputs to the haptic device 102 to provide corresponding feedback, certain inputs, such as gestures, drag movements, or the like, may be used across multiple application windows 712, 714, and the user may receive consistent feedback from the haptic device 102. For example, the haptic device 102 may select a particular profile based on the application window where the input started, ended, or which window had the most input time. Alternatively or additionally, the haptic device 102 may not switch profiles until an input is complete, such that if a user is dragging the cursor 710 across the screen, the haptic device 102 may not change profiles until the user has ceased dragging the item and completed that input. If the applications were determining the feedback, the applications may not know whether the cursor 710 had crossed into multiple application windows, or otherwise was moved outside of the window of the respective application. Thus, the above embodiments may allow the haptic device 102 to provide feedback across multiple applications, while still generally allowing each application to vary its feedback responses provided by to the user by the haptic device 102.

CONCLUSION

The foregoing description has broad application. For example, while examples disclosed herein may focus on the haptic device incorporated into an electronic device, it should be appreciated that the concepts disclosed herein may equally apply to feedback mechanisms and methods for other devices and apparatuses. Similarly, although the haptic device may be discussed with respect to providing a particular force, the devices and techniques disclosed herein are equally applicable to any type of haptic feedback. Accordingly, the discussion of any embodiment is meant only to be exemplary and is not intended to suggest that the scope of the disclosure, including the claims, is limited to these examples.

What is claimed is:

1. A method of operating an electronic device, the electronic device comprising a surface configured to receive user inputs, one or more force input sensors operably connected to the surface, and a processor operably connected to the one or more force input sensors, the method comprising:
   detecting, by at least one force input sensor, an input force received by the surface;
   detecting, by at least one force input sensor, movement of the input force across at least a portion of the surface;
   detecting, by the processor, a force input drag operation based on the detected input force and the detected movement of the input force;
   detecting, by the processor, input force characteristics during the force input drag operation; and
   based on the detection of the force input drag operation and the input force characteristics, the processor reducing a level of force needed to maintain the force input drag operation as the input force moves across the surface.

2. The method as in claim 1, wherein reducing the level of force needed to maintain the force input drag operation comprises increasing an up-stroke threshold.

3. The method as in claim 2, wherein the input force is a first input force; and
   increasing the up-stroke threshold reduces a level of force that is needed to register as a second input force, the second input force being received by the surface.

4. The method as in claim 3, further comprising increasing, by the processor, a level of force that is needed to register as a third input force, wherein the third input force is received by the surface.

5. The method as in claim 4, wherein increasing the level of force comprises increasing a down-stroke threshold.

6. The method as in claim 5, further comprising providing, by at least one actuator operably connected to the surface, a second feedback force to the surface when the level of force is equal to or greater than the down-stroke threshold.

7. The method as in claim 2, further comprising providing, by at least one actuator operably connected to the surface, a first feedback force to the surface when the level of force is equal to or less than the up-stroke threshold.

8. The method as in claim 1, wherein movement of the input force across at least a portion of the surface comprises movement of the input force at a constant speed across at least a portion of the surface.

9. The method as in claim 1, wherein movement of the force across at least a portion of the surface comprises movement of the input force at a varying speed across at least a portion of the surface.

10. The method as in claim 1, wherein detecting, by at least one force input sensor, the input force received by the surface comprises detecting, by at least one force sensor, a force applied by a user to the surface.

11. The method as in claim 1, wherein detecting, by at least one force input sensor, movement of the input force across at least a portion of the surface comprises detecting, by at least one accelerometer, movement of the input force across at least a portion of the surface.

12. An electronic device, comprising:
a surface configured to receive user inputs;
one or more force input sensors operably connected to the surface;
a processor operably connected to the one or more force input sensors, the processor configured to:
   receive a first signal from at least one force input sensor based on an input force that is received by the surface;
   receive a second signal from at least one force input sensor based on movement of the input force across at least a portion of the surface;
   detect a force input drag operation based on the first signal and the second signal;
   detect input force characteristics during the force input drag operation; and
   based on the detection of the force input drag operation and the input force characteristics, reduce a level of force needed to maintain the force input drag operation as the input force moves across the surface.

13. The electronic device as in claim 12, further comprising one or more actuators operably connected to the surface and to the processor.

14. The electronic device as in claim 13, wherein the processor is configured to provide an input signal to at least one actuator and the at least one actuator is configured to provide a feedback force to at least a portion of the surface based on the input signal.

15. The electronic device as in claim 12, wherein the one or more force input sensors comprises one or more force sensors.

16. The electronic device as in claim 15, wherein the one or more force input sensors comprises one or more accelerometers.

17. The electronic device as in claim 12, further comprising a display operably connected to the processor.

18. The electronic device as in claim 17, wherein the processor is adapted to drag an object displayed on the display across the at least the portion of the display based on the force input drag operation.

19. The electronic device as in claim 12, wherein the electronic device comprises a laptop computer.

20. The electronic device as in claim 12, wherein the electronic device comprises an external input device configured to be connected to a second electronic device.

* * * * *